US011365626B2

(12) United States Patent
Anschutz et al.

(10) Patent No.: US 11,365,626 B2
(45) Date of Patent: Jun. 21, 2022

(54) FLUID FLOW TESTING APPARATUS AND METHODS

(71) Applicant: PropTester, Inc., Cypress, TX (US)

(72) Inventors: Donald A. Anschutz, Huffman, TX (US); Ian J. Renkes, Tomball, TX (US); Kimberly Schill, The Woodlands, TX (US)

(73) Assignee: PropTester, Inc., Cypress, TX (US)

( * ) Notice: Subject to any disclaimer, the term of this patent is extended or adjusted under 35 U.S.C. 154(b) by 1083 days.

(21) Appl. No.: 15/878,168

(22) Filed: Jan. 23, 2018

(65) Prior Publication Data

US 2018/0252102 A1    Sep. 6, 2018

Related U.S. Application Data

(63) Continuation-in-part of application No. 15/447,025, filed on Mar. 1, 2017, now Pat. No. 10,612,356.

(51) Int. Cl.
*E21B 47/10* (2012.01)
*E21B 49/08* (2006.01)
(Continued)

(52) U.S. Cl.
CPC .......... *E21B 49/081* (2013.01); *E21B 43/267* (2013.01); *E21B 47/10* (2013.01); *G01N 1/20* (2013.01); *E21B 49/0875* (2020.05)

(58) Field of Classification Search
CPC ...... E21B 43/267; E21B 47/10; E21B 49/081; E21B 49/0875; E21B 2049/085; G01N 1/20
See application file for complete search history.

(56) References Cited

U.S. PATENT DOCUMENTS 4,176,064 A * 11/1979 Black .................. B01F 3/04992
                                                        210/196
4,183,813 A *  1/1980 Black ...................... B01D 45/14
                                                        210/512.1
(Continued)

FOREIGN PATENT DOCUMENTS

CN        102979516 A      3/2013
CN        103726837 A      4/2014
(Continued)

OTHER PUBLICATIONS

Zhang et al., "Numerical Analysis On The Optimization Of Hydraulic Fracture Networks", Energies, vol. 8, 2015, 19 pgs.
(Continued)

*Primary Examiner* — David J Bolduc
(74) *Attorney, Agent, or Firm* — Egan Enders & Huston LLP.

(57) ABSTRACT

Methods and systems that may be employed to dynamically test the effect of fluids (e.g., well treatment chemicals such as well stimulation treatment chemicals, enhanced oil recovery "EOR" chemicals, etc.) on hydrocarbon recovery from crushed reservoir formation materials under conditions of applied stress. The disclosed methods and systems may be used in one embodiment to dynamically test types of low permeability formations (e.g., such as shale, limestone, quarried rock, etc.). In one embodiment, a fluid flow apparatus may be provided that has a conductor segment that defines an internally-heterogeneous fluid flow space in the form of an internal slot. Such an internally-heterogeneous fluid flow space may include one or more fluid flow diversion features and/or have a varying or non-consistent cross-sectional flow area. Individual fluid flow apparatus may be configured for assembly and disassembly from each other, (Continued)

and/or may be configured to capture and contain contents for future testing.

43 Claims, 31 Drawing Sheets

(51) Int. Cl.
  *E21B 43/267* (2006.01)
  *G01N 1/20* (2006.01)

(56) References Cited

U.S. PATENT DOCUMENTS

| | | | | |
|---|---|---|---|---|
| 4,448,709 A * | 5/1984 | Bullen | ............... | B01F 3/04446 166/308.1 |
| 4,606,227 A | 8/1986 | Walters | | |
| 4,712,434 A * | 12/1987 | Herwig | ............... | G01N 1/2035 73/864.63 |
| 4,726,219 A * | 2/1988 | Pearson | ............... | E21B 21/01 73/152.39 |
| 4,823,622 A * | 4/1989 | Nohl | ............... | G01N 1/28 73/863.71 |
| 5,116,330 A * | 5/1992 | Spencer | ............... | G01N 1/2035 73/863.71 |
| 5,251,495 A * | 10/1993 | Kuhner | ............... | G01N 1/2035 73/863.71 |
| 5,309,761 A | 5/1994 | Ravi et al. | | |
| 5,361,631 A | 11/1994 | Covington et al. | | |
| 5,488,224 A | 1/1996 | Fagan et al. | | |
| 5,594,182 A * | 1/1997 | Jansen | ............... | G01N 1/10 73/863.71 |
| 5,600,075 A * | 2/1997 | Peterson | ............... | G01N 1/22 73/863.71 |
| 6,023,656 A | 2/2000 | Cacas et al. | | |
| 6,055,874 A | 5/2000 | Onan et al. | | |
| 6,192,750 B1 * | 2/2001 | Greer | ............... | G01N 1/20 73/273 |
| 6,308,351 B1 * | 10/2001 | Franke | ............... | E03C 1/23 4/689 |
| 7,121,156 B2 | 10/2006 | Anschutz et al. | | |
| 7,325,608 B2 | 2/2008 | Van Batenburg et al. | | |
| 7,392,842 B2 | 7/2008 | Morgan et al. | | |
| 7,825,659 B2 | 11/2010 | Georgi et al. | | |
| 7,832,257 B2 | 11/2010 | Weightman et al. | | |
| 7,900,504 B2 | 3/2011 | Huynh et al. | | |
| 7,918,277 B2 | 4/2011 | Brannon et al. | | |
| 8,024,962 B2 | 9/2011 | Tonumkayakul et al. | | |
| 8,062,998 B2 | 11/2011 | Fulton et al. | | |
| 8,286,514 B2 | 10/2012 | Anschutz et al. | | |
| 8,352,227 B2 | 1/2013 | Klumpen et al. | | |
| 8,386,226 B2 * | 2/2013 | Craig | ............... | E21B 43/16 703/10 |
| 8,474,313 B2 | 7/2013 | Al Dhafeeri et al. | | |
| 8,573,048 B2 | 11/2013 | Slater et al. | | |
| 8,904,853 B2 | 12/2014 | Reyes et al. | | |
| 8,954,281 B2 | 2/2015 | Huynh et al. | | |
| 9,103,754 B2 * | 8/2015 | Handique | ............... | C12M 47/04 |
| 9,322,259 B2 | 4/2016 | Kulathu et al. | | |
| 9,341,556 B2 | 5/2016 | Jamison et al. | | |
| 9,377,392 B2 * | 6/2016 | Rickards | ............... | G01N 15/08 |
| 9,587,490 B2 | 3/2017 | Kaasrigstad et al. | | |
| 9,732,592 B2 | 8/2017 | Carvajal et al. | | |
| 9,733,192 B2 | 8/2017 | Shampine | | |
| 2005/0274523 A1 * | 12/2005 | Brannon | ............... | C09K 8/80 166/308.3 |
| 2006/0169064 A1 * | 8/2006 | Anschutz | ............... | G01N 1/2202 73/863.21 |
| 2006/0169066 A1 * | 8/2006 | Anschutz | ............... | E21B 49/00 73/863.83 |
| 2006/0196254 A1 * | 9/2006 | Fjerdingstad | ............... | G01N 15/0227 73/64.56 |
| 2007/0079961 A1 * | 4/2007 | Morgan | ............... | G01N 11/14 166/250.1 |
| 2008/0182762 A1 * | 7/2008 | Huang | ............... | C09K 8/887 507/213 |
| 2009/0164189 A1 * | 6/2009 | Bourbiaux | ............... | G01V 11/00 703/10 |
| 2009/0306898 A1 | 12/2009 | Anschutz et al. | | |
| 2010/0018294 A1 * | 1/2010 | Tonmukayakul | ...... | G01N 11/14 73/54.28 |
| 2010/0275357 A1 * | 11/2010 | Fuoco | ............... | E03C 1/23 4/295 |
| 2011/0040501 A1 * | 2/2011 | Martin | ............... | G01F 1/74 702/45 |
| 2011/0100113 A1 * | 5/2011 | Anschutz | ............... | G01N 15/0806 73/152.55 |
| 2011/0125476 A1 * | 5/2011 | Craig | ............... | G01V 1/288 703/10 |
| 2012/0043080 A1 * | 2/2012 | Edwards | ............... | E21B 43/26 166/264 |
| 2012/0156787 A1 | 6/2012 | Abass et al. | | |
| 2013/0186621 A1 * | 7/2013 | Shaikh | ............... | E21B 33/1208 166/264 |
| 2013/0233545 A1 | 9/2013 | Mahoney et al. | | |
| 2013/0312511 A1 * | 11/2013 | Jamison | ............... | G01N 15/04 73/152.05 |
| 2014/0076543 A1 | 3/2014 | Ejofodomi et al. | | |
| 2014/0087413 A1 * | 3/2014 | Newbold | ............... | C12M 33/04 435/29 |
| 2014/0290937 A1 * | 10/2014 | Crews | ............... | E21B 43/26 166/250.1 |
| 2014/0290943 A1 * | 10/2014 | Ladva | ............... | E21B 43/267 166/280.1 |
| 2015/0059447 A1 * | 3/2015 | Rickards | ............... | G01N 19/00 73/61.41 |
| 2015/0060058 A1 * | 3/2015 | Morris | ............... | E21B 43/26 166/250.02 |
| 2015/0075302 A1 * | 3/2015 | Jenkins | ............... | G01N 1/2205 73/863.23 |
| 2015/0096739 A1 * | 4/2015 | Ghasripoor | ............... | F04F 13/00 166/105 |
| 2015/0107829 A1 | 4/2015 | Themig | | |
| 2015/0176400 A1 * | 6/2015 | Kulathu | ............... | E21B 43/26 703/10 |
| 2015/0184511 A1 * | 7/2015 | Gordon | ............... | E21B 49/088 73/152.23 |
| 2015/0275639 A1 | 10/2015 | Wang et al. | | |
| 2016/0145976 A1 | 5/2016 | Walters et al. | | |
| 2016/0178529 A1 * | 6/2016 | Shampine | ............... | G01N 21/05 356/246 |
| 2016/0178594 A1 * | 6/2016 | Jarvis | ............... | G01N 27/4168 436/52 |
| 2016/0186561 A1 * | 6/2016 | Ludwig | ............... | E21B 49/081 166/264 |
| 2016/0273355 A1 * | 9/2016 | Gosney | ............... | E21B 21/07 |
| 2017/0268321 A1 * | 9/2017 | Madasu | ............... | E21B 43/267 |
| 2018/0010429 A1 * | 1/2018 | Willberg | ............... | E21B 43/267 |
| 2018/0252627 A1 * | 9/2018 | Anschutz | ............... | G01N 11/04 |
| 2018/0363422 A1 * | 12/2018 | Roberts, IV | ....... | G01N 33/2823 |
| 2020/0063545 A1 * | 2/2020 | Shampine | ............... | F04F 13/00 |

FOREIGN PATENT DOCUMENTS

| | | |
|---|---|---|
| EP | 1996792 | 12/2011 |
| EP | 2924471 | 9/2015 |
| RU | 2625980 | 9/2016 |
| WO | WO2010/130037 A1 | 11/2010 |
| WO | WO2013/126287 A1 | 8/2013 |
| WO | WO2015/030837 A1 | 3/2015 |
| WO | WO2016/200375 A1 | 12/2016 |
| WO | WO2017/027340 A1 | 2/2017 |

OTHER PUBLICATIONS

Loveless et al., "Fracturing Fluid Comprised Of Components Sourced Solely From The Food Industry Provides Superior Proppant Transport", SPE 147206, 2011, 8 pgs.

Hodge, "EPA HF Study Technical Workshop: Chemical And Analytical Methods; Crosslinked And Linear Gel Composition", avail-

(56) References Cited

OTHER PUBLICATIONS able on the Internet prior to the Mar. 1, 2017 filing date of U.S. Appl. No. 14/447,025 to which the current patent application claims priority, 11 pgs.

International Standard ISO13503-5, "Petroleum And Natural Gas Industries, Completion Fluids And Materials", Part 5: Procedures For Measuring The Long Term Conductivity Of Proppants, Jul. 1, 2006, 32 pgs.

Chemical Engineering Series, Unit Operations Of Chemical Engineering, Third Edition, Chapter 26, Properties And Handling Of Particulate Solids, 1976, 17 pgs.

American Petroleum Institute, "Measuring The Long Term Conductivity Of Proppants", ANSI/API Recommended Practice 19D; Reaffirmed May 2015, 36 pgs.

American Petroleum Institute, "Measurement Of Properties Of Proppants Used In Hydraulic Fracturing And Gravel-Packing Operations", ANSI/API Recommended Practice 19C, Reaffirmed Jun. 2016, 41 pgs.

Brannon et al., "Large Scale Laboratory Investigation Of The Effects Of Proppant And Fracturing Fluid Properties On Transport", SPE-98005, 2006, 13 pgs.

Fischer et al., "Practical laboratory Testing For Shale Fracturing", SPE-168201, 2014, 13 pgs.

Sahai et al., "Laboratory Results Of Proppant Transport In Complex Fracture Systems", SPE-168579, 2014, 26 pgs.

Anschutz et al., "Fracture Fluid And Proppant Transport Testing Systems And Methods Of Using Same", U.S. Appl. No. 15/447,025, filed Mar. 1, 2017, 59 pgs.

Viswanathan et al, "Integrated Experimental And Computational Study Of Hydraulic Fracturing And the User Of Alternative Fracking Fluids", ARMA 15-248, Rock Mechanics/Geomechanics Symposium, 2015, 6 pgs.

Woodworth et al, "Extrapolation Of Laboratory Proppant Placement Behavior To The Field In Slickwater Fracturing Applications", SPE-106089, Society Of Petroleum Engineers, 2007, 12 pgs.

Barree et al., "Experimental And Numerical Modeling Of Convective Proppant Transport", SPE-28564, Spe Annual Technical Conference And Exhibition, 1994, 16 pgs.

Sahai et al., "Laboratory Evaluation Of Proppant Transport In Complex Fracture Systems", Master Of Science Petroleum Engineering Thesis Proposal, Colorado School of Mines, 2011, 20 pgs.

Anschutz et al., "Fracture Fluid And Proppant Transport Testing Systems And Methods Of Using Same", Filed Mar. 1, 2017, U.S. Appl. No. 15/447,025, Office Action dated May 8, 2019, 15 pgs.

Anschutz et al., "Fracture Fluid And Proppant Transport Testing Systems And Methods Of Using Same", Filed Mar. 1, 2017, U.S. Appl. No. 15/447,025, Response to Office Action filed Sep. 9, 2019; 20 pgs.

* cited by examiner

FLUID FLOW TESTING APPARATUS AND METHODS

This application is a continuation-in-part of U.S. patent application Ser. No. 15/447,025, titled "Fracture Fluid And Proppant Transport Testing Systems And Methods Of Using Same" by Don A. Anschutz, et al., filed on Mar. 1, 2017, the entire disclosure of which is incorporated herein by reference in its entirety for all purposes.

FIELD

This invention relates generally to systems and methods for evaluating fluid and proppant transport behavior within an underground formation including fluid flow apparatus and methods for evaluating flow and behavior in fractures within an underground formation.

BACKGROUND

Hydrocarbon production from shale formations is accomplished through natural formation fractures that are in communication with the producing wellbore. Stimulation treatments, such as hydraulic fracturing, are often performed on a shale formation to maximize contact and connectivity with the shale's natural fractured system to enhance productivity. During a hydraulic fracturing treatment a fracturing fluid containing proppant, a small particulate material meant to prevent the fracture from closing, is introduced into an underground formation through perforations in the wellbore at flow rates and pressures sufficient to fracture the formation and transport the proppant into the formation.

SUMMARY

Disclosed herein are methods and testing systems that may be employed to simulate fluid and proppant transport through different segments of a fracture network created in an underground formation during a hydraulic fracturing treatment introduced through a wellbore. In one embodiment, the disclosed systems and methods may be used for laboratory evaluation of the effectiveness of fluids and/or proppants such as those for hydraulic fracturing of oil and gas wells by employing a reconfigurable network of conductor segments that may be arranged to simulate or model an actual fracture matrix that exists downhole within an underground formation during a hydraulic fracturing treatment. Example types of testing include flowing test fluids may have constituents that include mixtures of viscosified and/or non-viscosified fluids (e.g., liquids) mixed with proppants through the network or matrix of a test system to measure proppant distribution and volume (or mass) during and after treatment within various parts of the simulated fracture network after the proppant is transported into the network by the introduced fluid/s. Also possible is testing that includes flowing test fluids (e.g., viscosified and/or non-viscosified fluids or liquids) without proppant through the network or matrix of a test system. In either case, dynamic parameters such as fluid flow, viscosity and/or pressure drop may be measured in various parts of the simulated fracture network while a fluid is transported (with or without proppant) through the network.

In one embodiment, a fluid and/or proppant transport testing system may be provided that includes a network of different fluid conductor segments that are coupled together in fluid communication to model multiple connected fractures of a fracture network or matrix, e.g., such as a network of induced and/or natural fractures that may exist in an underground formation during a hydraulic fracturing treatment. In one embodiment, conductor segments of the conductor network may extend in any direction (e.g., vertically, horizontally and/or any other direction) relative to gravity. This advantageously allows simulation of fracture segments that are oriented to extend in any direction (e.g., vertically, horizontally and/or any other direction) from an intersecting wellbore into an underground formation. In a further embodiment, fracture angles may be replicated in different sizes and directions using a conductor network that includes different sized conductor segments that may be oriented in different directions.

In one embodiment, a proppant-laden fluid slurry may be introduced (e.g., pumped under pressure) into the testing system and passed through the conductor network during a proppant transport testing procedure. Dynamic flow of fluid and distribution of proppant within the various conductor segments of the network may be visually observed and/or otherwise monitored (e.g., using one or more sensors such as pressure sensors, density sensors, photoelectric sensors, temperature sensors, spectral sensors or spectrometers, radiation detectors, fluid and/or proppant velocity sensors, viscosity sensors, video cameras, electrical resistivity sensors, etc.) while the proppant-laden fluid slurry is being introduced into the test system and/or is settling after pumping has been stopped. Such a testing procedure may be employed to take into account the forces necessary to lift, or drop, proppant into each upward or downward fracture branch. Such testing may also be used to show how the tested fluid and proppant slurry would flow through each fracture branch, and the pressure increase required across each fracture segment or branch that would allow additional fractures to open. In another embodiment a proppant-less fluid may be similarly introduced into the testing system and passed through the conductor network during which dynamic flow of fluid within the various conductor segments of the network may be visually observed and/or otherwise monitored, e.g., using one or more sensors while the fluid slurry is being introduced into the test system.

After fluid introduction ceases, static distribution and settling of the proppant within the different conductor segments may be visually observed and/or otherwise monitored in a manner similar to dynamic conditions. After the fluid and proppant are pumped through the test system network, volume or mass of proppant that is left in each of the branches or conductor segments after being transported by the fluid may be measured. In one embodiment, one or more conductor segments of the network may be removed from the conductor network after fluid introduction ceases (e.g., by uncoupling the conductor segments from each other) so that the fluid and/or proppant contents of each removed segment may be analyzed.

Examples of such analyses include, but are not limited to sieve analysis to determine particle size distribution of proppant deposited in a particular conductor segment of the conductor network, density measurements to determine density of proppant deposited in a particular conductor segment of the conductor network, conductivity testing on deposited proppant in the conductor segment, as well as full evaluation according to API RP 19C ("Recommended Practice for Measurement of Proppants Used in Hydraulic Fracturing and Gravel-packing Operations") and/or according to API RP 19D ("Recommended Practice for Measuring the Long-term Conductivity of Proppants") as well as International Organization for Standardization (ISO) conductivity cell and ISO procedures 13503-5:2006E entitled "Procedures for Measuring the Long Term Conductivity of Proppants". In one exemplary embodiment, one or more conductor segments may be configured to allow direct in-situ testing of proppant and/or fluid contents remaining inside the conductor segment after removal of the conductor segment from the network following fluid introduction, e.g., by flowing fluid under pressure through the length of a removed conductor segment and measuring pressure drop across its contents, etc. It is further possible that a given conductor segment may be configured with one or more valves (e.g., check valves, ball valves, etc.) to isolate and contain the contents of the conductor segment within the segment when it is removed from the conductor network for analysis.

In one embodiment, proppant transport testing and analysis may be employed to better understand proppant behavior in an underground formation by evaluating factors such as propped facture conductivity, distribution of proppant into primary and subsidiary fractures (e.g., primary, secondary, tertiary, etc. fractures) and other fracture characteristics for different combinations of treatment fluids, treatment volumes, proppant sizes, etc. Fracture treatment effectiveness and other characteristics of different types of fracture treatment designs may be evaluated in a given type of formation rock based on a simulated facture network system that is configured to represent the characteristics of the given type of formation rock. In this regard, different types of fracture treatment designs (e.g., having different proppant types and/or sizes, different combinations of proppant sizes/types, different number of fracture treatment stages and volumes of fracture treatment stages, different relative fluid pumping rates, etc.) may be evaluated for treatment of a given type of underground formation and completion in a laboratory environment. The results of such testing and analysis may be employed, for example, to maximize the effectiveness of fracture treatment technology and/or reduce fracture treatment costs for a given formation type.

In another embodiment, apparatus and methods for using same may be employed to evaluate behavior of fluids and/or proppants for hydraulic fracturing of oil and gas wells, including wells completed in shale, tight gas sands or other low permeability subterranean formations. In one embodiment, a fluid flow apparatus having a conductor segment defining an internally heterogeneous fluid flow space (e.g., in the form of an internal slot) may be employed in the laboratory or other surface testing environment to simulate flow of fracture fluid and/or proppant through heterogeneous formation fracture conditions that exist in a subterranean formation during a hydraulic fracture fluid treatment. Such an internally heterogeneous fluid flow space may include one more fluid flow diversion features and may have a varying or non-consistent cross-sectional flow area to simulate the flow of a fracture fluid and/or proppant that are introduced into a subterranean formation during a hydraulic fracturing treatment. During one test embodiment, fluid and proppant (e.g., frac sand, ceramic proppant, resin coated proppant, sintered bauxite, etc.) may be introduced together as a slurry through the fluid inlet/s of the fluid flow apparatus, and pumped through the heterogeneous internal flow slot of the fluid flow apparatus to the outlet/s of the fluid flow apparatus. One or more sides of a fluid flow apparatus may be transparent or translucent so that distribution of fluid and proppant components of a fracture fluid slurry in the internal flow slot may be observed in real time during flow of a fracture fluid slurry through the internal flow slot, and after such fluid flow ceases.

In one exemplary embodiment, a sealed internal slot having a non-consistent cross-sectional flow area may be defined between opposing separated (spaced-apart) internal surfaces of a conductor of a fluid flow apparatus, with one or more fluid inlets provided on one end of the apparatus and one or more fluid outlets provided on another end of the apparatus. Such a sealed slot may be defined in any suitable manner, e.g., between inward-facing internal surfaces of two spaced apart plates that are sealed together, internally machined into a single plate or other solid body, etc.). During testing, fluid and proppant (e.g., sand) may be introduced together as a slurry through the fluid inlet/s of the fluid flow apparatus, and forced to flow through the space of the internal slot across the length of the fluid flow apparatus and out the fluid outlet/s. In such an embodiment, at least one side of a fluid flow apparatus may be transparent to allow observation of fluid flow and segregation of the proppant from the fluid in the space between the sides during fluid pumping and thereafter, e.g., when proppant has settled within the fluid flow apparatus.

In one embodiment, a non-consistent cross-sectional flow area may be provided by the presence of one or more internal flow diversion features that are fixed in place within an internal fluid flow space (e.g., internal flow slot) of a conductor segment of a fluid flow apparatus such that the flow path through the apparatus between the fluid inlet/s and the fluid outlet/s has a non-consistent (or varying) cross-sectional area. For example, in one exemplary embodiment, a flow slot may be defined between at least two opposing and inward-facing internal surfaces of a conductor that are separated from each other in adjacent parallel relationship, with one or more flow diversion features in the form of structures fixed at one or more locations within the flow slot between the fluid inlet/s and fluid outlet/s such that the flow path through the flow slot is not open and consistent, but is rather at least partially blocked or otherwise restricted to simulate heterogeneities present within an actual subterranean formation. The flow diversion structures may be of any number, size, shape and/or location suitable to divert fluid and proppant flow through the flow slot, e.g., ramped shape, rectangular shape, triangular shape, block shape, etc. In different embodiments, such flow diversion structures may be fixedly secured (e.g., mechanically attached or coupled) to one or both opposing inward-facing surfaces of a fluid flow apparatus.

In further embodiments, a fluid flow apparatus may be provided with a conductor segment defining an internal flow slot defined between at least two opposing internal surfaces of a conductor that are spaced apart in non-parallel relationship. For example, at least one internal surface of a given fluid flow apparatus may be angled inward and/or outward relative to an opposing internal surface of the same fluid flow apparatus. In a further example, at least one internal surface of a given fluid flow apparatus may extend inward toward and/or outward away from an opposing internal surface of the same fluid flow apparatus so as to narrow and/or widen the cross-sectional flow area of the flow slot at one or more locations between the fluid inlet and outlet. Although, it is possible that each of the opposing spaced-apart internal surfaces of a flow slot may be substantially smooth (other than at the location/s of fluid diversion structures extending therefrom), it is also possible that at least one of the opposing spaced-apart internal surfaces of a flow slot may be textured (e.g., roughened) to a varying degree.

In a further embodiment, a fluid flow apparatus disclosed herein may be provided with a conductor segment in the form of an internal flow slot that varies in height between the inlet/s and outlet/s of the fluid flow apparatus. In such an embodiment, the side profile of the flow slot may have a non-rectangular shape (e.g., such as a rhombus, quadrilateral, trapezoidal, etc.). In this regard, the first edge and/or second edge of a fluid flow apparatus may be angled upward and/or downward relative to each other so that the height of the internal flow slot is greater at one end than the other end. In another example, the height of the internal flow slot may vary at different positions between the fluid inlet/s ad fluid outlet/s, e.g., such that the height of the apparatus is greatest (or is least) at a point somewhere between the fluid inlet/s and outlet/s.

In another further embodiment, conductor segments of multiple different fluid flow apparatus disclosed herein may be coupled together in fluid communication with each other (e.g., as a group or network of multiple assembled or combined fluid flow apparatus) to allow fluid to flow from outlet/s of a first fluid flow apparatus into the inlet/s of a second fluid flow apparatus to further simulate heterogeneities in the formation. In one embodiment, each individual fluid flow apparatus may be modular in nature to allow multiple different fluid flow apparatus to be attached or otherwise mechanically coupled together such that the respective internal slots of the different fluid flow apparatus are in fluid communication with each other. In this regard, any number of fluid flow apparatus may be selected and coupled together to form a continuous fluid flow path of desired geometry through which a test fluid (e.g., proppant-laden fluid slurry) may be passed. In one embodiment, two fluid flow apparatus cells may be connected together at an optional angle to each other, i.e., so that fluid flow direction changes when exiting the outlet/s of a first fluid flow apparatus and flowing into the inlet/s of a second fluid flow apparatus. Alternatively, a similar effect may be achieved within a continuous flow slot of a single fluid flow apparatus that is bent or otherwise angled at a point somewhere between the fluid inlet/s and outlet/s to force the fluid to change direction as it flows from fluid inlet/s to outlet/s.

In another embodiment, conductor segments of one or more individual fluid flow apparatus may each be configured to capture and contain contents for future testing, e.g., such as fluid and/or proppant that remains within an internal space defined therein following passage of a test fluid through the fluid flow apparatus. Testing of captured contents may be performed, for example, to determine how fluid and/or proppant properties vary or change over the length of an internal slot within a given fluid flow apparatus. In a further embodiment, the size (e.g., length) of individual fluid flow apparatus modules may be chosen to facilitate ease of handling and/or extraction of captured contents from the internal space within the fluid flow apparatus, e.g., such as ease in disassembly of a fluid flow apparatus from other fluid flow apparatus and transportation of the disassembled fluid flow apparatus with its contents. In a further embodiment, the fluid flow apparatus may be configured to allow selective removal of its captured contents for testing.

In one respect, disclosed herein is an apparatus, including: at least one conductor segment, the conductor segment having at least one fluid inlet and at least one fluid outlet with an open area defining a fluid flow path between the at least one fluid inlet and the at least one fluid outlet; and one or more structures disposed within the open area to partially block the fluid flow path between the fluid inlet and the fluid outlet.

In another respect, disclosed herein is an apparatus, including a first conductor segment, the first conductor segment including: at least two separate and inward-facing internal surfaces, with an open area defined as an internal slot between the at least two separate and inward-facing internal surfaces; at least one fluid inlet and at least one fluid outlet with the internal slot defining a fluid flow path between the at least one fluid inlet and the at least one fluid outlet; and at least two spaced valves defining a sample chamber within the slot between the two valves.

In another respect, disclosed herein is a test system, including: a network of multiple conductor segments coupled together in fluid communication, each of the multiple conductor segments including at least two separate and inward-facing internal surfaces, with an open area defined as an internal slot between the at least two separate and inward-facing internal surfaces. The slot of each of the multiple conductor segments may have a cross-sectional area perpendicular to the fluid flow path; and where each of the fluid inlet and the fluid outlet of each of the multiple conductor segments defines a full-size opening having a cross-sectional area equal to the cross-sectional area of the slot. Each of the multiple conductor segments may be detachable from fluid communication with the other conductor segments.

In another respect, disclosed herein is a method, including: introducing a test fluid into at least one fluid inlet of a conductor segment, the conductor segment having at least one fluid outlet with an open area defining a fluid flow path between the at least one fluid inlet and the at least one fluid outlet, and one or more structures disposed within the open area; and causing the test fluid to flow through the fluid flow path of the conductor segment from the fluid inlet to the fluid outlet of the conductor segment such that the structures partially block the flow of fluid between the fluid inlet and the fluid outlet.

In another respect, disclosed herein is a method, including: introducing a test fluid including one or more constituents into at least one fluid inlet of a first conductor segment, the first conductor segment including at least two separate and inward-facing internal surfaces, with an open area defined as an internal slot and sample chamber between the at least two separate and inward-facing internal surfaces; causing the test fluid to flow through the fluid flow path of the first conductor segment from the fluid inlet to the fluid outlet of the first conductor segment to distribute one or more of the constituents of the test fluid within the sample chamber of the first conductor segment; isolating contents of the sample chamber within the conductor segments, the isolated contents including distributed test fluid constituents; and removing the isolated contents from the sample chamber of the detached conductor segment.

In another respect, disclosed herein is a method, including: introducing a test fluid including one or more constituents into at least one fluid inlet of a network of multiple conductor segments coupled together in fluid communication, each of the multiple conductor segments including at least two separate and inward-facing internal surfaces, with an open area defined as an internal slot between the at least two separate and inward-facing internal surfaces, where the slot of each of the multiple conductor segments has a cross-sectional area perpendicular to the fluid flow path, and where each of a fluid inlet and a fluid outlet of each of the multiple conductor segments defines a full-size opening having a cross-sectional area equal to the cross-sectional area of the slot; causing the test fluid to flow through the multiple conductor segments; and then detaching each of the multiple conductor segments from fluid communication with the other conductor segments.

DESCRIPTION OF ILLUSTRATIVE EMBODIMENTS

Figure 1A:
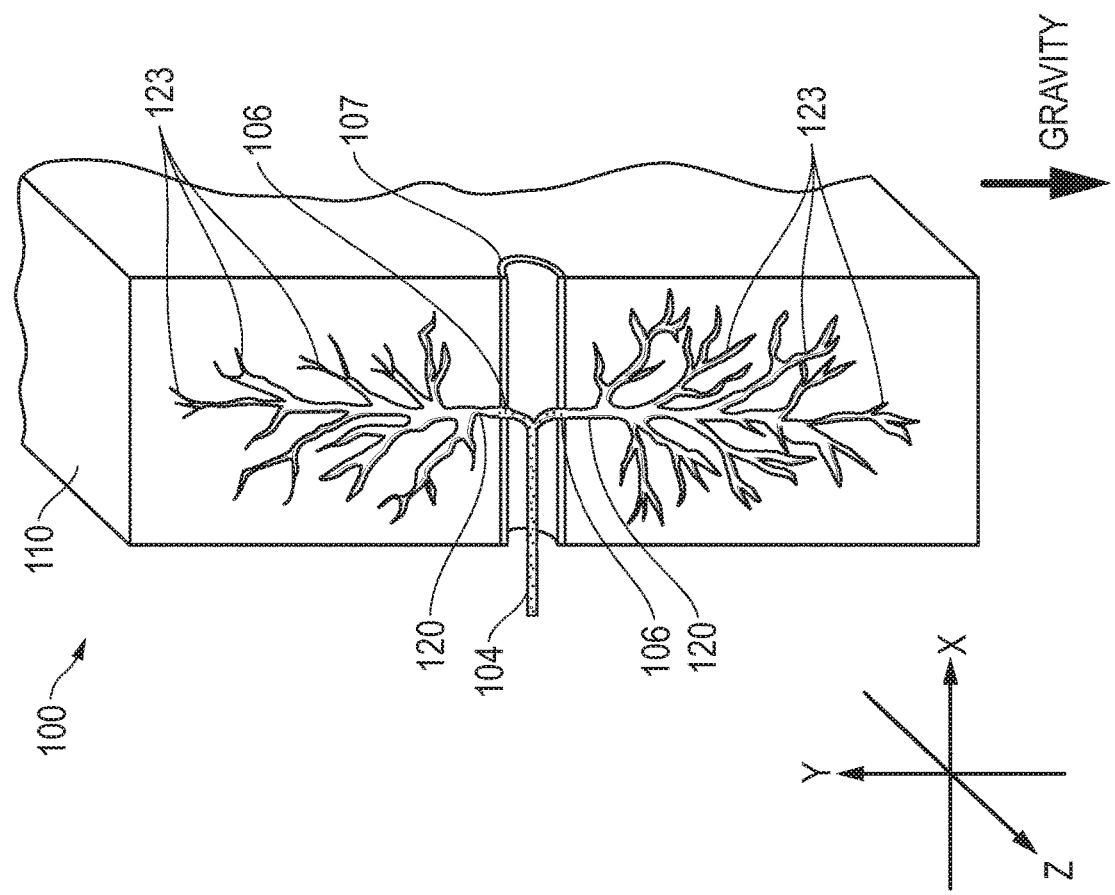
FIG. 1A illustrates a cross-sectional representation of an example underground formation.

FIG. 1A illustrates a cross-sectional representation of an example underground formation 100. Formation 100 may be, for example, a low permeability formation such as shale formation, limestone formation, tight sandstone, any other type or permeability of hydrocarbon-containing formation, etc. As shown in FIG. 1, formation 100 includes formation material 110 that is penetrated by a horizontal wellbore 107 through which a proppant-laden fracture fluid 104 is being introduced into formation 100 via perforations 106 of a given perforation cluster (i.e., an interval of multiple perforations extending through a casing of wellbore 107) during a hydraulic fracturing treatment. Although a single perforation cluster is illustrated, it will be understood that multiple spaced perforation clusters may be provided at different depths within a given completion interval that is hydraulically fractured. Proppant-laden fracture fluid 104 may be any suitable fluid for transporting proppant (e.g., frac sand, sintered bauxite, ceramic proppant, resin coated proppant, etc.) into formation 100. Examples of such fluids include, but are not limited to, slickwater fluid, linear gel fluid, crosslinked fluid, etc.

As shown in FIG. 1A, formation section 100 includes a formation material 110 having a fracture network contained therein that includes interconnected primary fracture segments 120 and subsidiary fracture segments 123 (e.g., secondary fracture segments, tertiary fracture segments, etc.). In FIG. 1, each of primary fracture segments 120 are shown extending upwards and downwards (e.g., along the y-axis) from horizontal wellbore 107 that extends parallel to the x-axis, and in this case are induced by flow of fracture fluid 104 into formation 100. Other primary fracture segments 120 not visible in FIG. 1A may extend sideways (e.g., along the z-axis into and/or out from the page) from horizontal wellbore 107, and/or may extend (or flow toward least resistance) at any other direction in three dimensions from horizontal wellbore 107, e.g., at a variety of angles to the x, y and/or z axes. In this regard, a given fracture segment may extend from a wellbore in a direction oriented perpendicular to the least principal stress of the formation. Subsidiary fractures 123 may be induced and/or may be natural facture segments that extend in variety of directions in three dimensions from primary fractures 120, and that are connected in fluid communication with primary fractures 120 (or that may become connected in fluid communication with primary fractures 120 due to introduced fluid pressure from primary fractures 120 that breaks down debris or other barriers to flow) to receive the introduced fracture fluid and proppant. During the hydraulic fracturing treatment, the proppant introduced by fracture fluid 104 is deposited within the fractures 120 and 123, where it remains in situ following the treatment to "prop" open fractures 120 and/or 123 and to enhance fracture conductivity (e.g., product of the fracture width and the proppant permeability) during subsequent production or injection operations. Effectiveness of the fracture treatment fluid and deposited proppant depends on many factors, including how effectively the proppant is transported upwards (i.e., against gravity) and downwards into the primary fracture segments 120 to create a continuous pack throughout the interconnected subsidiary fracture segments 123, percentage of connected open fracture cross-sectional area filled by the deposited proppant, permeability of the deposited proppant within the fracture segments 120 and 123, segregation of proppant within the facture network, resulting conductivity at different intervals (e.g., different facture segments) within the fracture network, etc.

Figure 1B:
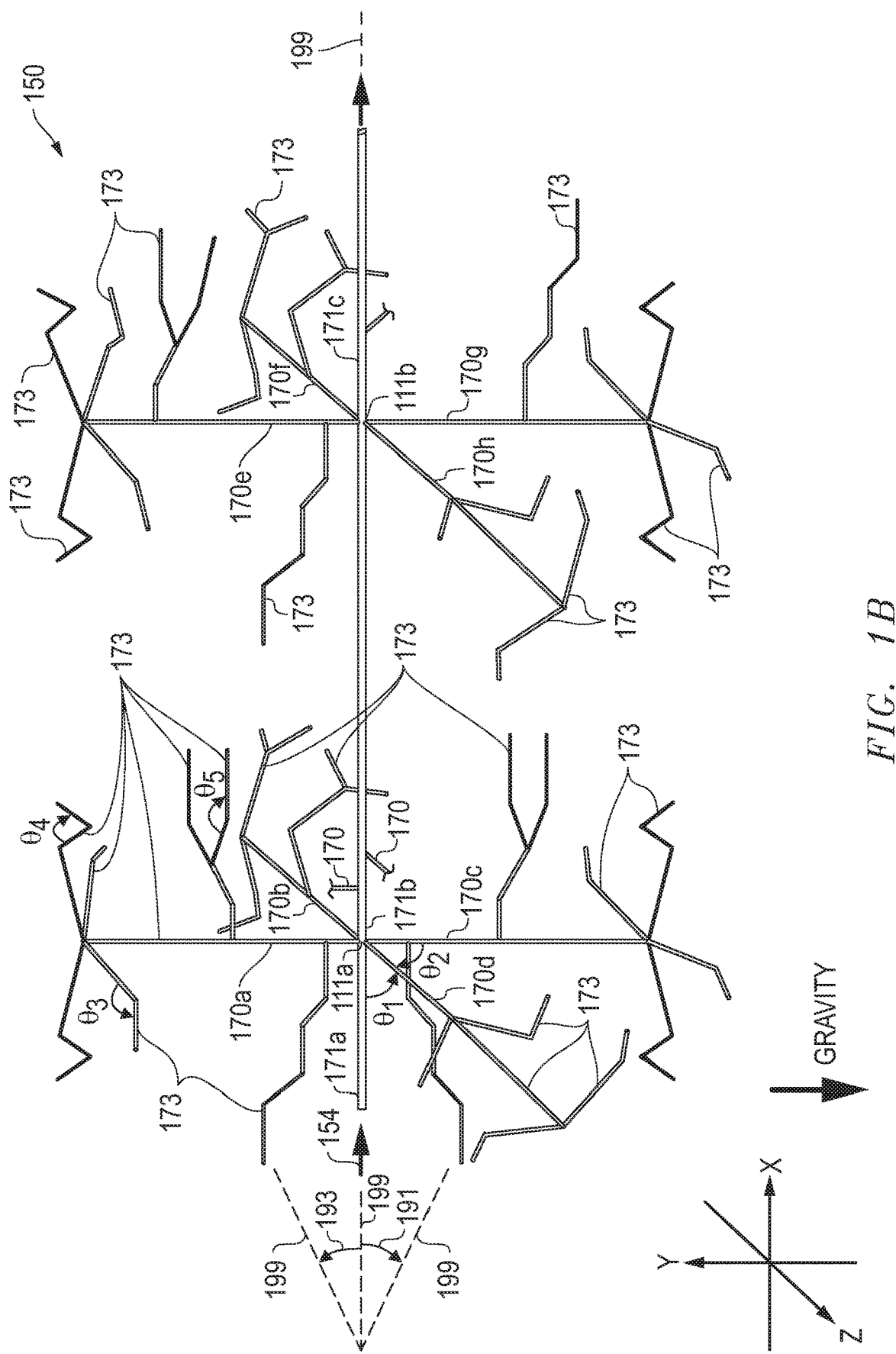
FIG. 1B illustrates a simplified perspective view of a test system architecture according to one exemplary embodiment of the disclosed methods and systems.

FIG. 1B illustrates a simplified perspective view of a three-dimensional test system architecture 150 as it may be configured according to one exemplary embodiment of the disclosed systems and methods. As shown in FIG. 1B, test system architecture 150 may be configured to evaluate fluid flow and/or proppant transport and resulting effectiveness of a hydraulic facture treatment on an underground formation such as formation 100 of FIG. 1A. As shown, test system architecture 150 of this embodiment includes a three-dimensional network or matrix of multiple interconnected fluid conductor segments 171a, 171b, 170 and 173 as they may be oriented to extend in three-dimensions (x, y and z axes), and configured for receiving an introduced proppant-laden test fracture fluid 154. As used herein, the x-axis is chosen to represent the horizontal axis direction, the y-axis is chosen to represent the vertical axis direction, and the z-axis is chosen to represent the axis direction that extends into and out of the page.

In one embodiment, particular configuration (size and geometry) of interconnected fluid conductor segments 171, 170 and 173 may be based on reservoir characterization and/or core samples of formation 100, and may be rearranged to model different formation conditions (e.g., such as natural fracture network conditions that are present in an underground shale formation). In this regard, relative lengths and sizes of interconnected fracture segments, angle of intersection between different fracture segments, presence and extent of subsidiary fracture segments (e.g. secondary fractures segments, tertiary fracture segments, quaternary fracture segments, etc.) and other observed formation characteristics from a formation core may be used to design and configure a test system architecture 150 to simulate actual formation and reservoir characteristics. Thus, the number of different sizes of fluid conductor segments 171, 170 and 173 of FIG. 1B is exemplary only, it being understood that more than three (or less than three) different sizes of fluid conductor segments may be provided as suitable or desired for a given underground formation and configuration of corresponding test system architecture.

In one exemplary embodiment, a first fraction of the multiple fluid conductor segments (e.g., 171, 170, 173, etc.) of a test system architecture 150 may be configured as desired to correspond to (e.g., simulate) natural fractures present within an actual underground formation 100, with a second fraction of fluid conductor segments (e.g., 171, 170, 173, etc.) being configured to correspond to fractures induced in the underground formation 100 during a hydraulic fracturing treatment to interconnect the first fraction of fluid conductor segments that correspond to the natural fractures. In a further embodiment, a majority of the fluid conductor segments may correspond to natural fractures, i.e., such that the first fraction of conductor segments corresponding to natural fractures is larger (e.g., greater than 50%) than the second fraction of conductor segments corresponding to induced fractures. In yet a further embodiment, at least a portion of the fluid conductor segments may be provided as desired with an internal roughness that is different from the internal roughness of the other fluid conductor segments, e.g., in order to simulate internal surfaces of different types of fractures that induce different amounts of friction and/or different flow regimes for a proppant-less fracture fluid or a proppant-laden fracture fluid as it passes through the network. For example, those fluid conductor segments corresponding to natural fractures in formation 100 may be provided with a greater internal roughness (e.g., by virtue of internal scoring and/or raised or depressed features provided on internal surfaces of the fluid conductor segments) than those fluid conductor segments corresponding to induced fractures.

In this particular embodiment, test system architecture 150 includes a horizontal input conductor segment 171 as it may be provided to correspond to a horizontal wellbore 107 of an actual well completion into an underground formation 100, or alternatively a main horizontal fracture segment within a formation. Upward and downward-extending primary conductor segments 170a and 170c may in one embodiment be coupled to horizontal conductor segment 171 in adjacent relationship to each other as shown to correspond to primary fracture segments 120 that extend upward and downward into a formation 100 from horizontal wellbore 104 at a first simulated perforation cluster 111*a*. Also illustrated are lateral or sideways-extending primary conductor segments 170*b* and 170*d* that may extend outwardly from the sides of horizontal input conductor segment 171 at simulated perforation cluster 111*a*, e.g., primary conductor segment 170*d* extending outward from the page in FIG. 1B and primary conductor segment 170*b* extending inward into the page in FIG. 1B. Although in the illustrated embodiment four primary conductor segments 170 extend from input conductor segment 171 at perforation cluster 111*a*, it will be understood that in other embodiments a given simulated perforation cluster 111 may include more or less than four primary conductor segments 170 extending from an input conductor segment 171, e.g., one primary conductor segment 170, two primary conductor segments, three primary conductors segments, more than four primary conductor segments, etc. Moreover, it is not necessary that adjacent primary conductor segments 170 be coupled to an input conductor segment in a position directly opposite from each other.

As illustrated in FIG. 1B a horizontal input section 171 may be provided in one embodiment that includes at least one first horizontal section 171*a* that separates the inlet of horizontal input section 171 from the first simulated perforation cluster 111*a*, as well as a second horizontal section 171*b* that separates the first simulated perforation cluster 111*a* from a second simulated perforation cluster 111*b* and a third horizontal section 171*c* that separates the second simulated perforation cluster 111*b* from additional simulated perforation clusters 111 that may be coupled together in a chain-like or repeating manner. In this regard, a test system architecture may include only a single perforation cluster 111, or may include two or more perforation clusters as needed or desired to fit characteristics of a given fracture modeling application, e.g., such as to simulate a wellbore 107 having multiple separate perforation clusters. As further shown, conductor segments 170 may also be coupled to one or more primary conductor segments 170 between perforation clusters 111. As illustrated, it is not necessary for primary conductor segments 170 to be symmetrically coupled to opposing sides of a horizontal conductor segment 171*a*/171*b*/171*c*, but rather may be coupled in any suitable number or orientation as desired or needed for a particular testing application.

As shown in FIG. 1B, fluid conductor segments 171, 170 and 173 may have different respective cross-sectional open areas perpendicular to fluid flow direction (e.g., corresponding to circular cross-sections having different diameters in the case of cylindrical tubing) as desired or needed to fit a given application. For example, in the illustrated embodiment, horizontal input conductor segment 171 may be cylindrical tubing having a larger diameter than cylindrical primary conductor segments 170, each of which in turn may have a larger diameter than coupled cylindrical subsidiary (e.g., secondary, tertiary, etc.) conductor segments 173. Such a progressively tapered relationship may have a relatively larger input conductor segment that is coupled to relatively smaller primary conductor segment/s, each of which may in turn be optionally coupled to one or more secondary conductor segments that are relatively smaller than the primary conductor segment, with each of the secondary primary conductor segments optionally being coupled to one or more tertiary conductor segments that are relatively smaller than the respective secondary conductor segment, and so on. In another embodiment, a continuously-tapered conductor segment may be employed that progressively tapers in diameter with its length without internal connections. However, it will be understood that in other embodiments, the interconnected conductor segments of a test system architecture do not need to be tapered relative to each other and/or may independent vary in size as desired or needed. Further, one or more of independent conductor segments 171, 170 and 173 may have a different length from each of the other conductor segments 171, 170 and 173 as desired or needed to fit a given application. In addition, a test system architecture such as described herein may be scaled-up in size and/or length.

In FIG. 1B, longitudinal axis 199 of input conductor segment 171 is illustrated as being oriented horizontal relative to gravity in FIG. 1B (i.e., having a longitudinal axis 199 oriented at 0 degrees from (or parallel to) the horizontal relative to gravity, or in other words parallel to the x-axis of FIG. 1B). However, it will be understood that the longitudinal axis of an input conductor segment may be alternatively oriented in other directions relative to the x, y and z axes of FIG. 1B and/or may be non-horizontal and oriented at any other angle or angles relative to gravity besides that shown. For example, longitudinal axis 199 of an input conductor segment may be alternatively oriented to slope upwards at any angle 193 that is from greater than 0 degrees up to 90 degrees from the horizontal relative to gravity (or the x-axis), e.g., in one embodiment to slope upwards at an angle 193 that is from greater than 0 degrees to about 45 degrees from the horizontal relative to gravity, in another embodiment to slope upwards at an angle 193 that is from greater than 0 degrees to about 20 degrees from the horizontal relative to gravity, and in another embodiment to slope upwards at an angle 193 that is from greater than 0 degrees to about 10 degrees from the horizontal relative to gravity. Alternatively, longitudinal axis 199 of an input conductor segment may be alternatively oriented to slope downwards at any angle 191 that is from greater than 0 degrees to 90 degrees from the horizontal relative to gravity (or the x-axis), e.g., in one embodiment to slope downwards at an angle 191 that is from greater than 0 degrees to about 45 degrees from the horizontal relative to gravity, in another embodiment to slope downwards at an angle 191 that is from greater than 0 degrees to about 20 degrees from the horizontal relative to gravity, and in another embodiment to slope downwards at an angle 191 that is from greater than 0 degrees to about 10 degrees from the horizontal relative to gravity.

Moreover it will be understood that an input conductor segment 171 may be non-linear, e.g., curved or otherwise changing its angle in two or three dimensions with length. It will also be understood that the number of primary conductor segments 170 that intersect and connect to an input conductor segment 171 may vary as desired, and/or that directional orientation of each primary conductor segment 170 and/or other subsidiary conductor segment (e.g., secondary or tertiary conductor segment 173, etc.) relative to any other intersecting conductor segment to which it is directly coupled in end-to-end relationship may also independently vary in magnitude of angle ($\theta$) and in direction (i.e., any selected combination of x, y and/or z directions) as desired.

For example, in FIG. 1B, the longitudinal axis of sideways-extending primary conductor segment 170*d* is shown oriented at an angle $\theta_1$ from the longitudinal axis of input conductor segment 171*a* to which it is directly coupled and also oriented at an angle $\theta_2$ from the longitudinal axis of input conductor segment 171a from the longitudinal axis of downward-extending primary conductor segment 170c to which it is also directly coupled. For purposes of illustration, several other conductor segments are shown in FIG. 1B that each have a longitudinal axis that extends at a different angle labelled $\theta_3$, $\theta_4$ or $\theta_5$ from the longitudinal axis of a respective single conductor segment to which it is directly coupled. In this regard, the value of $\theta$ between any two directly coupled conductor segments may independently vary in magnitude from the value of $\theta$ between any other two directly coupled conductor segments (e.g., in FIG. 1B the value of each of exemplary angles $\theta_1$, $\theta_2$, $\theta_3$, $\theta_4$ and $\theta_5$ may be different from each other).

In one embodiment, a value of $\theta$ between the longitudinal axis of any given conductor segment may independently vary from 0 degrees to 360 degrees from a longitudinal axis of another intersecting connected conductor segment to which it is directly coupled. In another embodiment, a value of $\theta$ between the longitudinal axis of any given conductor segment may independently vary from 0 degrees to less than 360 degrees from a longitudinal axis of another intersecting connected conductor segment to which it is directly coupled. In another embodiment, a value of $\theta$ between the longitudinal axis of any given conductor segment may independently vary from 0 degrees to less than 180 degrees from a longitudinal axis of another intersecting connected conductor segment to which it is directly coupled. In another embodiment, a value of $\theta$ between the longitudinal axis of any given conductor segment may independently vary from greater than 0 degrees to less than 180 degrees from a longitudinal axis of another intersecting connected conductor segment to which it is directly coupled.

Thus, connections may be provided that couple two conductor segments together at any desired angle, e.g., between 0 degrees and 360 degrees. Thus, configuration and orientation of conductor segments (e.g., such as conductor segments 171, 170 and 173 of FIG. 1B) in a proppant testing system conductor network may be designed and varied to correspond to the fracture characteristics of a given type of formation (e.g., based on characterized reservoir parameters for the formation such as average number of subsidiary fracture segments to primary fractures, average fracture segment intersection angle, average ratio of induced fracture segments to naturally-occurring fracture segments, etc.), or may be designed to fit any other desired (e.g., hypothetical) fracture network configuration.

Figure 2:
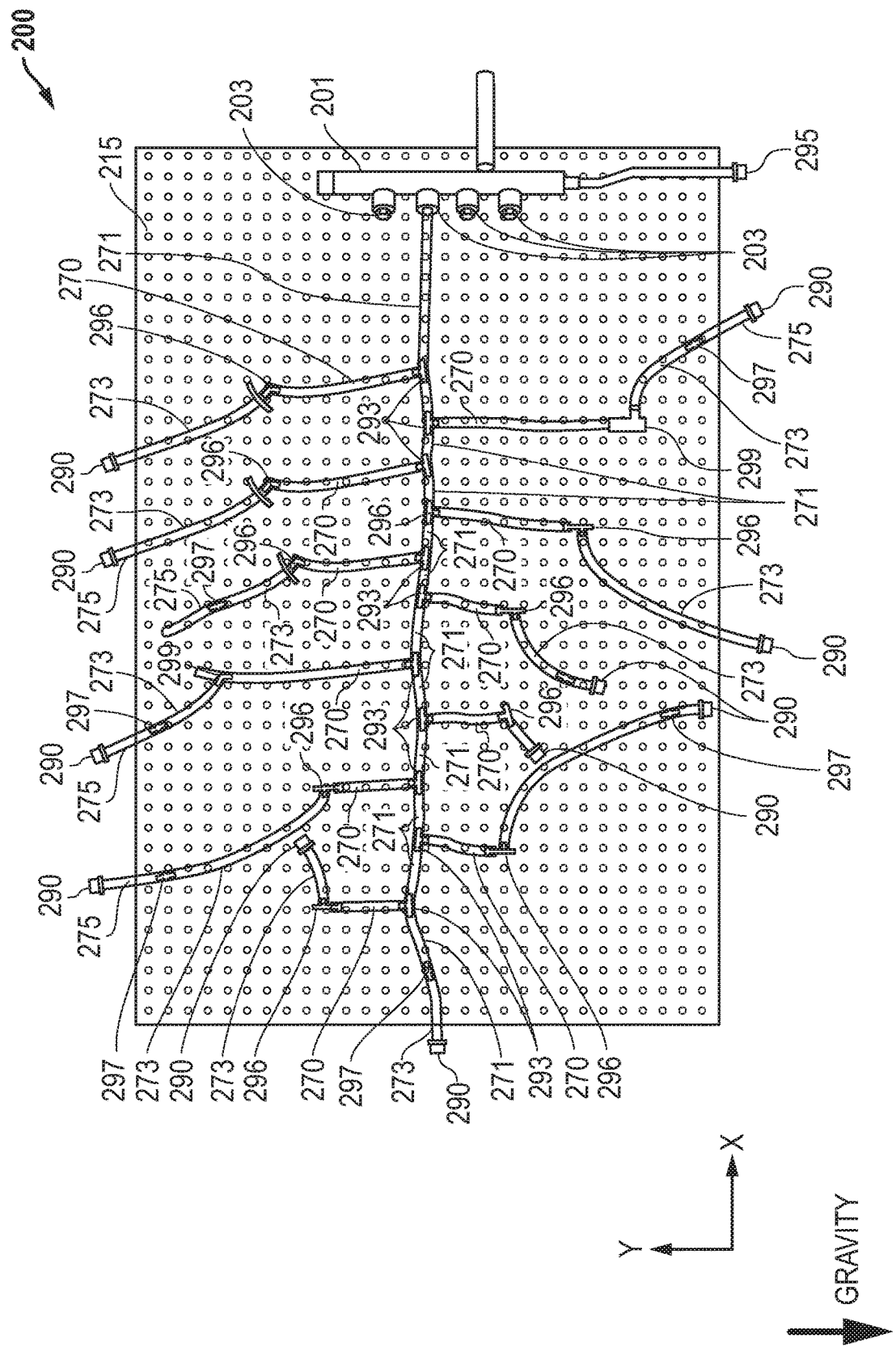
FIG. 2 illustrates a test system network according to one exemplary embodiment of the disclosed methods and systems.

FIG. 2 illustrates one exemplary embodiment of a two-dimensional test system network 200, e.g., as it may be constructed and used for testing in a laboratory or other test facility environment for fluid and/or proppant transport testing. In this embodiment, interconnected conductor segments 271, 270, 273 and 275 are coupled together by couplings 293, 296 and 297 in a substantially vertically-planar two-dimensional matrix relationship (e.g., laid out along horizontal x and vertical y axes as shown), e.g., suspended from a vertical planar supporting structure such as from pegboard 215 by clips such as to represent a slice of formation 100 of FIG. 1A. It is also possible that a two-dimensional test system network such as network 200 may be alternatively oriented in another plane besides a vertical plane, e.g., such as in a horizontal plane or in a plane angled anywhere between the horizontal and vertical. In one embodiment, each of conductor segments 271, 270 and 273 may be clear (transparent or translucent) and flexible cylindrical tubing segments, e.g., such as polyvinylchloride tubing, polyurethane tubing, polyethylene tubing, fluoropolymer tubing, etc. In another exemplary embodiment, any other type of conduit that is suitable for allowing pressure and fluid/proppant flow may be employed, e.g., such as stainless steel, opaque plastics, etc. In the illustrated embodiment, each of conductor segments 271, 270 and 273 are of the same internal diameter, e.g., from about 0.25 inch to about one inch internal diameter, and in one case about 0.5 inch internal diameter, although conduits having an internal diameter larger than one inch and smaller than 0.25 inch are also possible.

As stated above, in the illustrated embodiment of FIG. 2, all of conductor segments 271, 270 and 273 have the same internal diameter, although in other embodiments the different types of conductor segments 271, 270 and 273 may each have a different internal diameter (e.g., diameter of cylindrical segments 271 greater than diameter of cylindrical segments 270, and diameter of cylindrical segments 270 greater than diameter of cylindrical segments 273). In this regard, test system network 200 may be configured as a modular system having interchangeable parts (e.g., valves, screens, filters, connectors, etc.) and interchangeable conduit sizes (e.g., of different internal diameters and/or lengths) so as to allow test system network 200 to be configured and reconfigured as desired to fit the fracture characteristics of a given application.

Each of segments 271, 270 and 273 may be coupled together, e.g., by connectors (e.g., fittings or unions), which in one embodiment may be plastic or metal screw connection unions 293, 296, 297 of suitable internal diameter and geometry to couple together the individual conductor segments 271, 270 and 273 to form a fluid and pressure-tight seal with the coupled conductor segments. In one exemplary embodiment, such connections may be full-opening, meaning that a given connection has an internal diameter or cross-sectional flow area as large as the internal diameter of the largest diameter or cross-sectional flow area conductor segment to which it is coupled. It will be understood that any given connector may optionally have a single inlet and multiple outlets to allow multiple conductor segments to be coupled to the multiple outlets. Other (e.g., specialized) connectors may be provided, e.g., such as connectors having an additional outlet (not connected to a conductor segment of the network) that is configured to be used as a leak-off port, pressure sensor port, etc. such as in a manner described further herein.

Still referring to FIG. 2, a substantially horizontal input section made up of interconnected conductor segments 271 is coupled to an optional manifold 201 that includes multiple outlets 203 that each may also be optionally coupled to multiple other input conductor segments (not shown) in similar manner. As shown, a fluid input 295 is provided that may be coupled to a pump for supplying a proppant-laden test fracture fluid 154 to the interconnected conductor segments of test system network 200. As shown, individual primary conductor segments 270 are coupled to extend upward or downward from substantially horizontal input conductor segments 271 by T-connectors 293 as shown, in this case at about 90 degrees upwards or downward from each T-connector 293 to simulate primary facture segments extending upward or downward from a horizontal wellbore, although other angles from greater than 0 degrees to less than 180 degrees are possible. In this embodiment, each of secondary conductive segments 273 is coupled to a corresponding primary conductor segment 270 by a respective angled (e.g., right angle or greater or lesser angle) connector 296 and then may be bent or otherwise oriented in a different direction at an angle between 0 and 90 degrees to the output of the corresponding angled connector 296 as shown, e.g., to simulate secondary fracture segments extending outwardly at a variety of different angles from the side of a primary facture. It will be understood that it is also possible that one or more individual segments 271 of a substantially horizontal section and/or primary conductor segments 270 may also be bent or otherwise oriented at an angle between 0 and 90 degrees relative to the substantially horizontal segments 271 of the input section. As shown, additional conductor segments may be similarly coupled as tertiary conductor segments 275 as shown to the end of one or more of the secondary conductor segments 273 (e.g., in this case via an in-line or linear coupling 297), and that any number of further conductor segments may be coupled to the end of each tertiary conductor segment via angled and/or linear connectors in similar manner.

Also shown present in the embodiment of FIG. 2 are optional screw connectors 299 that may be present for purposes of varying the design (e.g., geometry) and size of the conduits to fit the given conception of the fracture network In this embodiment, the end of a substantially horizontal input section (i.e., made up of individual conductor segments 271), as well as each of secondary conductor segments 273 or tertiary conductor segments 275, is coupled to a screen filter 290 through which introduced fluid may exit without its proppant constituent/s during testing.

Figure 3A:
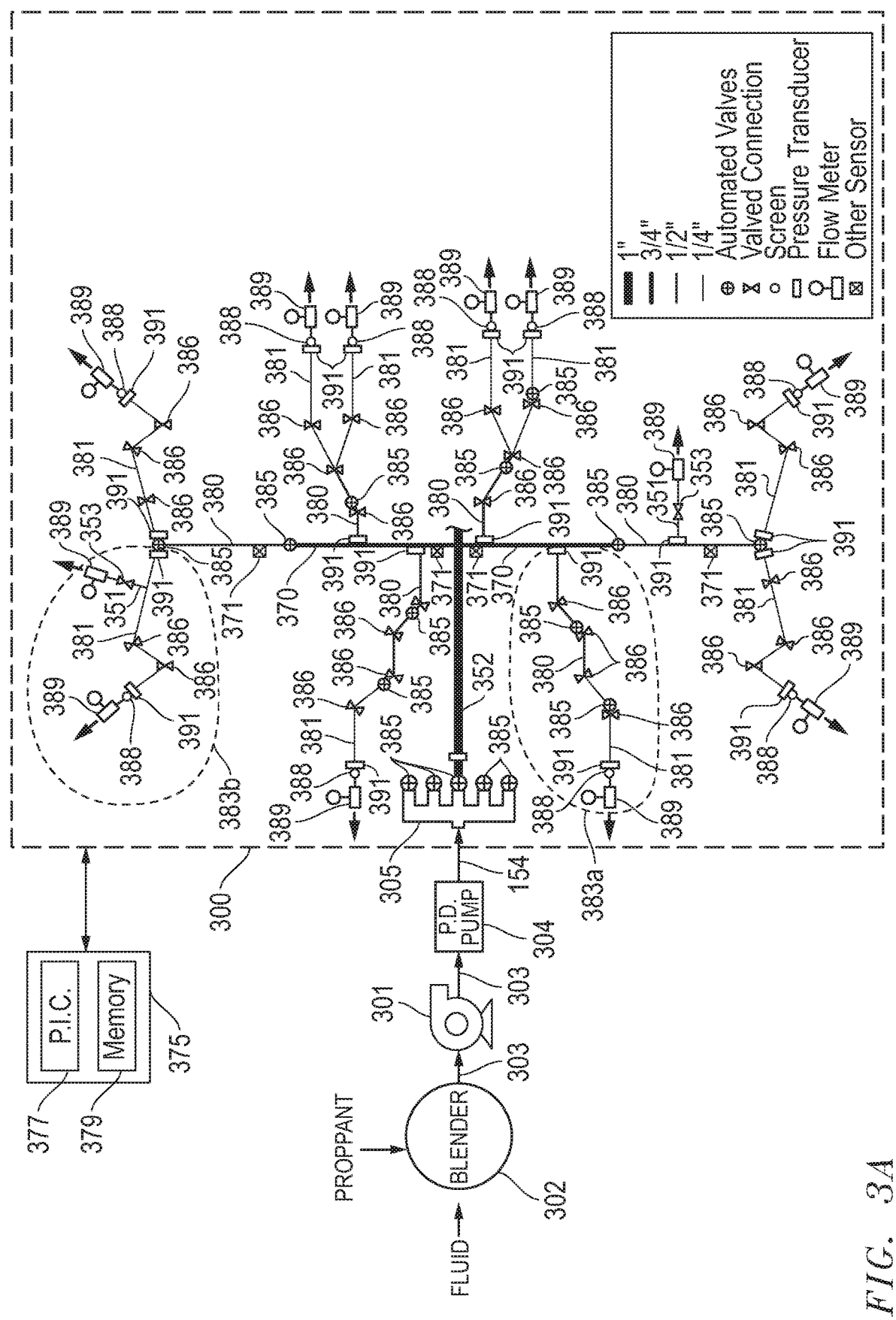
FIG. 3A illustrates a flow diagram of a test system network coupled to receive proppant-laden fluid according to one exemplary embodiment of the disclosed methods and systems.
Figure 4:
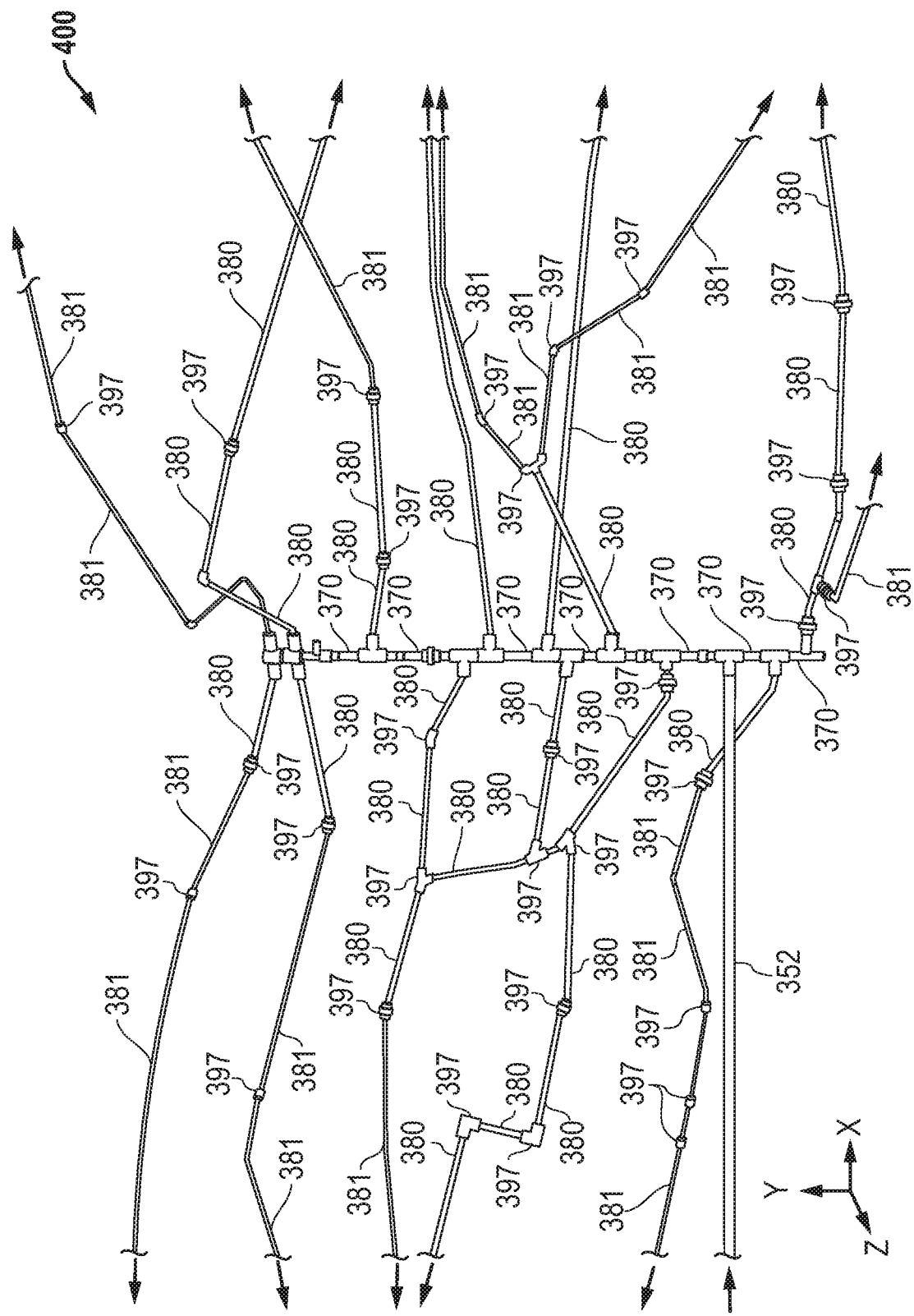
FIG. 4 illustrates a perspective view of a test system network according to one exemplary embodiment of the disclosed methods and systems.

FIG. 3A illustrates a flow diagram of a test system network 300 coupled to receive fluid (e.g., proppant-laden fluid) according to one exemplary embodiment of the disclosed systems and methods. It will be understood that the various conductor segments of FIG. 3A may be oriented in two-dimensions relative to each other (e.g., such as illustrated in FIG. 2, or in three-dimensions relative to each other as illustrated in FIGS. 1 and 4). Although described with regard to a particular combination of conductor segment types and test system network geometries, it will be understood that one or more of the particular features or components of test system network 300 may be utilized with other test system network geometries and/or other types and sizes of conductor segments, including the conductor segment slots of any of the fluid flow apparatus illustrated and described herein in relation to FIGS. 8A-15D herein. As shown in FIG. 3A, proppant (e.g., frac sand, sintered bauxite, ceramic proppant, resin coated proppant, etc.) may in one embodiment be blended with a transport fluid in blender 302 before introduction to input conductor segment 352 of test system network 300 via pumps 301 and 304 and manifold 305. In such an embodiment, a transport fluid may include any liquid (e.g., water-based, oil-based, etc.) and/or gaseous fluid (e.g., carbon dioxide, nitrogen, etc.) that is suitable for blending with proppant to form a proppant slurry 303 to transport the proppant into the conductor segments of test system network 300.

Examples of suitable transport fluids include, but are not limited to, slickwater fluid, linear gel fluid, crosslinked fluid, gelled oil fluid, gas-energized liquid, gas, etc. Examples of gelling agents that may be employed in a selected amount to form a gelled transport fluid as desired include, but are not limited to, natural polymers such as guar and guar derivatives such as caroboxymethyl-hydroxypropyl-guar, hydroxypropyl guar, carboxymethyl guar; hydroxyethyl cellulose and carboxymethyl hydroxyethyl cellulose; as well as synthetic polymers such as acylamido-methyl-propane sulfonate (AMPS), polyacrylic acid, polyacrylamide; and viscoelastic surfactants. Crosslinkers that may be optionally added to a transport fluid to form a crosslinked transport fluid include, but are not limited to, borate, metal chelates of Zr and Ti, etc. A gelled transport fluid may also include an optional breaker, such as enzymes, acids, oxidizers, etc. Other additives that may be present in a transport fluid include, but are not limited to, fluid loss additives (e.g., such as diesel, etc.). It will be understood that it is also possible that proppant-free fluids (e.g., such as the above-described fluids suitable for transport fluids) may also be introduced to test system network 300 and evaluated in a manner similar as described herein for proppant-laden test fracture fluids, with the exception of the absence of proppant particle analyses.

In one embodiment, any combination of fluid and proppant may be employed to create a proppant slurry 303 (e.g., liquid-based slurry, gas-based slurry, gas-energized liquid-based slurry, etc.) that is suitable for fracturing an actual underground formation such as formation 100 of FIG. 1. In this regard, ratio of fluid to proppant may be controlled by metering proppant into blender 302 during test pumping to achieve desired proppant loading in slurry 303. In this regard, it is possible to test proppant transport by pumping a proppant slurry 303 as a proppant-laden test fracture fluid 154 having a single proppant loading into test system network 300, or by pumping a proppant slurry 303 as a proppant-laden test fracture fluid 154 having a varying proppant loading (e.g., by pumping a proppant-laden test fracture fluid 154 into system 300 in two or more different stages having different proppant loadings). Example proppant loadings range from about 0.5 lb/gallon to about 4.0 lb/gallon, although proppant loadings greater than 4.0 lb/gallon and less than 0.5 lb/gallon are also possible. In one embodiment, proppant mesh sizes be may be any mesh size or range of mesh sizes that is suitable for fracturing an actual underground formation such as formation 100 of FIG. 1. Example proppant mesh sizes include, but are not limited to, 16/30, 20/40, 30/50, 40/70, and 100 mesh although larger and smaller proppant sizes are also possible.

Still referring to FIG. 3A, fluid may be provided to blender 302 from charge pump/s and/or holding tanks, and proppant may be provided to a hopper of blender 302 using a pneumatic conveyor and pneumatic transfer line. However, any other suitable combination of fluid-handling and solid-handling components may be alternatively employed to form slurry 303. In one embodiment, pump 301 may be a centrifugal pump and pump 304 may be a positive displacement pump (e.g., such as duplex, triplex, quadraplex pump, etc.) that is suitable for providing sufficient pressure to pump the proppant-laden fluid slurry 303 as a proppant-laden test fracture fluid 154 through the various conductor segments of test system network 300. During introduction of proppant-laden test fracture fluid 154 into test system network 300, proppant may be transported and deposited within one or more of primary conductor segments 370, secondary conductor segments 380 and/or tertiary conductor segments 381 such that only fluid (with no proppant) exits network 300 outward through optional screens 388 and optional flow meters 389 provided at or near terminal ends of tertiary conductor segments 381 of each separate output arm of test system network 300 as shown, it being understood that in another embodiment one or more terminal ends of tertiary conductor segments 381 may be open instead. Pressure required to pump the proppant-laden test fracture fluid may be controlled, e.g., by a combination of flow rate into a particular geometry of network 300 and back pressure maintained by screens and/or valve settings within and/or at the outlets of the network 300. Flow meters 389 may be of any suitable flow meter type for measuring fluid flow at a selected location of a conductor segment including, for example, Coriolis flow meters such as a Micro Motion model number 1700R12ABAEZZZ flow meter available from Emerson Electric Co. of St. Louis, Mo., although other types of flow meters may be employed.

In the embodiment of FIG. 3A, pressure transducers 391 are shown placed at fluid entrance points to each output "arm section" of one or more conductor segments extending sideways from vertical primary conductor segments 370 and vertical secondary conductor segments 381. Pressure transducers 391 may be any suitable type of pressure transducer suitable for measuring pressure at a selected location of a conductor segment including, for example, an Econoline Pressure Transducer Item No. 0.104.00503.020401 available from Keller America of Newport News Virginia. Such a configuration allows the amount of pressure required to introduce a test fluid (e.g., containing proppant) into a given arm of test system network 300 to be measured at the same time the given flow rate through the given arm is determined in this case by the flow meter 389 at or near the terminal end/s of the same given output arm section of test system network 300.

For purposes of illustration, two of the multiple output arm sections of test system 300 are encircled and denoted 383a and 383b in FIG. 3A, it being understood that an arm section (e.g., output arm section) may be defined to include different combinations of conductor segments and in other areas of test system 300 (e.g., such as may be selected for analysis as described below). In one embodiment, pressure drop ($\Delta P$) between two spaced points within a given output arm section 383 may be measured while test fluid is simultaneously pumped through the arm section, e.g., to determine when proppant has entered and/or been deposited within the arm section 383, and when the entire arm section 383 has been filled with proppant. For example, while test fluid is being pumped through network of test system 300, the test fluid pressure at a first and upstream point (e.g., the entrance or inlet) of a given arm section 383 may be measured with a first pressure transducer 391 while pressure at a second and downstream point (e.g., at an exit or outlet) of the same given arm section 383 is simultaneously measured with a second pressure transducer 391. Flow rate of the test fluid through the given arm section 383 may be measured (e.g., using a flow meter 389 at the outlet/s of the arm section 383 and/or positioned at any other suitable point/s within arm section 383 such as at any leak off openings 351) simultaneously with measurement of pressure drop across at least a portion of the given arm section 383.

In one embodiment, simultaneously monitoring test fluid flow rate and $\Delta P$ across a given arm section 383 (or portion thereof) allows a determination to be made as to whether proppant is being introduced into the given arm section 383 during test fluid pumping and, if not, then why (e.g., due to little or no test fluid flow rate through the arm section 383, due to high pressure turning the corner at the entrance to the arm section 383, or both). In one embodiment, rate of proppant deposition within the given arm section 383 may also be estimated from the monitored arm section flow rate and $\Delta P$. In another embodiment, measured arm section $\Delta P$ and/or measured pressure at an upstream point (e.g., such as inlet) of a given arm section 383 may be monitored to determine what value or magnitude of $\Delta P$ or pressure is required to fill a given arm section 383 with deposited proppant before proppant flow is diverted to fill another given arm section/s 383 of test system 300. For example, during a given test fluid pumping procedure, different individual arm sections 383 of the same test system 300 may require a different magnitude of $\Delta P$ and/or upstream point pressure be achieved before accepting proppant-laden test fluid, and thus different individual arm sections 383 may begin accepting proppant-laden fluid and/or become filled with proppant at different times than other individual arm sections 383 (e.g., sequentially). Thus, in one embodiment the pressure ($\Delta P$ and/or upstream point pressure) at which each different arm section begins accepting proppant-laden test fluid and then becomes filled with proppant may be determined. And in another embodiment, the sequence with which multiple different arm sections of a given test system 300 begin accepting proppant-laden test fluid and then become filled with proppant relative to each other may be determined from the pressure and/or flow rate measurements.

It will be understood that FIG. 3A is exemplary only, and that an output arm section 383 may be defined to have any orientation, position and or length relative to an input conductor segment 352 and/or to any intervening conductor segments as desired or needed to fit a given test system application. Moreover, it is also possible in other embodiments to only measure the pressure required to introduce a test fluid (e.g., containing proppant) into a given arm section 383 of test system network 300 (i.e., without measuring flow rate through the given arm section of the test system network), or alternatively to only measure flow rate through the given arm section 383 (i.e., without measuring pressure required to introduce a test fluid into the given arm section 383).

In one embodiment, terminal ends of conductor segments 381 may be coupled to a spent-fluid collection network for disposal or for recycling of the fluid exiting at the various outlets of the test system network 300. Optional screens 388 may be present for purposes of capturing (or retaining) different size proppant particles and may be selected to allow for varying flow rates of proppant-laden test fracture fluid 154 while accommodating (not exceeding) the maximum pressure rating of the test system network 300. Thus, in one embodiment a screen 388 may have a mesh size selected to prevent larger proppant sizes present in the test fluid 154 from passing through the screen and outside the network 300, while at the same time allowing other smaller size proppants present in the test fluid 154 to pass through the screen to exit the network 300. In other embodiments, a screen 388 may be selected to prevent all proppant sizes present in the test fluid 154 from passing through the screen.

In other embodiments, it is possible to include controllable (or alternatively non-controllable) "leak off" ports (e.g., openings) at one or more selected locations within the body of the conductor segments of test system network 300 for purposes of simulating fluid leak off into the formation during a fracture treatment. This may be accomplished, for example, by providing relatively small fluid exit openings 351 (e.g., without screens) through the wall of one or more conductor segments of test system network 300. Such openings 351 may be of a size (e.g., diameter) that is selected according to the characteristics (e.g., natural permeability) of the particular formation 100 that is being simulated, and in one exemplary embodiment may be sized relatively small to the size of at least a portion (or alternatively all) of the proppant particles being tested so that fluid but not relatively larger proppant particles may pass out of the conductor segment through the leak-off port during testing. Such exit openings 351 may be dimensioned to function as leak off ports by providing a fluid transport path to allow fracture fluid to exit the network 300 (without proppant) in order to test the ability of diverting agents (e.g., such as benzoic acid flakes, rock salt, Halliburton BioVert®, etc.) that may be present in the proppant-laden test fracture fluid 154 to obstruct fluid flow through these leak off ports so as to divert or contain the fluid flow within the conductor segments (e.g., 370, 380 and 381).

In one exemplar embodiment, size of fluid exit openings 351 may be selected to be smaller than the external dimensions of the smallest proppant particles present in a proppant-laden test fracture fluid 154 such that these particles cannot pass through the provided fluid exit openings 351. Number and density of fluid exit openings 351 provided in the side wall of a given conductor segment may vary based on the characteristics of a formation 100 being simulated. As further shown in FIG. 3, optional controllable valves 353 may be coupled to regulate fluid flow though fluid exit openings 351 so that fluid leak off may be selectably simulated when desired.

Besides optional flowmeter 389, other types of sensors may be optionally present to monitor or otherwise sense characteristics of fluid and/or proppant at one or more locations within test system network 300. Examples of such sensors include, but are not limited to, pressure sensors 391, and other sensors 371 such as density sensors, photoelectric sensors, temperature sensors, spectral sensors or spectrometers, radiation detectors, fluid and/or proppant velocity sensors, viscosity sensors, video cameras, electrical resistivity sensors, etc. Signals and/or data from these sensors may be transmitted wirelessly or by hardwire (e.g., by individual wire conductors from each sensor that are not shown) to data collection/data acquisition equipment which may include, for example, an optional computer system 375 having optional analog to digital converters (ADCs) and/or signal conditioning circuitry, one or more programmable integrated circuits 377 (e.g., CPU, controller, microcontroller, microprocessor, ASIC, etc. or executed on a programmable logic device "PLD" such as FPGA, complex programmable logic device "CPLD", etc.) Examples of such a computer system include, but are not limited to, a computer workstation or computer server, portable computer system such as a tablet computer, a notebook computer, etc. Such data may be stored in memory 379 (e.g., non-volatile memory or non-volatile storage drive) for future analysis and/or may be monitored in real time, e.g., so as to allow a fluid and/or proppant transport test procedure to be modified while the test is underway based on the data collected in real time. Computer system 375 may also be configured to provide wired and/or wireless control signals for controlling operation of automated valves 385.

In one embodiment, pumping pressure for proppant-laden test fracture fluid 154 may be set to be about 150 psig, although greater or lesser pumping pressures are possible, e.g., depending on the maximum pressure rating of components of a given test system network 300, the type of fracture treatment being simulated, etc. Moreover, pumping pressure may vary during a given test procedure, e.g., with different stages of a proppant-laden test fracture fluid 154 that include different proppant concentrations and/or sizes, different base fluid composition, etc. It will be understood that pumping pressure may be limited to below the lowest pressure rating of the various interconnected conductor segments of test system network 300, and that pumping pressure may controlled by varying the pump rate and/or by back pressure applied to fluid exiting from the various conductor segments of test system network 300.

As shown in FIG. 3A, optional manifold 305 may be present between pump 304 and input conductor segment 352. Manifold 305 may be optionally present, for example, to provide additional connection points for connection to separate input conductor segments. Such additional input conductor segments may each in turn be connected to provide slurry to other subsidiary conductor segments to hat are separate and isolated from the interconnected conductor segments of network 300, or other subsidiary conductor segments that are interconnected with one or more conductor segments of network 300. In one embodiment, conductor segments of test system network 300 may be cylindrical tubing of different sizes as further described below and indicated in the legend of FIG. 3A. In this regard, exemplary lengths and outside diameters of conductor segments are described and illustrated in relation to FIG. 3A for example only, it being understood that conductor segments of greater or lesser lengths and/or of larger or smaller diameters may alternatively be employed. Although not required, use of clear tubing allows visual observation and tracking of fluid and/or proppant flow during a test procedure, as well as the deposited proppant distribution after completion of such a test procedure It will also be understood that any other type and/or shape of conductor segments may be employed for a test system network that is suitable for simulating flow of a proppant-laden fracture fluid through a fracture network, e.g., including non-cylindrical conductors (such as conductors having cross-sectional areas perpendicular to direction of flow that are oval shaped, square shaped, rectangular shaped, etc.), conductors having roughened internal diameter surface, etc. Examples of suitable conductor segments include, but are not limited to, conductor segments that define an internal flow space in the form of a slot within the fluid flow apparatus of FIGS. 8A-15D herein.

One exemplary embodiment of the configuration of FIG. 3A is explained below using the following example conductor segment dimensions (e.g., diameters and lengths), it being understood that these conductor segment dimensions are exemplary only and that any other suitable greater or lesser diameter and/or length of conductor segments (and/or combinations thereof) may be employed as desired or needed to meet the characteristics of a given test system application. For purposes of illustration, the example conductor segment dimensions may include a 1-inch inside diameter (I.D.) horizontal or substantially horizontal input conductor segment 352 that may be provided to simulate a horizontal wellbore that penetrates an underground formation in the manner of horizontal wellbore 107 of FIG. 1, although an input conductor segment may alternatively be configured with an I.D. that is greater than 1-inch, or that is less than 1-inch. Length of input conductor segment 352 may be about two feet in one embodiment, although greater or lesser lengths are also possible. As shown, input conductor segment 352 may be coupled between manifold 305 and a tee connection (e.g., integral or separate connector) that is oriented to provide an upward-extending ¾-inch I.D. primary conductor segment 370 of an upper section or network branch of the test system network 300 and an opposing downward-extending ¾-inch I.D. primary conductor segment 370 of a lower section or branch of test system network 300. Upward and downward-extending primary conductor segments 370 may be so configured to simulate primary fracture segments 120 that extend upward and downward at 90 degrees orientation from horizontal wellbore 107 of FIG. 1, it being understood that one or more primary conductor segments may be coupled to extend at angles other than 90 degrees (and/or directions other than upwards and downwards) from an input conductor segment, and that multiple primary conductor segments may be coupled to an input conductor segment in staggered or non-opposing relationship to each other. In this exemplary embodiment, length of each of ¾-inch I.D. primary conductor segments 370 may be about four feet as shown, although greater and lesser lengths of conductor segments 370 are possible and conductor segments 370 do not have to be the same length.

The example conductor segment dimensions of FIG. 3A include ½-inch I.D. secondary conductor segments 380 as they may be coupled to ¾-inch I.D. primary conductor segments 370, and ¼-inch I.D. tertiary conductor segments 381 as they may be coupled to ½-inch I.D. secondary conductor segments 380 to simulate various subsidiary facture segments 123 of FIG. 1. In one embodiment each of secondary conductor segments 380 include a secondary conductor segment 380 of about six feet in length that is coupled to the end of each of primary conductor segments 370 as shown, although greater and lesser lengths of conductor segments 380 are possible and conductor segments 380 do not have to be the same length as each other. Other secondary conductor segments 380 are coupled to extend sideways at 90 degrees from opposing sides of primary conductor segments 370 as shown. Secondary and tertiary conductor segments 380 and 381 may be so configured to simulate subsidiary fracture segments 123 of FIG. 1, it being understood that additional conductor segments of smaller diameter (e.g., less than ¼-inch I.D.) may be coupled to extend from tertiary conductor segments 381 in telescoping or tapered fashion.

Figure 3B:
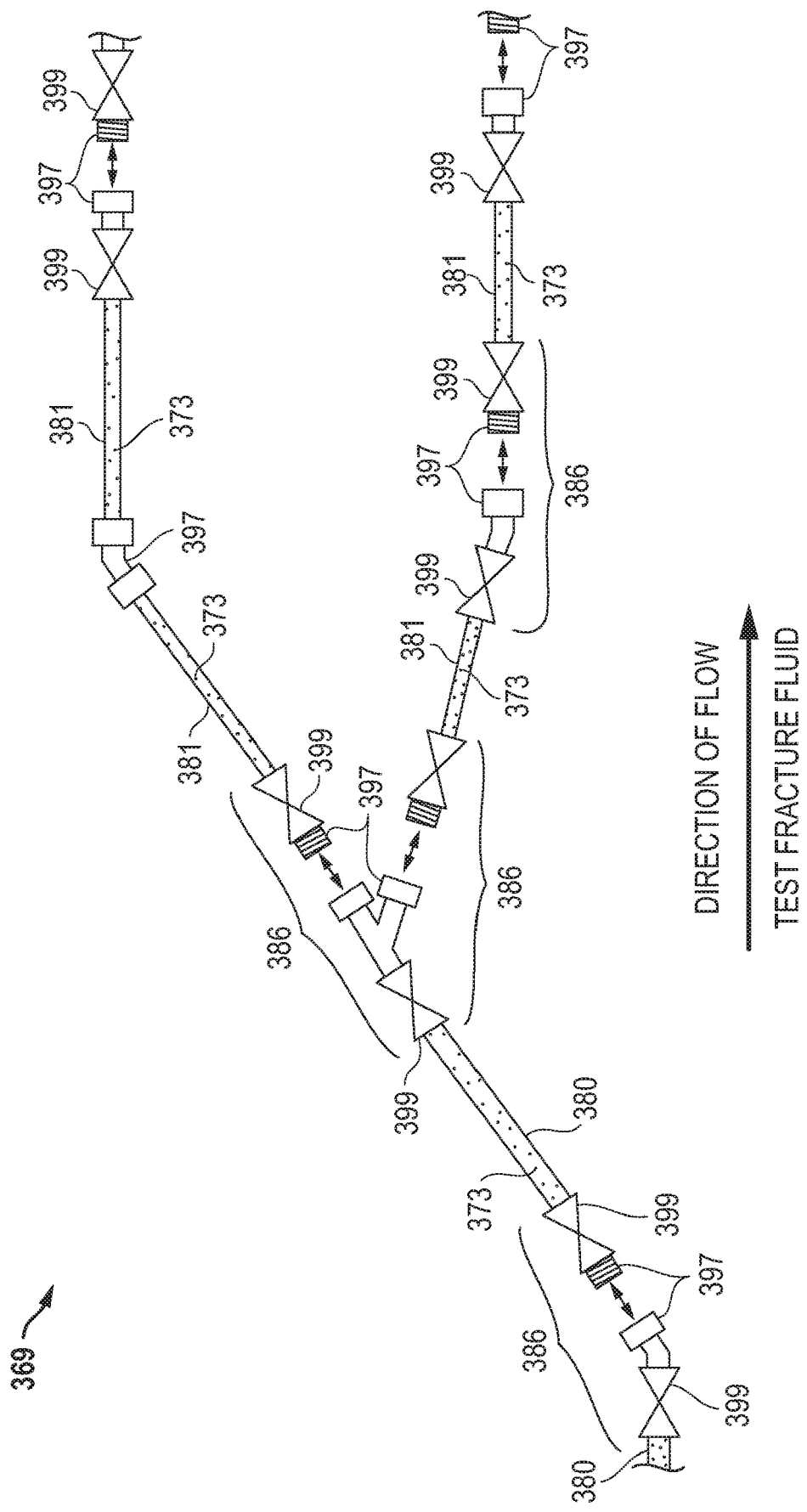
FIG. 3B illustrates conductor segments of a part of a test system network disassembled according to one exemplary embodiment of the disclosed methods and systems.

In the embodiment of FIG. 3A, automated or controllable (e.g., pneumatically or electrically actuated) valves 385 (e.g., ball or gate valves) are optionally coupled between conductor segments at selected locations for purposes of controlling (e.g., allowing, restricting or disallowing) fluid flow through a given conductor segment/s, e.g., in real time during flow of proppant-laden slurry through test system network 300. Also illustrated are tubing junctions in the form of valved connections 386 that are provided to couple together different conductor segments and/or to allow conductor segments to be added or removed to create different fracture network geometries. In one exemplary embodiment, each of valved connections 386 may optionally include a detachable connection 397 (e.g., threaded union, compression fitting, etc.) coupled between inline isolation valves 399 (e.g., manual or servo-actuated ball or gate valves, etc.) that are coupled at or near the end of each conductor segment as shown in FIG. 3B which illustrates a portion 369 of a test system network 300. As shown in FIG. 3B, angled connections 397 may be provided in one embodiment to couple two conductor segments together at any desired angle between greater than 0 degrees to less than 180 degrees.

As further shown in FIG. 3B, provision of valved connections 386 may be used in one embodiment to allow individual conductor segments (e.g., of test system network 300) to be detached from the other conductor segments with their respective isolation valves 399 closed for further analysis of their contents 373 (e.g., including deposited constituents of a test fluid such as proppant and accompanying fluid) that is left within an isolated space (or sample chamber) of each conductor segment between the closed valves 399 of the conductor segment following flow of a proppant-laden test fracture fluid 154 during a proppant test procedure. In this way, a single conductor segment or multiple segments isolated between valved connections 386 (or other suitable types of tubing junctions) may be removed and analyzed after flowing a test proppant slurry 303 through test system network 300. In one embodiment, proppant may be deposited within a given conductor segment during flow of the proppant slurry 303 through test system network 300. Afterwards, the disassembled conductor segment may be removed to allow sieve analysis of the contents to determine particle size distribution within the disassembled segment, viscosity of fluid (e.g., liquid) left within the disassembled segment, conductivity testing of the particular particle distribution deposited in each section, etc. It will be understood that similar analyses of the content of multiple conductor segments may be performed where multiple conductor segments are grouped together between valved connections 386 as shown in the upper right of FIG. 3B which represents a portion of a test system network 300 that has been disassembled as further described herein.

It will be understood that any suitable type of analysis may be performed on the contents 373 (e.g., deposited proppants and/or fluids) that remain in each isolated conductor segment or isolated group of conductor segments such as illustrated in FIG. 3B. Examples of such analyses include, but are not limited to, particle size and particle distribution testing, conductivity testing of deposited proppant and/or viscosity testing of remaining fluids (e.g., liquids) such as outlined in full evaluation per API RP 19C ("Recommended Practice for Measurement of Proppants Used in Hydraulic Fracturing and Gravel-packing Operations") and/or API RP 19D ("Recommended Practice for Measuring the Long-term Conductivity of Proppants"). Analyses may be so performed after pumping a full simulated fracture treatment through a test system network 300, or after pumping any fractional part of a full simulated fracture treatment that is stopped before the full treatment is pumped.

Figure 3C:
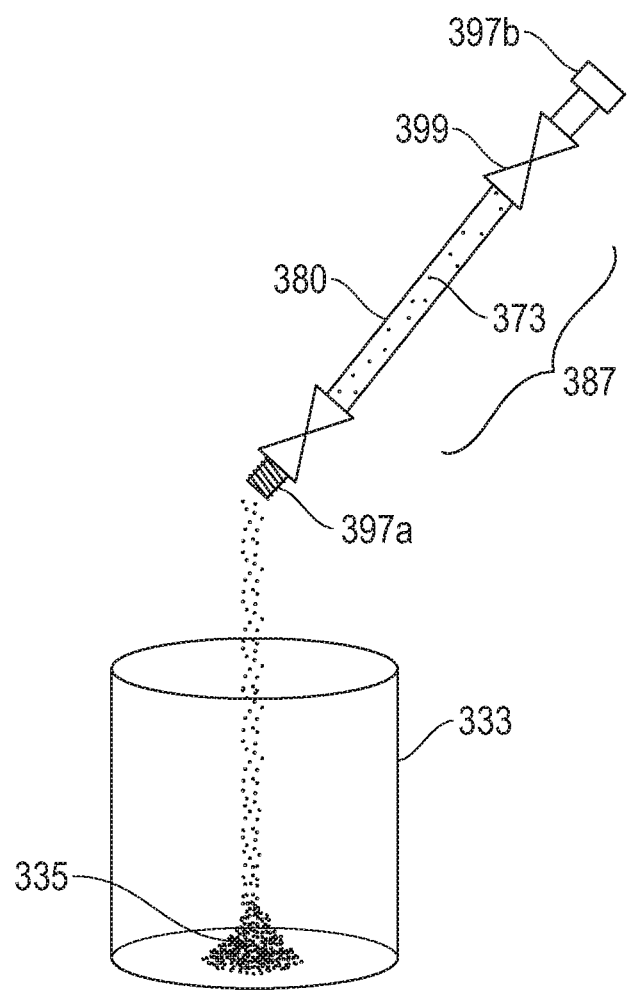
FIG. 3C illustrates removal of contents from inside a dissembled conductor segment according to one exemplary embodiment of the disclosed systems and methods.

In one exemplary embodiment, once pumping has stopped, suspended proppant may settle in each conductor segment or group of conductor segments. Isolation valves 399 may then be closed at each end of a conductor segment or group of interconnected conductor segments to isolate the contents 373 remaining within a sample chamber 387 defined in the space between two isolation valves 399. Detachable connections 397 on each side of each isolated conductor segment or isolated group of conductor segments may then be separated (e.g., unscrewed) to allow removal of the conductor segment/s together with the contents 373 isolated inside. At least one of the isolation valves 399 of each isolated conductor segment/s may then be opened to allow removal of contents 373 (e.g., isolated fluid and/or proppant particles) from the sample chamber 387 defined inside the conductor segment/s into a collection container 333 as illustrated in FIG. 3C. Analysis may then be performed on a weighed proppant sample 335 and/or fluid (e.g., liquid) of the removed contents 373 as described elsewhere herein. In this way, proppant pack characteristics (e.g., permeability, conductivity, particle distribution, etc.) as well fluid (e.g., liquid) viscosity and other fluid properties may be measured in different portions of a simulated proppant pack.

For example, four-stack long term conductivity and retained conductivity testing may be performed on a proppant sample 335 using an International Organization for Standardization (ISO) conductivity cell and ISO procedures 13503-5:2006E entitled "Procedures for Measuring the Long Term Conductivity of Proppants" which is incorporated herein by reference. One example of such a conductivity cell is described in U.S. Pat. No. 8,286,514, which is incorporated herein by reference in its entirety. In one embodiment, conductivity and permeability values may be determined according to the following relationships (it being understood that any other suitable methodology and/or relationships for determining conductivity and/or permeability may be alternatively employed in the practice of the disclosed methods and systems):

Conductivity: $kWf=26.78(\mu Q/\Delta P)$

Permeability: $k=321.4 \ \mu Q/[(\Delta P)Wf]$ where:
- k is the tested formation sample pack permeability, expressed in Darcy's;
- kWf is the tested formation sample pack conductivity, expressed in millidarcy-feet;
- $\mu$ is the viscosity of the test liquid at test temperature, expressed in centipoises;
- Q is the flowrate, expressed in cubic centimeters per minute;
- $\Delta P$ is the differential pressure, expressed in psi; and
- Wf is tested formation sample pack width, expressed in inches.

In another example, particles of a proppant sample 335 may be analyzed by passing particles of the proppant sample 335 through a stack of multiple screens or sieves (ordered from largest mesh size screen at the top to smallest mesh size screen at the bottom) to characterize the particles of the sample. Using this technique, properties such as particle size distribution, mean particle diameter, median particle diameter, etc. may be determined for a given proppant sample 335, for example, such as in a manner described in Chapter 26, pages 803-817, McCabe and Smith, Unit Operations of Chemical Engineering, Third Edition, 1976, which is incorporated herein by reference.

To illustrate, before pumping, a given proppant having a particular initial mean particle size distribution may yield an initial permeability at fracture base of 1000 millidarcies as measured at 1000 psi (or for example conductivity of 2 lb/ft$^2$) with a sieve analysis showing a particular initial distribution of different particle sizes. However, after pumping this proppant as part of a proppant-laden test fracture fluid 154 through a test system network 300, different mean particle distributions of the proppant may be deposited as a proppant pack at different points within different isolated conductor segments within the fracture network 300 (e.g., a given mean particle distribution of "x" may be deposited at the input of a primary conductor segment 370 while a mean particle distribution of 0.7x may be deposited at a secondary conductor segment 380 of the same fracture network 300, etc.). In this regard, the deposited proppant pack mean particle distribution within a given isolated conductor segment/s may vary as a function of its distance from input conductor segment 352, its orientation (e.g., angle from the horizontal), its internal size (e.g., diameter) and/or position relative to other conductor segments (e.g., primary, secondary, tertiary, etc.) within network 300, its proximity relative to any optional exit openings 351 or terminal screens 388, etc.

Thus, for example, the proppant pack deposited from the same proppant in an isolated conductor segment located at the simulated fracture tip (e.g., at the terminal end of an isolated tertiary conductor segment 381) may be found to have a different particle distribution and permeability (e.g., reduced to only 200 millidarcies as measured at 1000 psi, or for example conductivity of 0.2 lb/ft$^2$) than the initial measured fracture base particle distribution and 1000 millidarcies measured at 1000 psi (or conductivity of 2 lb/ft$^2$) described above. Deposited proppant pack properties and/or fluid (e.g., liquid) viscosity may be similarly tested in each of the isolated segments between the initial isolated conductor segment nearest to input conductor segment 352 and the isolated conductor segment/s furthest from input conductor segment 352, e.g., to arrive at a table of different permeabilities/conductivities, particle distributions and viscosities starting with that measured for the initial isolated conductor segment and measured for each isolated conductor segments between the initial conductor segment to the furthest from the input conductor segment 352. Results of such testing may be compared to predicted distribution, e.g. to allow non-API proppants to be tailor-designed for a given simulated subterranean formation. Further, proppant performance model simulations may be developed using the measured non-uniform nature of deposited proppant particle distribution, deposited proppant permeabilities/conductivities, fluid properties, etc. determined throughout the network 300, versus conventional models that assume non-varying homogenous proppant and fluid properties throughout the proppant pack from input to fracture tip of a fracture network.

Consequently, in one exemplary embodiment various proppants having different particle size distributions may be individually tested (e.g., with different base fluids) to determine which proppant and/or base fluid combination yields an optimum or otherwise desired permeability in a given configuration of test system network 300. Alternatively, a proppant-laden test fracture fluid 154 may be formulated from a given proppant and base fluid to simulate an actual fracture treatment that has already been performed on an actual underground or subterranean formation, e.g., for purposes of performance matching or evaluation of fracture treatment execution.

Figure 3D:
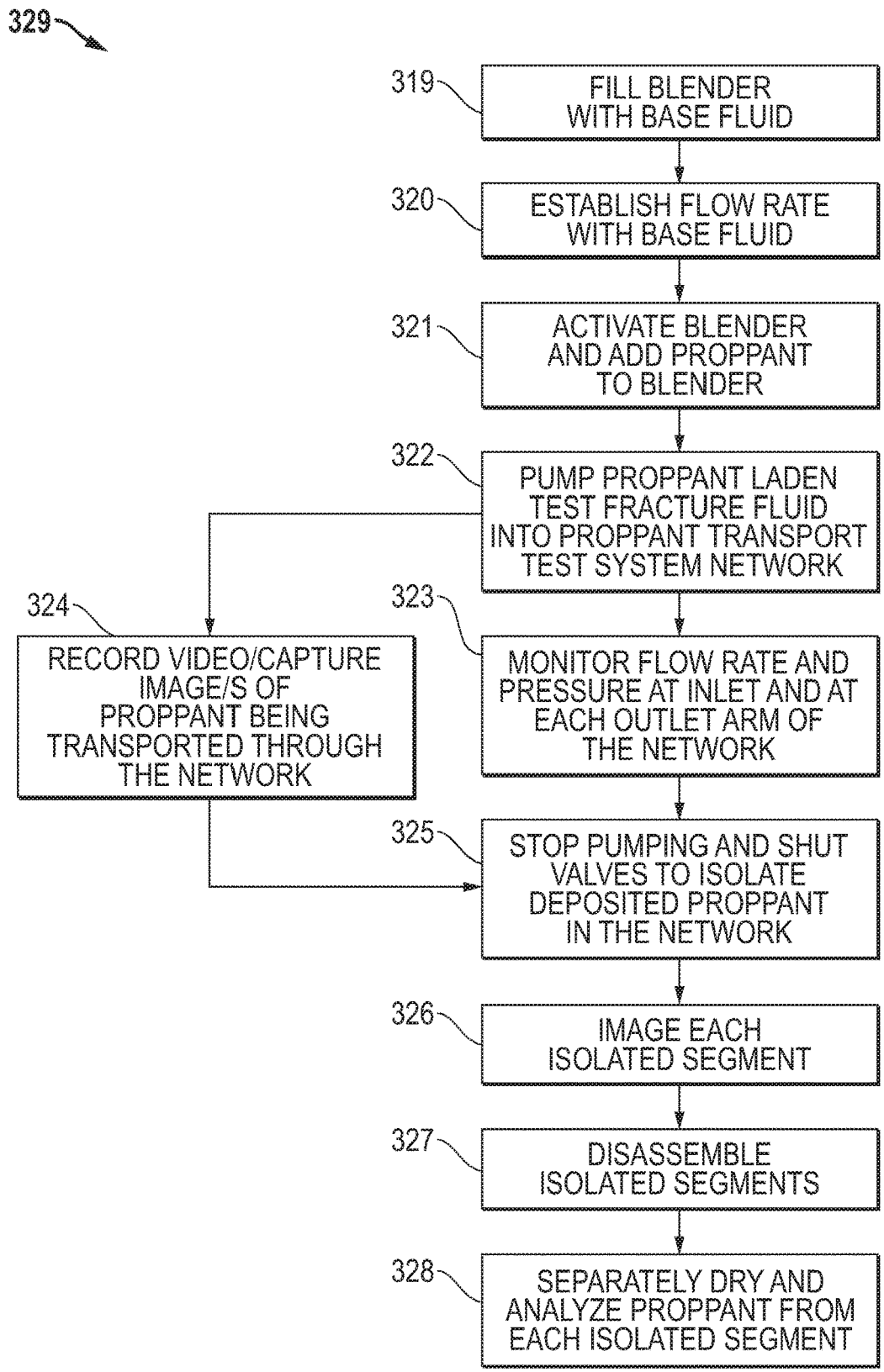
FIG. 3D illustrates methodology according to one exemplary embodiment of the disclosed systems and methods.

FIG. 3D illustrates one exemplary embodiment of test methodology 329 that may be performed to use a test system network 300 to simulate and analyze fluid and/or proppant transport through different segments of a fracture network created in an underground formation during a hydraulic fracturing treatment. As shown, methodology 329 begins in step 319 where blender 302 is filled with a determined amount of water (or any other base fluid) as specified for a given test treatment. Next, in step 320 centrifugal pump/s 301 and positive displacement pump/s 304 (e.g., triplex pump) are turned on to introduce base fluid only (i.e., without proppant) through a fluid conductor into a flow loop that includes test system network 300 (e.g., at a specified predetermined flow rate) as a pad to establish a baseline flow rate without proppant through test system network 300. During step 320, it is verified that all conductor segments of the network 300 are open to flow, and that all sensor/transducers are operating properly. After successful completion of step 320, the blender 302 is then activated in step 321 by turning on its paddles prior to any proppant entering the blender 302, and then a specified concentration and type of proppant to be tested is added to blender 302. Next in step 322, centrifugal pump/s 301 and positive displacement pump/s 304 (e.g., triplex pump) are operated to move the proppant and fluid mixture slurry 303 from blender 302 to positive displacement pump 304, and then from positive displacement pump 304 as a proppant-laden test fracture fluid 154 through a fluid conductor into the flow loop that includes test system network 300, e.g., at a specified predetermined flow rate. It will be understood that the fluid volume, proppant type, proppant concentration, and flow rate of a given proppant-laden test fracture fluid 154 into test system network 300 may be selected based on a number of factors, such as volume, diameter and pressure rating of components of test system network 300, type of underground formation being simulated, type and volume of actual full-size fracture treatment being simulated, identity of a particular sensitivity test fracture treatment run (e.g., economic and/or conductivity) being performed as part of a multi-test fracture treatment run analysis, etc. It is also possible to employ multiple blenders 302 and to pump multiple different stages of proppant-laden test fracture fluid 154 that each have different proppant concentration, proppant type, proppant size, etc.

In step 323, flow rate and pressure of fluid may be monitored during the test treatment at the inlet of the test system network 300, and flow rate and pressure of fluid may be monitored at each arm of network 300 (e.g., at the output of each arm), e.g., so that fluid leak-off and/or pressure drop in each arm may be monitored during the test treatment. At the same time, video (and/or still) images capturing the transport of proppant throughout test system network 300 may be optionally recorded in step 324, e.g., where at least a portion of the conductor segments of the network 300 are transparent or translucent. After all proppant has been pumped from blender 300, the tail end of proppant-laden test fracture fluid 154 may be optionally over displaced into and through input conductor segment/s of network 300 with proppant-free fluid.

After the test treatment is completed, pumping is stopped in step 325, and isolation valves then closed to prevent the deposited proppant from moving and to isolate the deposited proppant within at least a portion of the conductor segments of the test system network 300. Then in step 326, one or more isolated proppant-containing segments may be optionally video imaged and/or still picture imaged (e.g., where segments are transparent or translucent), and each segment disassembled from the test system network 300 piece by piece in step 327, e.g., such as shown in FIG. 3B. Then, in step 328 the contents 373 (e.g., deposited proppant and/or fluid) may be removed from one or more of the isolated segments for analysis as shown in FIG. 3C. For example, isolated deposited proppant that is removed from each given segment may be dried, and a particle size distribution test individually performed on the proppant removed from each given segment. From the varying particle distributions, conductivity testing may also be performed to demonstrate how flow capacity is placed in the system.

It will be understood that the methodology of FIG. 3D is exemplary only, and that any other combination of additional, fewer, re-ordered, and/or alternative steps may be employed that is suitable for using a test system network to simulate and analyze fluid and/or proppant transport through different segments of a fracture network created in an underground formation during a hydraulic fracturing treatment.

FIG. 4 illustrates one exemplary embodiment of a three dimensional test system network 400 as it may be configured in a laboratory environment with interconnected conductor segments of varying size and lengths to represent a relatively complex fracture network. As previously described, individual conductor segments may be made of clear tubing to allow visual observation of fluid and proppant flow by laboratory personnel during and after a fluid and/or proppant transport testing procedure. In this way, effectiveness of fracture treatment fluids and proppants may be evaluated, including how different types of proppants (e.g., white frac sand, light weight ceramic proppant, intermediate strength ceramic proppant, resin coated proppants, etc.) flow through a fracture network; how effectively or successfully is proppant being transported throughout the entire fracture network; how the density of proppants effect the flow within the fracture network; whether or not special or hybrid proppant (e.g., such as naturally buoyant proppant particles) successfully travels throughout the fracture segments of the fracture network; whether or not proppants segregate in the fracture network; what is the conductivity at different intervals within the fracture network, etc.

It will be understood that the network architecture and test methodology of interconnected fluid conductor segments of at least FIGS. 1B through 4 may be practiced or assembled in whole or in part using fluid flow apparatus conductor segment slots of any one or more of the fluid flow apparatus embodiments such as described in relation to FIGS. 8A-15D herein.

Figure 5:
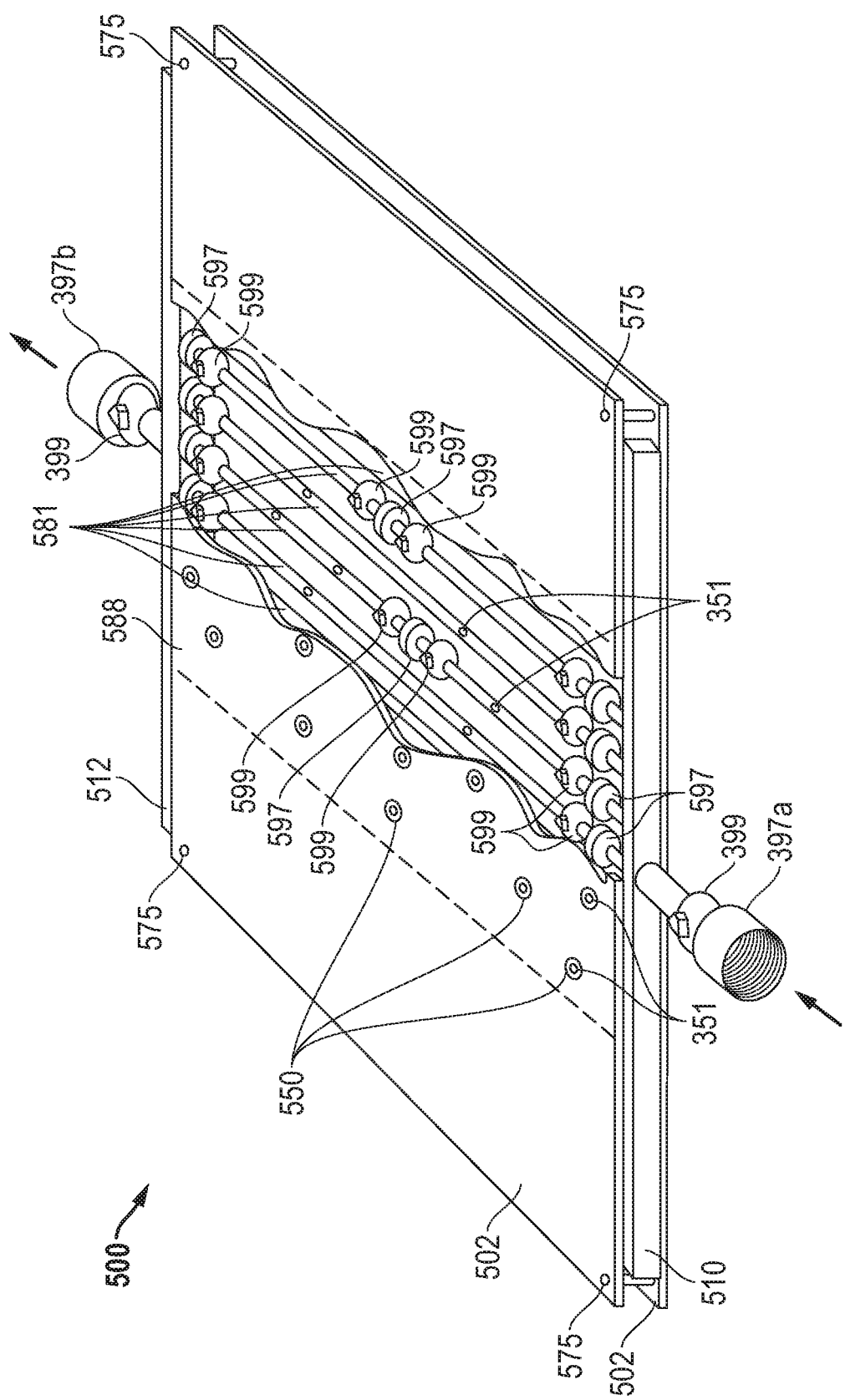
FIG. 5 is a cut-away perspective illustration of one exemplary embodiment of a segmented fracture test assembly according to one exemplary embodiment of the disclosed systems and methods.

FIG. 5 is a cut-away perspective illustration of one exemplary embodiment of a planar segmented fracture test assembly 500 that includes multiple side-by-side cylindrical conductor segments 581 that may be oriented parallel to each other and/or that may be of the same or different internal diameters as desired, and that are contained (e.g., sandwiched) between two opposing planar plates 502 (e.g., plastic or metal plates) that simulate a formation rock. Thus, in one embodiment all of the cylindrical conductor segments 581 may have the same internal diameter, while in another embodiment one or more of the cylindrical conductor segments 581 may have an internal diameter this is different from at least one (and in one embodiment all) of the other cylindrical conductor segments 581. In the illustrated embodiment, the multiple side-by-side conductor segments of assembly 500 are shown spaced apart for ease of illustration, it being understood that multiple side-by-side conductor segments of assembly 500 may be alternatively may be positioned to touch or contact each other, or alternatively may be closely spaced in adjacent relationship (e.g., spaced apart from each other at a distance less than the internal radius of each of the multiple cylindrical conductor elements of the test sub-assembly 500). As shown, the multiple conductor segments of assembly 500 are in this embodiment oriented and contained together within a common plane. Such an embodiment may be employed, for example, to model or simulate slot flow of fracture fluid and proppant in different sub-segments (e.g., linear slices or small cores) of a larger fracture conduit that may be created or otherwise exist (e.g., as a natural fracture) in a subterranean formation during a hydraulic fracture treatment. It will also be understood that non-cylindrical conductor segments may alternatively employed in place of cylindrical conductor segments 581, e.g., such as conductor segments having cross-sectional areas perpendicular to direction of flow that are oval-shaped, square-shaped, rectangular-shaped, etc.

Figure 7:
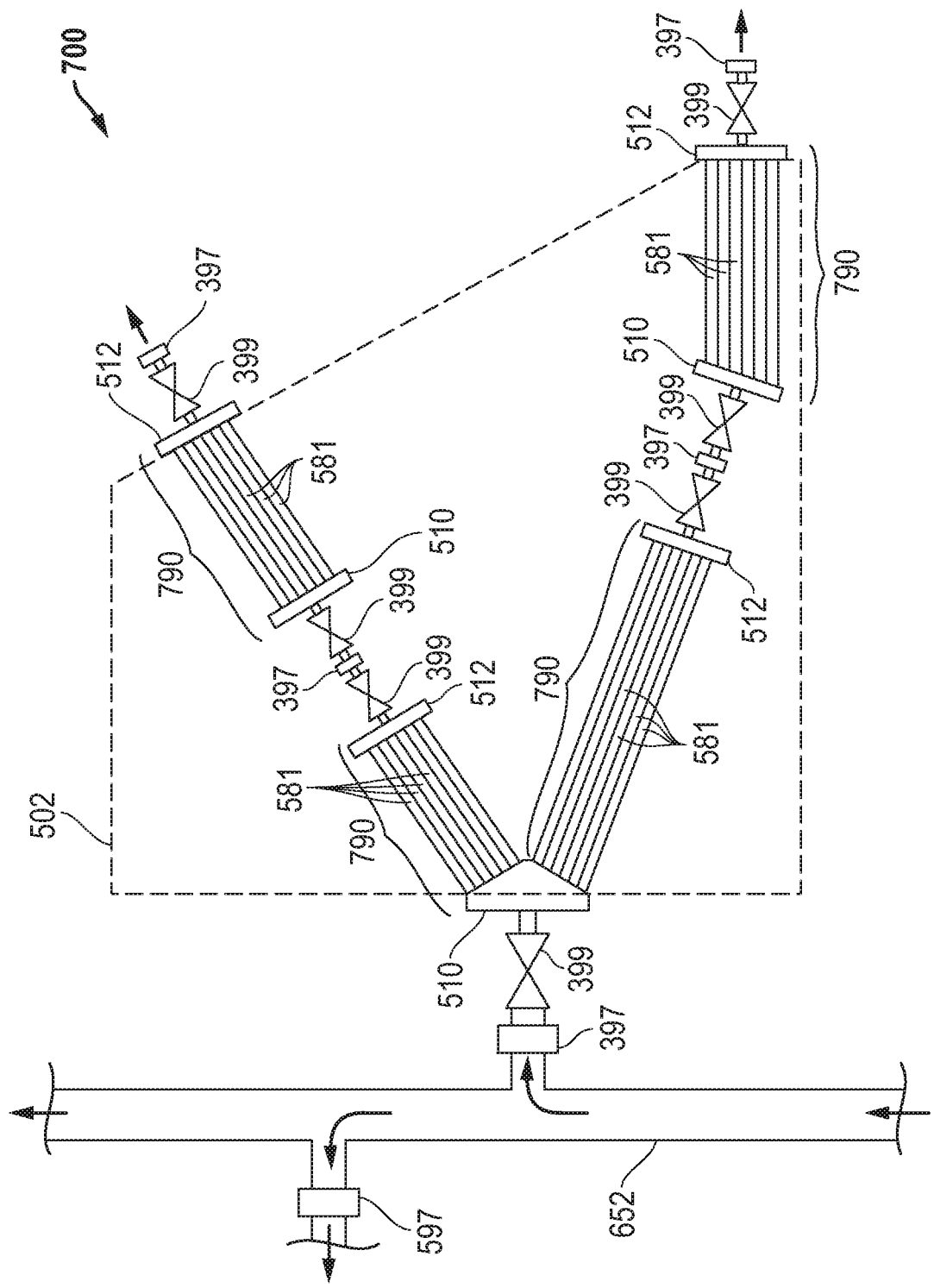
FIG. 7 illustrates conductor segments of a part of a test system network according to one exemplary embodiment of the disclosed methods and systems.

In one embodiment, one or more such fracture test assemblies 500 may be coupled as sub-assemblies within a test system network 300 in a variety of ways, e.g., such as coupled into network 300 as sub-assemblies in the place of individual (stand-alone) conductor segments (e.g., such as segments 370, 380, 381) so as to better evaluate fluid and proppant flow within particular parts of a network 300. Alternatively, an entire network may be constructed of multiple segmented test sub-assemblies 500 coupled together in one or more planes and/or at one or more angles relative to each other, e.g., such as illustrated in the portion of a test system network 700 embodiment illustrated in FIG. 7. Further as illustrated in FIG. 7, plates 502 are optional but may be present to provide structural support for the individual internal conductor segments 581 contained therebetween.

Still referring to FIG. 5, each of conductor segments 581 may be constructed and configured, for example, in a manner using materials, components and features similar to other conductor segments described herein, e.g., including optional leak-off ports 351 and/or internal detachable connections 397 and isolation valves 399 in one or more of the individual segments 581 as shown. In one embodiment, each of conductor segments 581 and plates 502 may be optionally transparent or translucent to allow flow of proppant to be visually monitored during introduction and parallel flow of a proppant-laden test fracture fluid 154 through the multiple conductor segments 581 of assembly 500 in the direction of the arrows. In one embodiment, all of conductor segments 581 of assembly 500 may have the same internal diameter or cross-sectional flow area. In another embodiment, one or more conductor segments 581 of assembly 500 may have different internal diameter or cross-sectional flow area than one or more other conductor segments of assembly 500. For example, cross-sectional flow area of one or more conductor segments 581 that are located at the center of assembly 500 may be larger than cross-sectional flow area of one or more conductor segments 581 that are located at the edges of assembly 500, e.g., to simulate a non-uniform fracture geometry.

In the illustrated embodiment of FIG. 5, a leak-off area 588 is optionally defined for assembly 500 in the area of assembly 500 delineated between the dashed lines, and represents an area in which the internal conductor segments 581 are provided with leak-off ports 351 that may be employed in a manner as previously described herein. As shown, leak-off access apertures 550 are also defined within at least one of plates 502 in locations aligned with and corresponding to the location of leak-off ports 351 defined in conductor segments 581, i.e., to allow access for connection from outside assembly 500 to the leak-off ports 351. Other similar access apertures (not shown) may be defined within at least one of plates 502 for mechanical access to valve stems of valves 597 and/or for routing of control wires to optional valve actuators in an embodiment where valves 597 are automatic valves. Also possible are one or more optional sensors (such as described elsewhere herein) that may be present between plates 502 to monitor or otherwise sense characteristics of fluid and/or proppant at one or more locations within internal conductor segments 581. An input manifold 510 is provided as shown for distributing incoming proppant laden test fluid 154 to the multiple parallel conductor segments 581, and an output manifold 512 is provided for receiving outgoing proppant laden test fluid 154 from the multiple parallel conductor segments 581. Detachable (e.g., internally and/or externally threaded) connection components 397a and 397b, and isolation valves 399 may be provided on input and output sides of assembly 500 as shown to allow for coupling to other conductor segments of a network 300, and/or to provide isolation and analysis of deposited proppant and fluids within assembly 500 as a whole following the test procedure in a manner as previously described.

As further shown in cut-away of FIG. 5, each of the individual internal conductor segments 581 between plates 502 may be itself coupled between input manifold 510 and output manifold 512 with respective isolation valves 599 to allow for removal of each segment 581 together with its isolated contents for analysis after flow testing. As further shown, optional inline isolation valves 599 and connectors 597 may be provided within a given conductor segment 581 to allow isolation and testing of the contents of sections of a given conductor segment 581. Plates 502 may be held together around the internal conductor segments 581 in any suitable manner, e.g., such as using removable bolts, screws or other fasteners 575 or other suitable manner. In the illustrated embodiment, plates 502 may be separated by removing fasteners 575 to access and dissemble internal conductor segments 581, e.g., for analysis of contents 373 after testing. In one exemplary embodiment, isolation valves 599 may be remotely controllable valves (e.g., electrical-actuated, hydraulic actuated, pneumatic-actuated, or via manual valve stem extending outside plate/s 502) in order to allow isolation of proppant and fluid contents within individual segments 581 and sub-segments thereof immediately at termination of pumping of a proppant-laden test fracture fluid 154. Relative size (e.g., footprint) and cross-sectional flow area of a segmented fracture test assembly 500 may vary according to the characteristics of a given application.

For purposes of illustration only, in one exemplary embodiment length of test assembly 500 (from inlet manifold 510 to outlet manifold 512) may be about 4 feet, side-to-side width of test assembly 500 (from leftmost conductor segment 581 to rightmost conductor segment 581) may be about 2 feet. and each conductor segment 581 may be cylindrical tubing having an internal diameter of about ¼ inch. However, greater and lesser test assembly widths and/or lengths, as well as greater and lesser values of conductor segment diameter or cross-section flow area are also possible. It is also optionally possible that different conductor segments 581 of the same segmented fracture test assembly 500 may have different internal diameters or cross-sectional flow areas from each other. The number of conductor segments 581 provided between inlet and outlet manifolds of a segmented fracture test assembly with or without plates 502 (e.g., as shown in FIG. 7) may also vary to be greater or lesser than shown in the figures herein. For example, the total number of conductor segments 581 coupled between inlet and outlet manifolds of a segmented fracture test assembly may in one embodiment be two or more conductor segments 581, alternatively may be five or more conductor segments 581, further alternatively may be from 2 to 30 conductor segments 581, further alternatively may be from 5 to 25 conductor segments 581, and further alternatively may be from 10 to 20 conductor segments 581, although the number of conductor segments may also exceed 30 conductor segments 581 for a given segmented fracture test assembly 500.

Figure 6:
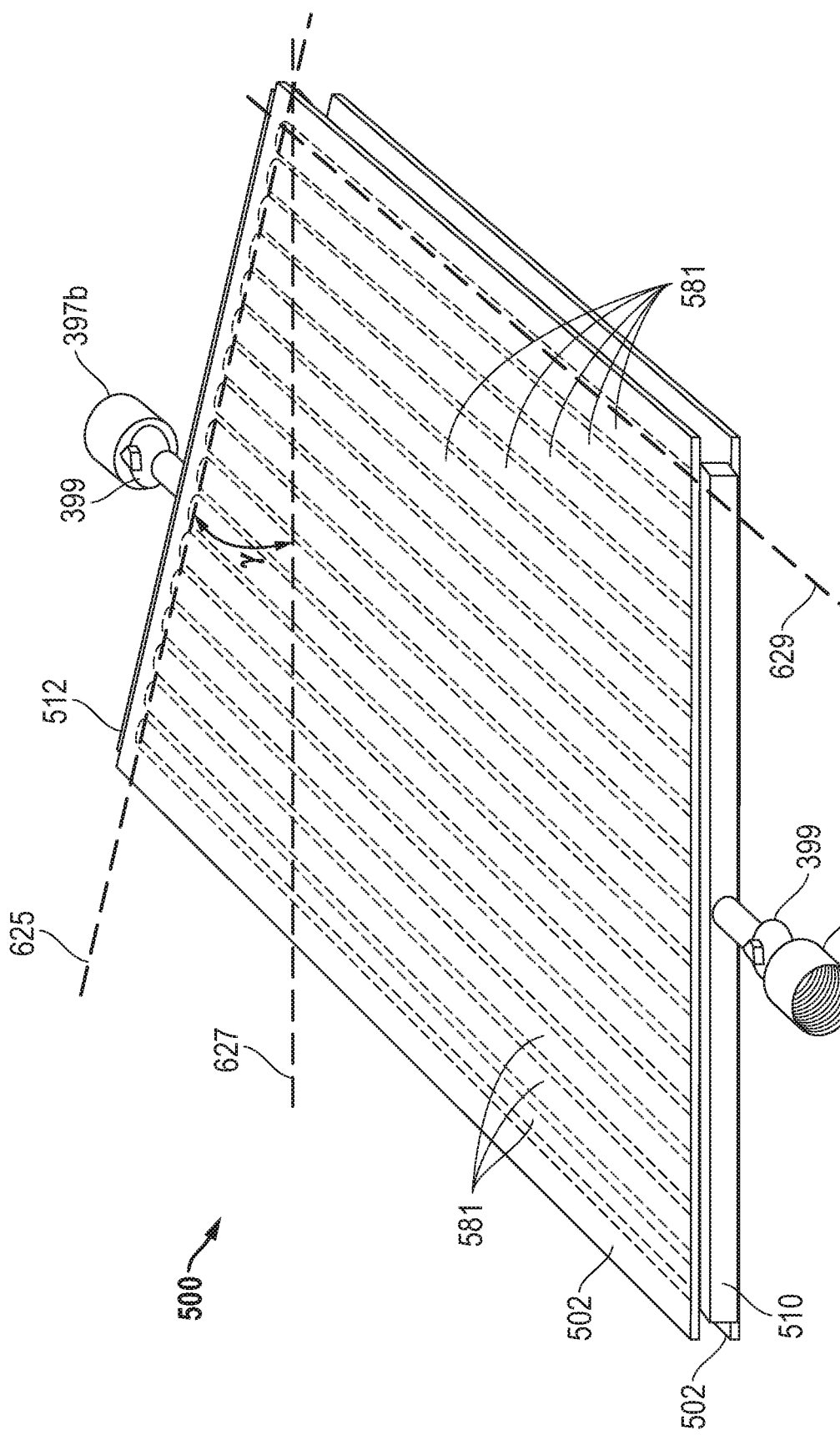
FIG. 6 illustrates a perspective view of a segmented fracture test assembly according to another exemplary embodiment of the disclosed systems and methods.

FIG. 6 illustrates a perspective view of another exemplary embodiment of a segmented fracture test assembly 600 that includes multiple conductor segments 581 that are also contained between two opposing plates 502, and which may in one embodiment have dimensions similar to that described in FIG. 5. However, in this embodiment, no leak-off ports 351 are provided. In the embodiment of FIG. 6, length of individual conductor segments 581 varies in a graded manner from one side to another, so that a line 625 formed by the outlets of conductor segments 581 (and in this case output manifold 512) are oriented at an acute angle γ relative to a line 627 that is perpendicular to the linear axes 629 of the individual conductor segments 581 (and in this case input manifold 510) as shown. Acute angle γ may be any magnitude of angle that is suitable for a given application, but may in one embodiment be from greater than 0° to about 30°, alternatively from greater than 0° to about 15°, and further alternatively from about 15° to about 30°, although values of acute angle γ greater than 30° are also possible. It will be understood in other embodiments the lengths of individual conductor segments 581 may vary so that a line formed by the inlets of conductor segments 581 (and in this case input manifold 510) are also (or alternatively) oriented at an acute angle γ relative to a line that is perpendicular to the linear axes 629 of the individual conductor segments 581.

FIG. 7 illustrates an overhead view of another exemplary embodiment of a portion of a test system network 700 including segmented fracture test assemblies 790 that each may or may not include surrounding plates 502 (e.g., shown in dashed outline). In this embodiment the illustrated segmented test assembly includes multiple test system sub-assemblies 790 of conductor segments 581 disposed between corresponding input and output manifolds 510 and 512 that are coupled together between isolation valves 599 and connectors 597. Each of sub-assemblies 790 may be configured, for example, similar to assemblies 500 or 600 of FIGS. 5 and 6. As shown, each of sub-assemblies may be oriented at different angles to each other, e.g., by virtue of angle manifolds 510 or 512, and/or graded length of conductor segments 581 within a given sub-assembly 790. In the embodiment of FIG. 7, the segmented test assembly is oriented to be within a horizontal plane in order to simulate a planar horizontal fracture that extends laterally from an input conductor segment 652 that is provided to simulate a horizontal wellbore. As shown in FIG. 7, the segmented fracture test assembly of FIG. 7 may form one part of a test system network 700 that may include other test system assemblies or conductor segments that may be coupled to extend from other outputs of input conductor segment 652 as shown. In another embodiment, an entire test system network may be configured from a segmented fracture test assembly that may include multiple sub-assemblies.

Figure 8A:
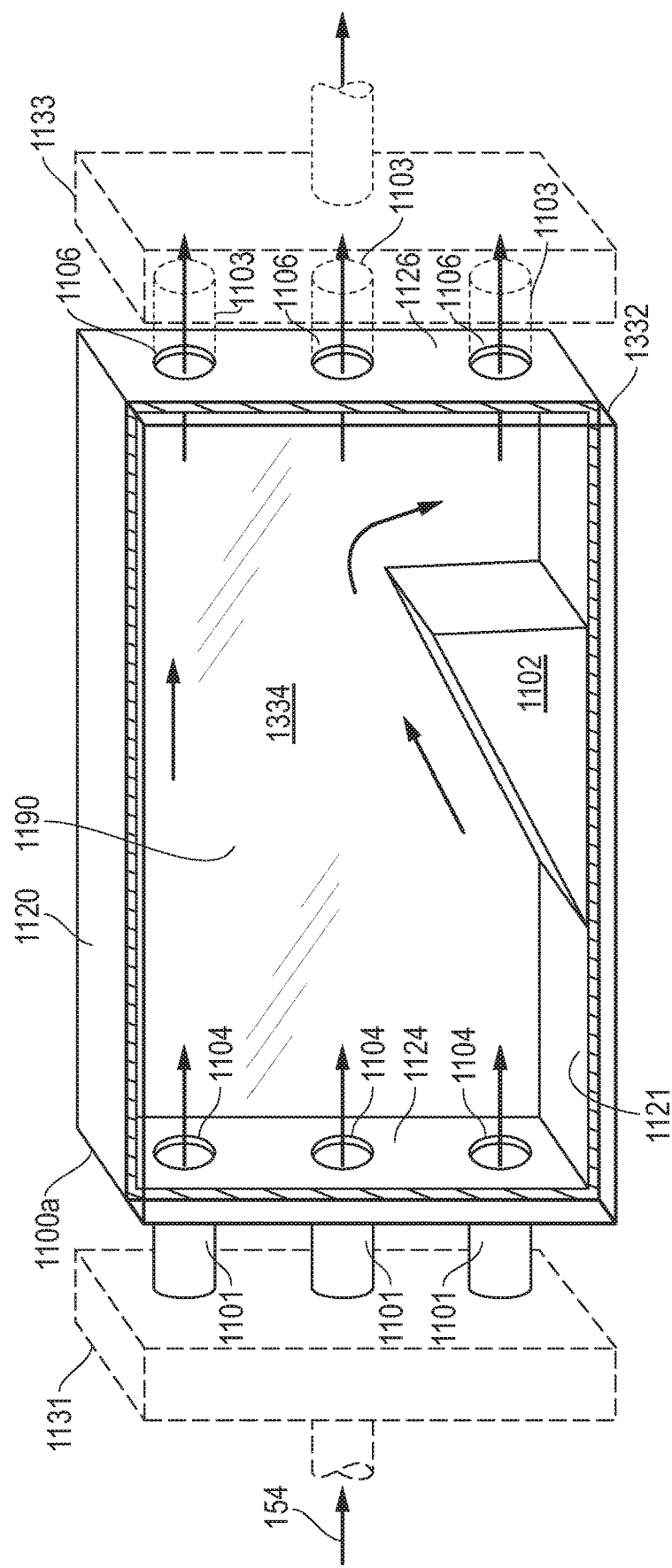
FIG. 8A illustrates a side perspective view of a fluid flow apparatus according to one exemplary embodiment of the disclosed apparatus and methods.

FIG. 8A illustrates a side perspective view of one exemplary embodiment of a fluid flow apparatus 1100a having a conductor segment defining an internal cavity or space therein in the form of an internal slot 1190 within apparatus 1100a for receiving a test fluid 154 (e.g., proppant-laden test fracture fluid, test fluid with no proppant, etc.) that is introduced into slot 1190 through multiple fluid inlets 1104 provided at a first end 1124 of apparatus 1100a as shown by the arrows. Each of fluid inlets 1104 may be, for example, an opening defined in first end 1124 of slot 1190 that may be coupled to an inlet conduit 1101 (e.g., pipe or tubing) to receive introduced test fracture fluid 154 from a suitable test fluid source, such as is illustrated and described further herein in relation to FIG. 3A or FIG. 16. In this embodiment, multiple fluid outlets 1106 are opening defined in the opposite second end of slot 1190 to allow fluid to be expelled from slot 1190 (e.g., via optional exit conduits 1103) during testing as shown by the arrows. Although fluid flow apparatus 1100a of FIG. 8A has three fluid inlets 1104 and three fluid outlets 1106, it will be understood that a fluid flow apparatus may be configured with any number of one or more fluid inlets 1104 and one or more fluid outlets 1106, and that the number of fluid inlets 1104 does not need to be the same as the number of fluid outlets 1106. Moreover, a given fluid inlet 1104 or fluid outlet 1106 may be defined at any location on an end of a fluid flow apparatus, and spacing between pairs of multiple inlets 1104 and/or pairs of multiple outlets 1106 does not have to be regular, but rather the interval between different outlet or inlet pairs may be different from other pairs defined in the same end of a given fluid flow apparatus. It will be understood that when present, multiple inlets 1104 may be coupled in one embodiment to receive incoming fluid from an optional common inlet manifold 1131 shown in this figure in dashed outline, and/or that multiple outlets 1106 may be coupled to dispel outgoing fluid into an optional common exit manifold 1133 shown in this figure in dashed outline.

In the embodiment of FIG. 8A, slot 1190 is a fluid-sealed internal flow space having a non-consistent cross-sectional flow area that is defined between internal surfaces of opposing first and second sides 1332 and 1334, first end 1124, second end 1126, and first edge 1120 and second edge 1121 which form the walls of fluid flow apparatus 1100a. In one embodiment, first and second sides 1332 and 1334, first end 1124, second end 1126, and first edge 1120 and second edge 1121 of fluid flow apparatus 1100a may be individual plates that are coupled together to form a leak-proof cavity of slot 1190 in any suitable manner, e.g., using any one or more of sealing technologies such as gaskets, adhesives, fasteners, etc. It will also be understood that one or more sides, ends, second edge and/or first edge of a fluid flow apparatus may instead be integral to each other rather than separate components that are coupled together, e.g., such as a slot 1190 that is integrally formed as a cavity or space within a solid block by machining, or when two or more of sides, ends, second edge and/or first edge of fluid flow apparatus are formed together as a single piece by molding or casting, in which case shape of internal slot 1190 may have rounded or irregular internal corners or other shape. It will also be understood that one of walls 1332, 1334, 1124, 1126, 1120 or 1121 may be optional and may not be present in an alternative embodiment where it is oriented upward during flow testing such that test fracture fluid 154 is allowed to flow across slot 1190 only under influence of hydraulic head created by introduction of fluid 154 into fluid inlets 1104. In such an alternative embodiment the upward-facing wall of fluid flow apparatus 1100a may be open to the atmosphere, and fluid contained therein by gravity which acts in the downward "Y" axis direction in the illustration of the Figures.

In some embodiments, one or more of sides, ends, second edge and/or first edge of a fluid flow apparatus may be at least partially transparent, e.g., to allow the internal space and contents of internal slot 1190 to be observed from outside of apparatus 1100a. For example, in the illustrated embodiment of FIG. 8A, first side 1332 is a transparent first plate that faces the viewer of FIG. 8A, while second side 1334 is a second plate that may or may not be similarly transparent. Each of ends 1124 and 1126, first edge 1120 and second edge 1121 of apparatus 1100a may or may not be transparent. Although first side 1332 of apparatus 1100a is illustrated as being a completely transparent plate, it will be understood that any given side, end, first edge and/or second edge of a fluid flow apparatus may alternatively be provided with one or more sections (e.g., windows) that are transparent. Examples of transparent materials that may be employed to construct one or more of sides 1332 and 1334, ends 1124 and 1126, first edge 1120 and/or second edge 1121 of apparatus 1100a include, but are not limited to, glass, cast polycarbonate (e.g., LEXAN™), acrylic or PLEXIGLAS®, etc. Examples of non-transparent materials that may be employed to construct one or more of sides 1332 and 1334, ends 1124 and 1126, first edge 1120 and/or second edge 1121 of apparatus 1100a include, but are not limited to, metals such as aluminum or stainless steel, fiberglass, etc.).

In some embodiments, two or more transparent or non-transparent walls of a fluid flow apparatus may be formed integral to each other as a single piece, e.g., by injection molding, casting, etc. For example, in one exemplary embodiment, side 1334, ends 1124 and 1126, first edge 1120, and second edge 1121 of fluid flow apparatus 1100 may be cast as a single piece of polycarbonate having inlet/s 1104, outlet/s 1106 and an internal slot 1190 with an open side for receiving side 1332 as a separate piece in sealing relationship, e.g., with peripheral sealing gasket between side 1332 and the remaining walls 1124, 1126, 1120 and 1121. In another exemplary embodiment, all walls 1332, 1334, 1124, 1126, 1120 and 1121 may be formed together as a single integral piece having internal slot 1190 with inlet/s 1104 and outlet/s 1106. In this regard, it will be understood that the particular configuration and construction of a given fluid flow apparatus may be selected to create a conductor segment having slot walls capable of withstanding a desired internal pressure during fluid flow testing. For example, in one embodiment, a fluid flow apparatus may be configured with slot walls that are capable of withstanding and containing from greater than 0 psig to about 150 psig fluid pressure (alternatively from greater than 0 psig to about 100 psig fluid pressure during a fluid flow test), although a fluid flow apparatus may be configured with slot walls that are capable of withstanding and containing a fluid pressure greater than 150 psig or greater than 100 psig in other embodiments. As described elsewhere herein, a fluid flow apparatus may also be configured in one embodiment with slot walls capable of withstanding hydraulic head at atmospheric pressure, e.g., having no upward-facing wall but instead an open top.

Still referring to the embodiment of FIG. 8A, spaced-apart first and second sides 1332 and 1334 may in one embodiment each be a plate having a planar (e.g., flat and smooth) internal surface that faces inward toward slot 1190 defined between the first and second sides 1332 and 1334. As shown, the plane of each of first and second sides 1332 and 1334 may also be oriented parallel to each other to form a rectangular-shaped cavity or space for slot 1190. A triangular-shaped structure 1102 (e.g., solid or hollow block of metal, wood, plastic, fiberglass, etc.) is fixed in position within the conductor segment slot 1190 to form an internal flow diversion feature to at least partially block or restrict the fluid flow path across slot 1190 as shown by the arrows from inlets 1104 to outlets 1106 so as to alter the direction of at least a portion of the fluid flow direction from inlet/s 1104 to outlet/s 1106 of the slot 1190 as shown by the arrows. In this embodiment, triangular-shaped structure 1102 is positioned in contact with second edge 1121 of apparatus 1100*a* to block fluid flow between triangular-shaped structure 1102 and second edge 1121 of apparatus 1100*a*. Structure 1102 also extends completely across slot 1190 to contact both first side 1332 and second side 1334 of apparatus 1100*a* as shown to block fluid flow around structure 1102 between structure 1102 and first side 1332 and second side 1334 of apparatus 1100*a*. In such a configuration, structure 1102 is positioned to divert introduced fluid 154 up and over structure 1102 as it flows from across slot 1190 from inlets 1104 to 1106 as shown by the arrows, which may also alter proppant deposition pattern within slot 1190 during fluid flow and/or after introduction of fluid 154 into apparatus 1100*a* ceases.

Figure 8B:
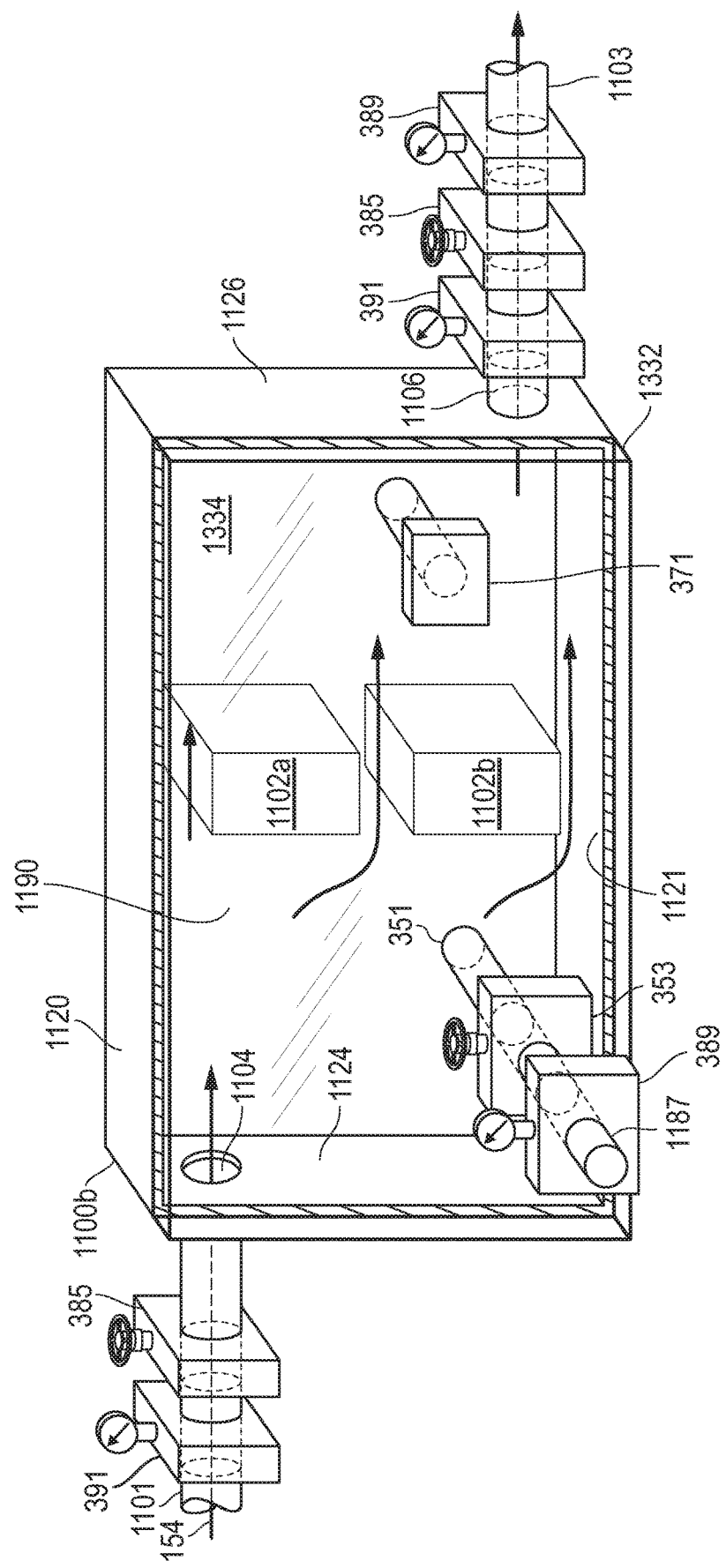
FIG. 8B illustrates a side perspective view of a fluid flow apparatus according to one exemplary embodiment of the disclosed apparatus and methods.

Although FIG. 8A illustrates an embodiment having a single fluid diversion feature 1102 positioned within an internal slot 1190 of a fluid flow apparatus, multiple fluid diversion features 1102 may be similarly positioned within a flow apparatus. As an example, FIG. 8B illustrates a side perspective view of another exemplary embodiment of a fluid flow apparatus 1100*b* that may be constructed with an internal slot 1190 in a similar manner as described for apparatus 1100*a*. Moreover, apparatus 1100*b* of FIG. 8B has a single fluid inlet 1104 defined in a first end 1124 of apparatus 1100*b*, and a single fluid outlet 1106 is defined in the opposite second end of apparatus 1100*b*. Thus, it will be understood that the number and location of fluid inlets 1104 and fluid outlets 1106 defined in the walls of a given fluid flow apparatus may vary as needed or desired to fit the characteristics of a particular testing application.

As shown in FIG. 8B, two rectangular-shaped structures 1102*a* and 1102*b* (e.g., solid or hollow block of metal, wood, plastic, fiberglass, etc.) are fixed in position within slot 1190 to form internal flow diversion features that at least partially block or restrict the fluid flow path across slot 1190 as shown by the arrows from inlets 1104 to outlets 1106 of apparatus 1100*b*. In this embodiment, neither of structures 1102*a* and 1102*b* is positioned in contact with second edge 1121 of apparatus 1100*b*. However, each of structures 1102*a* and 1102*b* extends completely across slot 1190 of apparatus 1100*b* to contact both first side 1332 and second side 1334 of apparatus 1100*b* as shown to block fluid flow around each of structures 1102*a* and 1102*b* between structures 1102*a* and 1102*b* and first side 1332 and second side 1334, e.g., each of structures 1102*a* and 1102*b* may be fixedly attached to (or formed integral with) one or both of sides 1332 and/or 1334 to suspend the respective structure in place within slot 1190 of apparatus 1100*b*. In such a configuration, each of structures 1102*a* and 1102*b* is positioned to divert introduced fluid 154 around (above and below) itself as introduced fluid 154 flows across slot 1190 as shown by the arrows from inlets 1104 to outlets 1106, which may also alter proppant deposition pattern within slot 1190 during fluid flow and/or after introduction of fluid 154 into apparatus 1100*a* ceases. A structure 1102 may also be suspended from first edge 1120 of a fluid flow apparatus into internal slot 1190 in one embodiment.

As shown in the embodiment of FIG. 8B, optional valves 385 may be provided on each inlet conduit 1101 and each exit conduit 1103 of any given fluid flow apparatus. Also shown in FIG. 8B are optional flow meters 389 and pressure gauges (or alternatively pressure sensors or transducers) 391 that may be present to monitor fluid flow and/or pressure at inlets 1104 and/or outlets 1106, e.g., in a manner as described elsewhere herein. FIG. 8B also illustrates a controllable "leak off" port 351 (e.g., fluid opening) with fluid exit conduit 1187 as may be defined at one or more selected locations within one or more walls of a fluid flow apparatus for purposes of simulating fluid leak off into the formation during a fracture treatment, e.g., in a manner as previously described elsewhere herein. As shown, an optional valve 353 may be provided for controlling leak off rate, and optional flow meter 389 may be present for monitoring leak off rate from slot 1190 of apparatus 1120 during test fluid flow through slot 1190. In one embodiment flow meters 389, pressure gauges (or sensors or transducers) 391, valves 353 and/or 385 may be of the same type as previously described, and may be provided and operated in any number and/or location of one or more fluid flow apparatus, e.g., in a manner such as illustrated and described in relation to FIG. 3A herein to control back pressure or flow rate (and/or to monitor conditions such as pressure drop (ΔP), flow rates, leak-off rates, etc.) in a given fluid flow apparatus or at any given point/s within a flow path through multiple fluid flow apparatus, e.g., such as an arm section of a test system network created by interconnected conductor segment slots of multiple fluid flow apparatus.

Figure 14A:
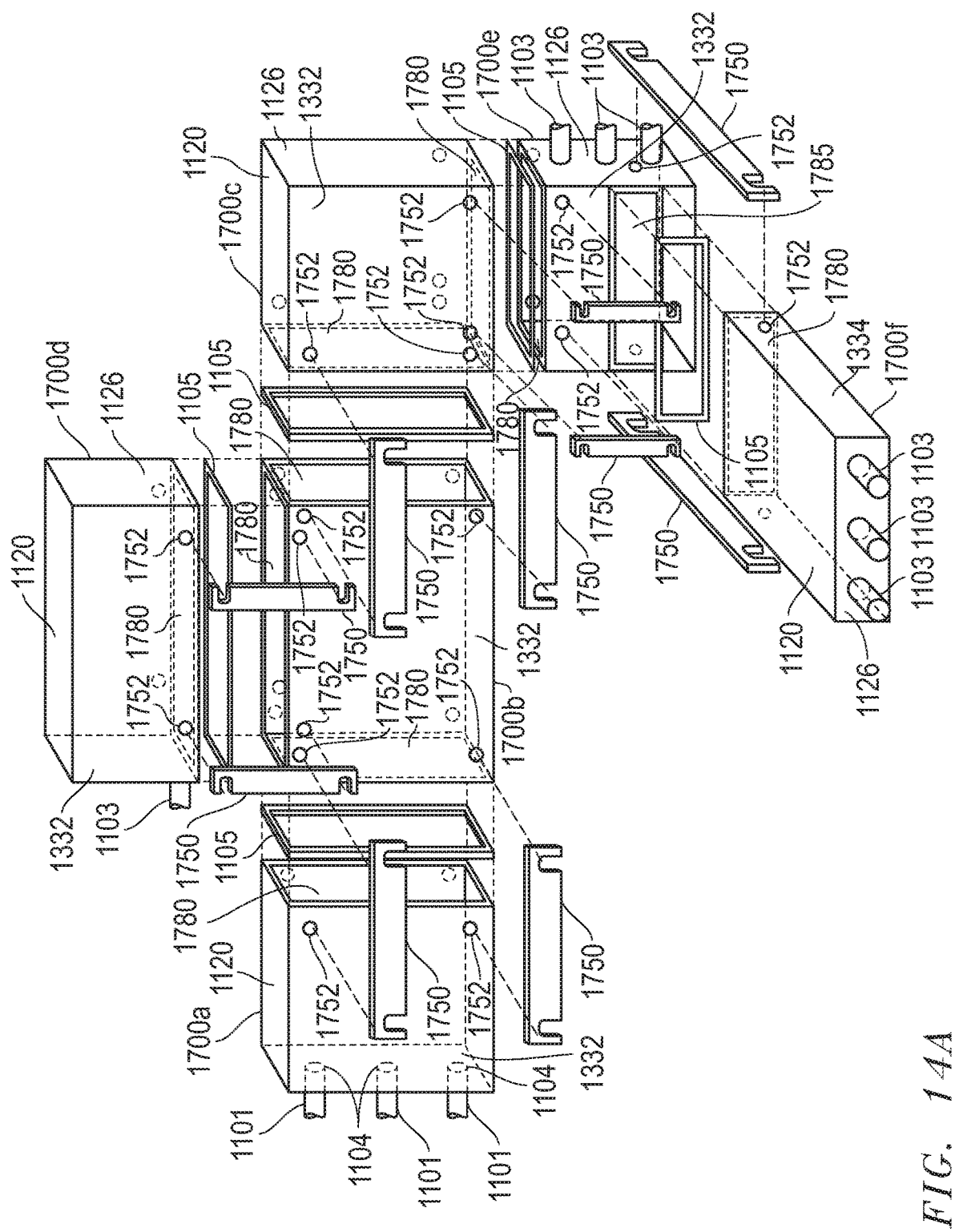
FIG. 14A illustrates an exploded perspective view of a group of multiple modular fluid flow apparatus positioned to be together in fluid communication with each other according to one exemplary embodiment of the disclosed apparatus and methods.
Figure 14B:
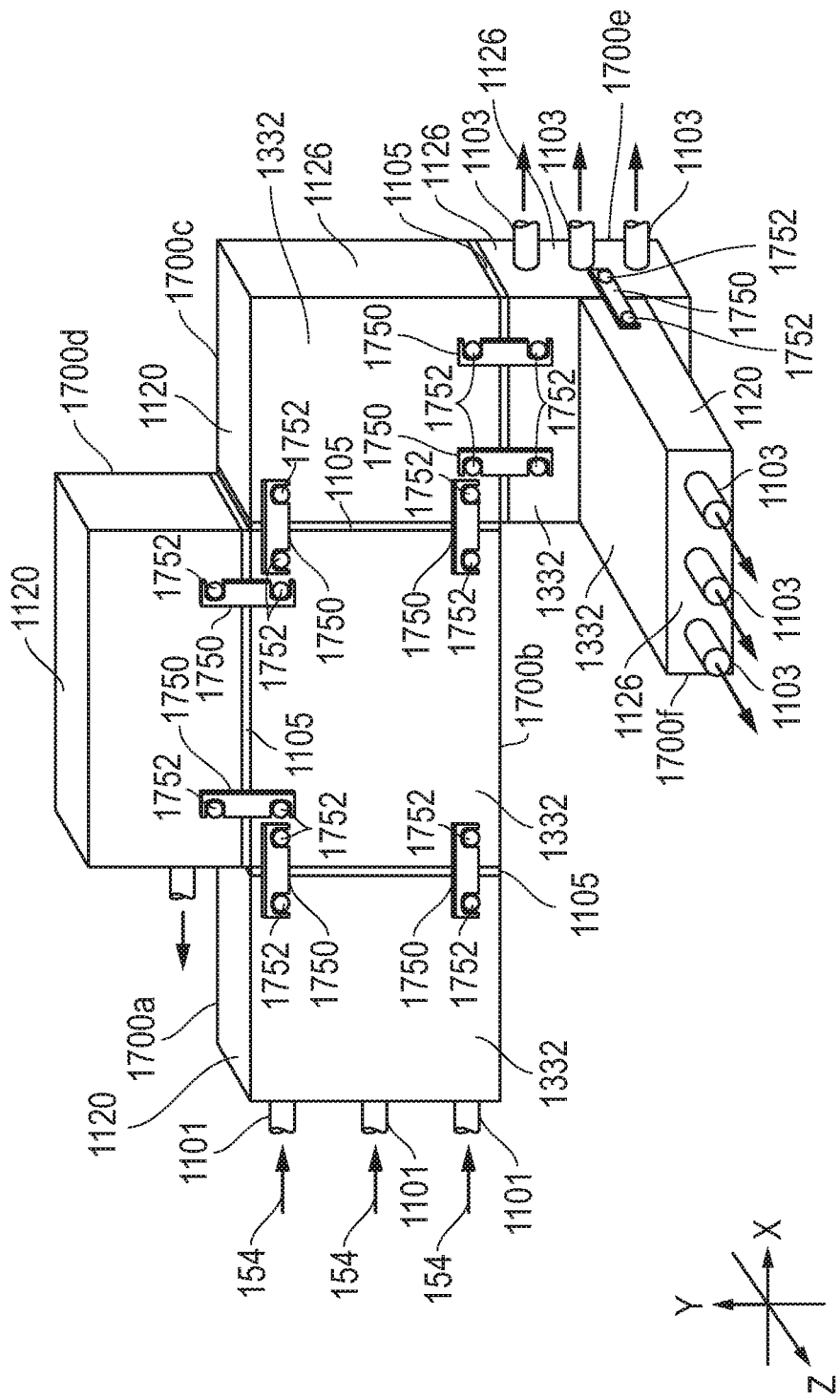
FIG. 14B illustrates a perspective view of an assembled group of multiple modular fluid flow apparatus in fluid communication with each other according to one exemplary embodiment of the disclosed apparatus and methods.

Further, in the manner described in relation to FIG. 3A herein, other types of sensors may be optionally present to monitor or otherwise sense characteristics of fluid and/or proppant at one or more locations within a given fluid flow apparatus of FIG. 8B and/or within a group or test system network of multiple such fluid flow apparatus, including such as shown in FIG. 14B herein. As previously described, examples of such sensors include, but are not limited to, pressure sensors 391, and other sensors 371 such as density sensors, photoelectric sensors, temperature sensors, spectral sensors or spectrometers, radiation detectors, fluid and/or proppant velocity sensors, viscosity sensors, video cameras, electrical resistivity sensors, etc. As illustrated in FIG. 3A, signals and/or data from these sensors may be transmitted wirelessly or by hardwire (e.g., by individual wire conductors from each sensor that are not shown) to data collection/data acquisition equipment which may include, for example, an optional computer system 375 having optional analog to digital converters (ADCs) and/or signal conditioning circuitry, one or more programmable integrated circuits 377 (e.g., CPU, controller, microcontroller, microprocessor, ASIC, etc. or executed on a programmable logic device "PLD" such as FPGA, complex programmable logic device "CPLD", etc.) Examples of such a computer system include, but are not limited to, a computer workstation or computer server, portable computer system such as a tablet computer, a notebook computer, etc. Such data may be stored in memory 379 (e.g., non-volatile memory or non-volatile storage drive) for future analysis and/or may be monitored in real time, e.g., so as to allow a fluid and/or proppant transport test procedure to be modified while the test is underway based on the data collected in real time. Computer system 375 may also be configured to provide wired and/or wireless control signals for controlling operation of automated valves 385.

Figure 8C:
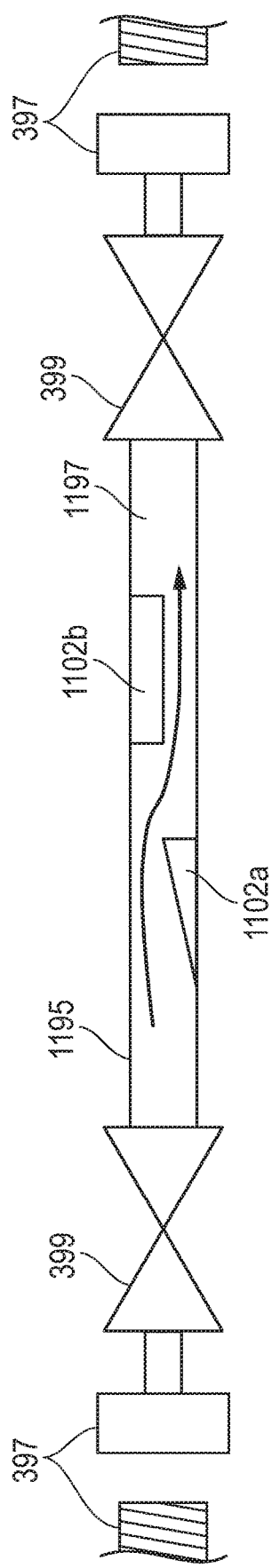
FIG. 8C illustrates a side view of a fluid flow apparatus according to one exemplary embodiment of the disclosed apparatus and methods.
Figure 8D:
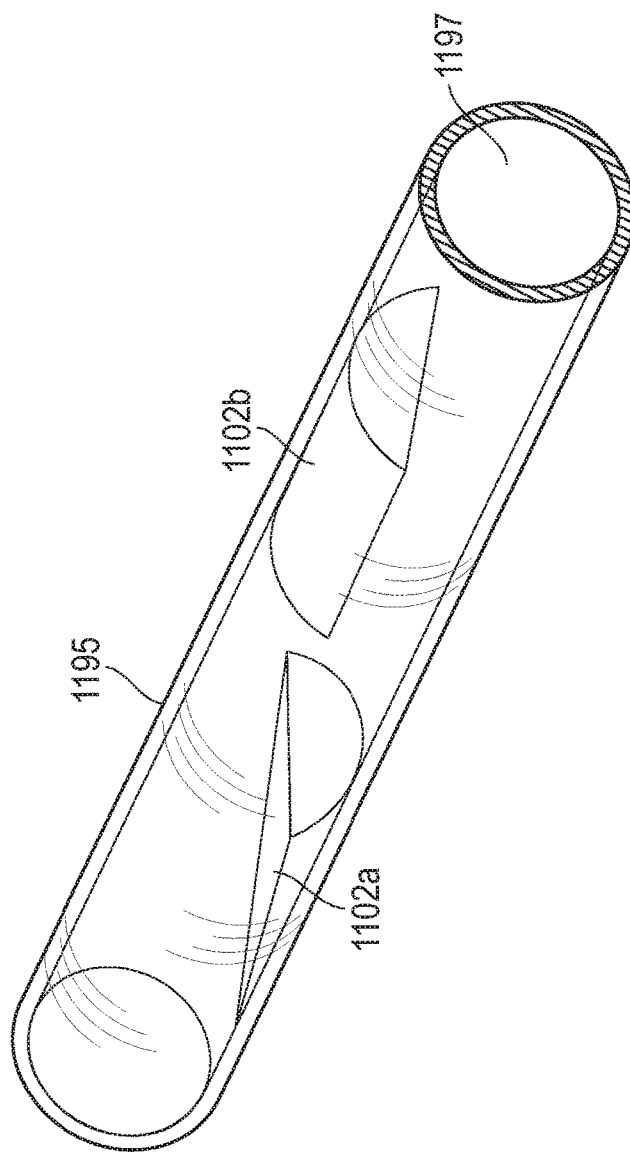
FIG. 8D illustrates a perspective view of a fluid flow apparatus according to one exemplary embodiment of the disclosed apparatus and methods.

FIGS. 8C and 8D illustrate another exemplary embodiment of a fluid flow apparatus including a transparent cylindrical conductor segment 1195 (e.g., cylindrical tubing such as previously described in relation to conductor segments 171, 170, 173, 380, 381, etc.) that defines an internal fluid flow space 1197 in which structures 1102a and 1102b in the form of different shaped blocks are fixed in position (e.g., glued or integrally formed) to form internal flow diversion features to at least partially block or restrict the fluid flow path across space 1197 in the direction shown by the left-to-right fluid flow arrows in FIG. 8C. Optional isolation valves 399 and couplings 397 are illustrated in this embodiment, e.g., to allow conductor segment 1195 to be employed in the manner described in relation to FIGS. 3A and 3B. However, it will be understood that ends of a conductor segment 1195 may be provided with any suitable type of connector, fitting, etc., e.g., to allow conductor segment 1195 to be employed as any one of conductor segments 171, 170, 173, 380, 381 of test system network 300 of FIG. 3A. FIG. 8D illustrates a partial cross-sectional perspective view of conductor segment 1195 of FIG. 8C, in which the end fittings are not shown.

Figure 9A:
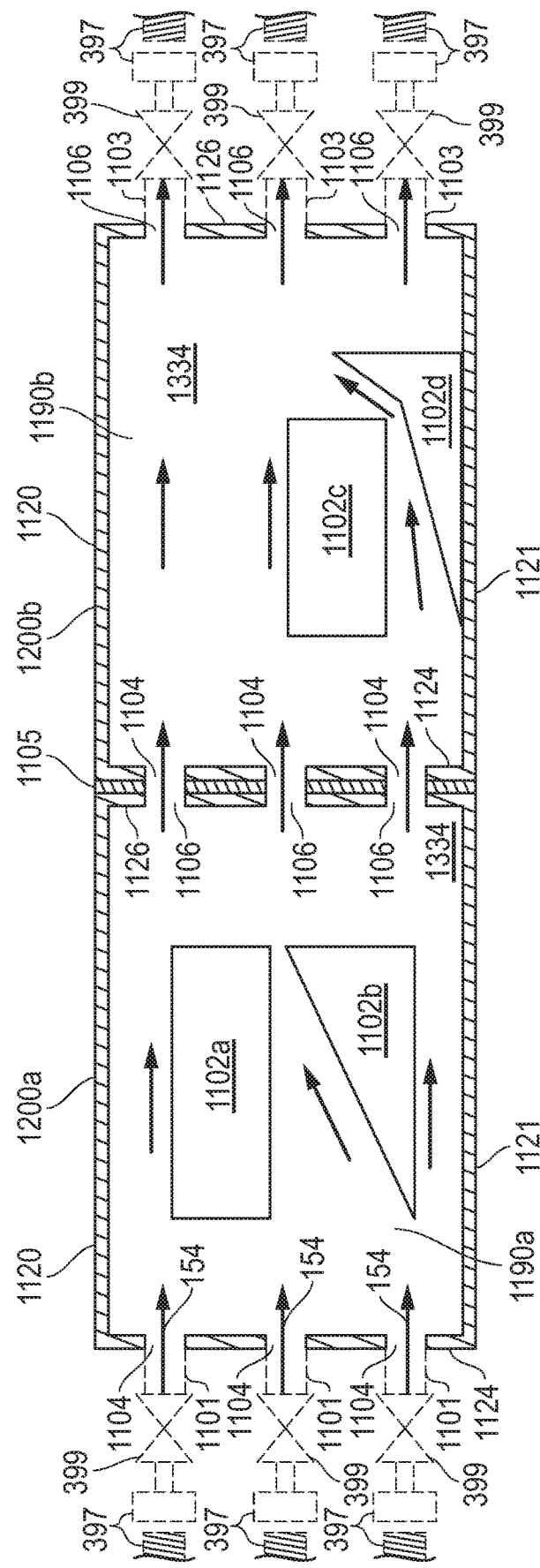
FIG. 9A illustrates a side cross-sectional view of multiple fluid flow apparatus according to one exemplary embodiment of the disclosed apparatus and methods.
Figure 9B:
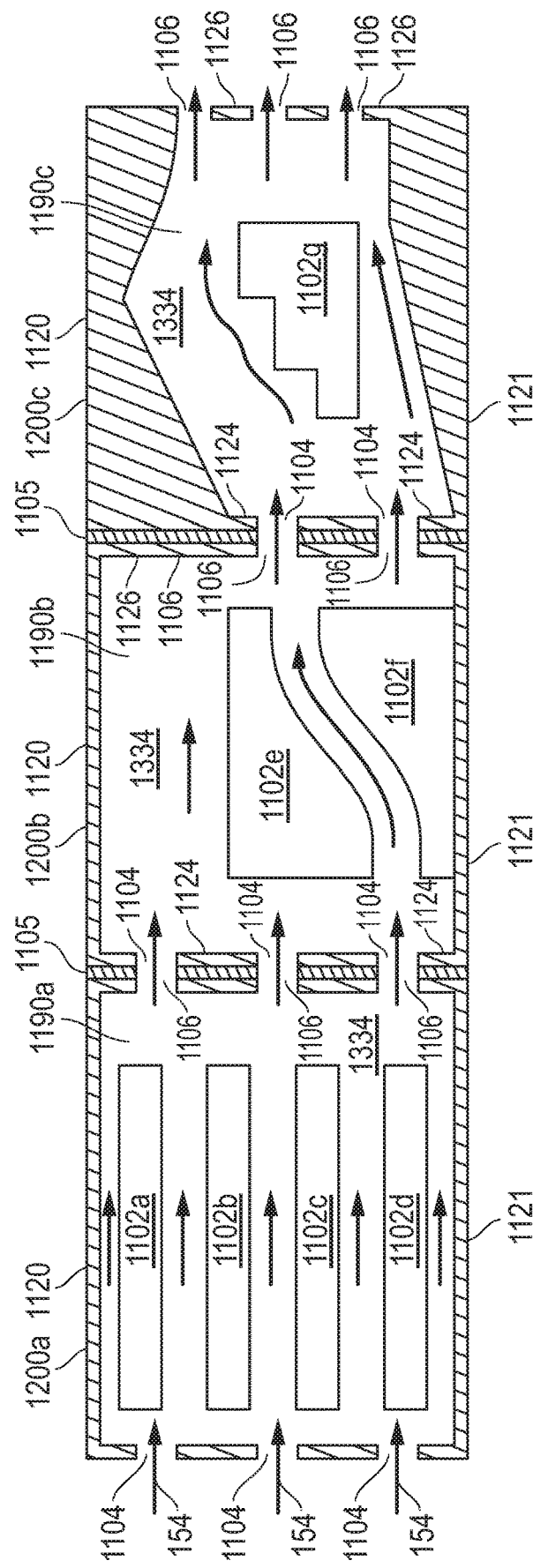
FIG. 9B illustrates a side cross-sectional view of multiple fluid flow apparatus according to one exemplary embodiment of the disclosed apparatus and methods.

In the practice of the disclosed apparatus and methods, two or more fluid flow apparatus may be coupled together in suitable pattern such that fluid flows sequentially from a conductor segment slot of one fluid flow apparatus to the conductor segment slot of another and different fluid flow apparatus, and so on where more than two fluid flow apparatus are so coupled together. In this regard, FIGS. 9A and 9B illustrate exemplary embodiments of two such configurations where multiple fluid flow apparatus are coupled together in-line and parallel with each other. However, multiple fluid flow apparatus may be alternatively coupled together at an angle to each other, as described and illustrated further herein in relation to FIG. 12.

FIG. 9A illustrates a side cross-sectional view of one exemplary embodiment in which fluid outlets 1106 of a first fluid flow apparatus 1200a are coupled in sealed fluid communication with fluid inlets 1104 of a second fluid flow apparatus 1200b by a fluid seal 1105, e.g., which may be a fluid-tight and pressure-tight seal such as an elastomeric gasket, caulking, pipe or coupling between each pair of fluid inlet 1104 and fluid outlet 1106, etc. Such a separate fluid seal 1105 between separate fluid flow apparatus 1200a and 1200b may not be required where a fluid-tight connection between two fluid flow apparatus 1200 may be achieved without a separate seal 1105, e.g., such as when fluid flow apparatus 1200a and 1200b have open tops (e.g., without first edge walls 1120 when the apparatus is oriented with the first edge side facing upward) and are employed for testing under atmospheric pressure only and/or when abutting ends of fluid flow apparatus 1200a and 1200b have mating machined surfaces that form a fluid-tight seal under atmospheric pressure testing conditions.

In another embodiment, outlet conduits 1103 of a first fluid flow apparatus such as illustrated in FIG. 8A may be coupled in fluid-tight and pressure-tight relationship to respective fluid inlet conduits 1101 of a second such fluid flow apparatus. In any case, incoming fluid 154 (e.g., proppant slurry) enters first slot 1190a through fluid inlets 1104 of first apparatus 1200a, flows across slot 1190a as shown by the arrows, and then exits fluid outlets 1106 of first slot 1190a into fluid inlets 1104 of second slot 1190b as shown by the arrows. Fluid 154 then travels across second slot 1190b before exiting second slot 1190b from fluid outlets 1106 of second slot 1190b as shown by the arrows. In such embodiments, the coupled fluid inlets 1104 and fluid outlets 1106 between slots 1190a and 1190b together act as fluid flow restrictions that create a reduced cross-sectional fluid flow area between the relatively larger cross-sectional flow areas of slots 1190a and 1190b of respective fluid flow apparatus 1200a and 1200b.

In the embodiment of FIG. 9A, first fluid flow apparatus 1200a is provided as shown with two internal flow diversion features in the form of a rectangular-shaped structure 1102a and a triangular-shaped structure 1102b that are each fixed in position within slot 1190a to form internal flow diversion features that at least partially block or restrict the fluid flow path across slot 1190a as shown by the arrows from inlets 1104 to outlets 1106 of apparatus 1200a. A second fluid flow apparatus 1200b is provided as shown in FIG. 9A with two internal flow diversion features in the form of a rectangular-shaped structure 1102c and an irregular-shaped (multi-planar) structure 1102d that are each fixed in position within slot 1190b to form internal flow diversion features that at least partially block or restrict the fluid flow path across slot 1190b as shown by the arrows from inlets 1104 to outlets 1106 of apparatus 1200b.

Similar to the embodiment of FIG. 8B, neither of structures 1102a and 1102b of FIG. 9A is positioned in contact with second edge 1121 of apparatus 1200a, and structure 1102c of FIG. 9A is not positioned in contact with either second edge 1121 or first edge 1120 of apparatus 1200b. However, structure 1102d of FIG. 9A is positioned in contact with second edge 1121 of apparatus 1200b similar to the embodiment of FIG. 8A. In the embodiment of FIG. 9A, each of fluid diversion structures 1102a, 1102b, 1102c and 1102d may extend partially or completely across its respective slot 1190a or 1190b to contact one or both of first side 1332 and/or second side 1334 of its respective apparatus 1200a or 1200b to block fluid flow between each of structures 1102a, 1102b, 1102c and 1102d and first side 1332 and/or second side 1334, e.g., each of structures 1102a, 1102b, 1102c and 1102d of FIG. 9A may be fixedly attached to (or formed integral with) one or both of sides 1332 and/or 1334 of its respective apparatus 1100a or 1100b to fixedly position the given structure within its respective slot 1190a or 1190b. Further, in different embodiments any one or more of flow diversion structures 1102a, 1102b, 1102c and/or 1102d of FIG. 9A may extend completely across the width (W) of its respective slot 1190a or 1190b (as illustrated and described in relation to FIGS. 8A, 8B and 11A). Alternatively, any one or more of flow diversion structures 1102*a*, 1102*b*, 1102*c* and/or 1102*d* of FIG. 9A may extend only partially across the width (W) of its respective slot 1190*a* or 1190*b* in a manner similar to that described herein below in relation to the embodiments of FIGS. 10 and 11B, e.g., extending only partially from one of sides 1332 or 1334 as is structure 1102*d* of FIG. 10 and structures 1102*a* and 1102*b* of FIG. 11B (e.g., in cantilever fashion from one of sides 1332 or 1334, or supported from second edge 1121 or suspended from first edge 1120 to be only contiguous with one of sides 1332 or 1334); or extending only from one of first edge 1120 or second edge 1121 such that the structure is supported or suspended within its respective slot 1190*a* or 1190*b* without contacting or otherwise being positioned contiguous with either of sides 1332 and 1332 (as is structure 1102*b* of FIG. 10 and structure 1102*c* of FIG. 11B).

In one embodiment, all fluid diversion structures 1102 of a given fluid flow apparatus may be mechanically coupled to (or formed integral with) one wall of fluid flow apparatus and then assembled to the other walls of the fluid flow apparatus to form an internal slot 1190 that includes one or more fluid diversion structures 1102 therein. For example, one more fluid diversion structures 1102 may be formed integral with (or mechanically couple to) a first side 1332 of a fluid flow apparatus, and the first side may then be assembled to the other walls of the fluid flow apparatus (e.g., second side 1334, ends 1124 and 1126, first edge 1120 and second edge 1121).

FIG. 9B illustrates a side cross-sectional view of another exemplary embodiment in which fluid outlets 1106 of a first fluid flow apparatus 1200*a* are coupled in sealed fluid communication with fluid inlets 1104 of a second fluid flow apparatus 1200*b*, and fluid outlets 1106 of the second fluid flow apparatus 1200*b* are coupled in sealed fluid communication with fluid inlets 1104 of a third fluid flow apparatus 1200*b* in similar manner to the apparatus of FIG. 9A. In the embodiment of FIG. 9B, front side 1332 and first edge 1120 are transparent to allow the contents of internal slot 1190 to be viewed from outside the fluid flow apparatus 1200*a*, it being understood that each of sides 1332 and 1334, first edge 1120, second edge 1121, and ends 1124 and 1126 may be similarly transparent. In the embodiment of FIG. 9B, incoming fluid 154 flows into fluid inlets 1104 of first flow fluid flow apparatus 1200*a* and sequentially across internal slots 1190*a*, 1190*b* and 1190*c* as shown by the arrows, and then exits fluid outlets 1106 of third fluid flow apparatus 1190*c* as shown by the arrows. In the embodiment of FIG. 9B, first fluid flow apparatus 1200*a* is provided as shown with four internal flow diversion features in the form of rectangular-shaped structures 1102*a*, 1102*b*, 1102*c* and 1102*d* that are each fixed in position not in contact with either second edge 1121 or first edge 1120 of slot 1190*a* to form internal flow diversion features that at least partially block or restrict the fluid flow path as shown by the arrows across slot 1190*a* from inlets 1104 to outlets 1106 of apparatus 1200*a*.

A second fluid flow apparatus 1200*b* is provided as shown in FIG. 9B with two internal flow diversion features in the form of irregular-shaped curved structures 1102*e* that are fixed in position (e.g., supported by one or both of sides 1332 and/or 1334) that is not in contact with either second edge 1121 or first edge 1120 of slot 1190*b*, and structure 1102*f* that is fixed in position in contact with second edge 1121 of slot 1190*b* to block fluid flow between structure 1102*f* and second edge 1121. Structures 1102*e* and 1102*f* form internal flow diversion features that at least partially block or restrict the fluid flow path across slot 1190*b* as shown by the arrows from inlets 1104 to outlets 1106 of apparatus 1200*b*. A third fluid flow apparatus 1200*c* is provided as shown in FIG. 9B with a single internal flow diversion feature in the form of stair stepped-shaped structure 1102*g* that is fixed in position within slot 1190*c* not in contact with either second edge 1121 or first edge 1120 of slot 1190*c* to form an internal flow diversion feature that at least partially blocks or restricts the fluid flow path across slot 1190*c* as shown by the arrows from inlets 1104 to outlets 1106 of apparatus 1200*c*. As shown, second edge 1121 is angled upward relative to first edge 1120 (and relative to the horizontal in FIG. 9B) so that the height of the internal flow slot 1190*c* is greater at outlets 1106 than at inlets 1104.

As in the previous embodiments, each of fluid diversion structures 1102*a*, 1102*b*, 1102*c*, 1102*d*, 1102*e*, 1102*f* and 1102*g* may extend partially or completely across its respective slot 1190*a* or 1190*b* to contact one or both of first side 1332 and/or second side 1334 of its respective apparatus 1200*a* or 1200*b* to block fluid flow between these structures and first side 1332 and/or second side 1334.

It will be understood that the illustrated flow diversion structures 1102 of FIGS. 9A and 9B may be positioned within an internal slot 1190 of a given fluid flow apparatus, whether or not the fluid flow apparatus is coupled in fluid communication with another fluid flow apparatus, i.e., flow diversion structures 1102 of FIGS. 9A and 9B may also be employed with stand-alone fluid flow apparatus embodiments in which only one fluid flow apparatus is employed and not coupled to another fluid flow apparatus.

Figure 10:
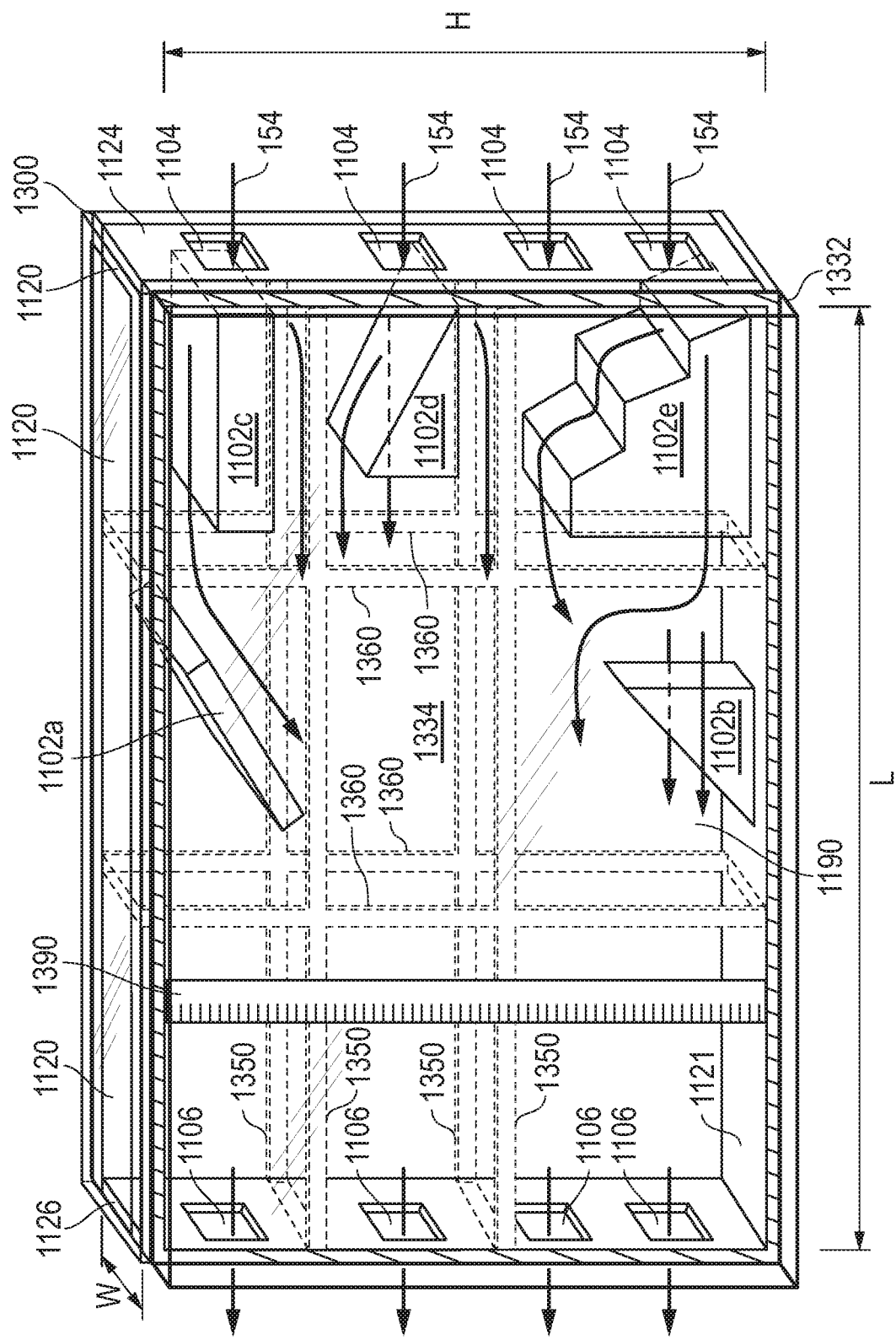
FIG. 10 illustrates a side perspective view of a fluid flow apparatus according to one exemplary embodiment of the disclosed apparatus and methods.
Figure 12:
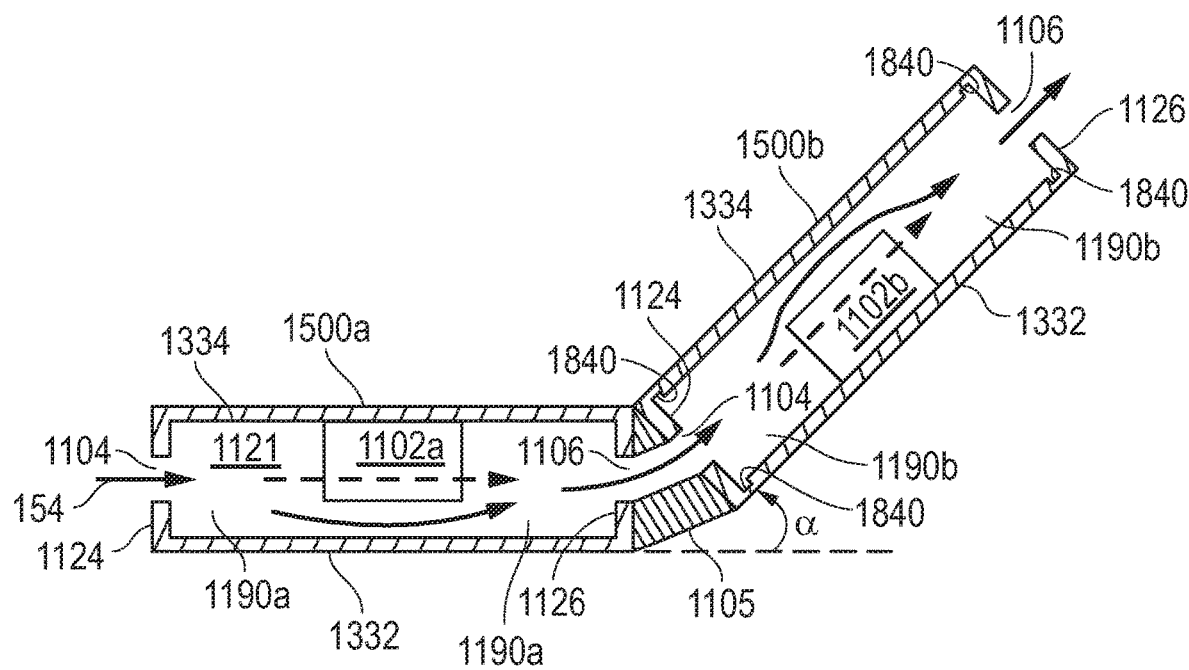
FIG. 12 illustrates an overhead cross-sectional view of multiple fluid flow apparatus according to one exemplary embodiment of the disclosed apparatus and methods.

FIG. 10 illustrates a side perspective view of another exemplary embodiment of a fluid flow apparatus 1300 having an internal slot 1190 defined within apparatus 1300 for receiving a test fluid 154 (e.g., proppant-laden test fracture fluid) that is introduced into slot 1190 through multiple fluid inlets 1104 provided at a first end 1124 of apparatus 1100*a* and passes out of slot 1190 through multiple fluid outlets 1106 as shown by the arrows. As illustrated, inlets 1104 and outlets 1106 may be of any suitable number, size and/or shape, e.g., to facilitate coupling multiple fluid flow apparatus together such as illustrated in FIGS. 9A, 9B and 12.

In the embodiments herein, any of the flow apparatus walls (i.e., sides 1332/1334, ends 1124/1126, first edge 1120 and/or second edge 1121) of apparatus 1300 may be transparent plates. In FIG. 10, vertical braces 1360 and horizontal braces 1350 (shown in dashed outline) may be optionally present internally or externally to reinforce, strengthen and hold together the walls of apparatus 1300 when fluid is present within slot 1190. When present, optional braces 1350 and 1360 may be, for example, metal or plastic strapping or any other suitable reinforcing material and structure. One or more graduated scales 1390 (e.g., tape measure scale/s) may be provided on one or more horizontal and/or vertical walls of apparatus 1300 to facilitate measurement of height of materials (e.g., fluid and/or proppant levels) within slot 1190 during or after test fluid flow. In FIG. 10, scale 1390 is shown provided on front side 1334 for purpose of illustration, it being understood that a scale may alternatively or additionally be provided on one or more other walls of fluid flow apparatus 1300 (e.g., sides, ends, first edge or second edge).

In FIG. 10, differently shaped structures 1102*a*, 1102*b*, 1102*c*, 1102*d*, and 1102*e* are fixed in position at different locations within internal flow slot 1190 to at least partially block or divert the fluid flow path across slot 1190 in a manner as previously described. As previously noted, the number, shape, size and/or location of structures 1102 within a slot 1190 of a fluid flow apparatus may vary as desired or needed to fit the needs of a given application. For example, in one embodiment, the various angled surfaces of structures 1102a, 1102b, 1102d and 1102e in FIG. 10 may vary as desired relative to the horizontal (x-axis) in FIG. 10, e.g., each angled surface may be oriented at an angle from the horizontal in a range of from greater than zero degrees to less than 90 degrees from the horizontal. Such angled surfaces in FIG. 10 may include, for example, the planar upper surface of rectangular structure 1102a, the hypotenuse surfaces of triangular surfaces 1102b, 1102c and 1102d, the "step" surfaces of stair-step structure 1102e, and angled surfaces of any other structure shapes that may be selected in other embodiments. Further, as shown in FIG. 10, flow diversion structures may extend only partially between sides 1332 and 1334 so as to contact only one or neither of sides 1332 and 1334. In this regard, structure 1102b of FIG. 10 is positioned within slot 1190 to extend upward from second edge 1121 and does not contact either of sides 1332 or 1334, so as to create flow paths around 1102b between structure 1102b and each of sides 1332 and 1334. It will be understood that such a structure may alternatively extend downward from first edge 1120 without contacting either of sides 1332 or 1334. Structure 1102d of FIG. 10 is positioned within slot 1190 to extend inwardly from first side 1332 without contacting side 1334, so as to create flow paths around 1102d between structure 1102d and side 1334 with no flow path existing between structure 1102d and side 1332. Structure 1102e of FIG. 10 is positioned within slot 1190 to extend upward from second edge 1121 and contacts side 1334 without contacting side 1332, so as to create a flow path around 1102e between structure 1102b and side 1332 with no flow path existing between structure 1102e and side 1334.

Still referring to FIG. 10, width (W), length (L) and height (H) of a slot 1190 (corresponding to the width, length and height axes denoted by the W, L and H arrows in FIG. 10) that is defined within a fluid flow apparatus may vary as needed or desired to meet the characteristics of a given testing application. In one embodiment, height (H) of a slot 1190 may be greater than the width (W) of the slot 1190, e.g., such that the slot has an elongated cross-section perpendicular to the direction of fluid flow through the slot 1190. In one exemplary embodiment a slot 1190 may have height-to-width aspect ratio greater than or equal to 5, alternatively greater than or equal to 10, alternatively greater than or equal to 25, alternatively greater than or equal to 50, alternatively greater than or equal to 100, and further alternatively greater than or equal to 200, although it will be understood that it is possible that a slot 1190 may have a height-to-width aspect ratio less than 5 in other embodiments. In another exemplary embodiment a slot 1190 may have height-to-width aspect ratio from 5 to 1000, alternatively from 5 to 200, alternatively from 10-150, alternatively from 25 to 100, and further alternatively from 50 to 100, although it will be understood that is possible that a slot 1190 may have a height-to-width aspect ratio that is greater than 1000 in other embodiments or otherwise may have any height-to-width aspect ratio that is suitable for a given testing application.

In a further embodiment, width (W) of a slot 1190 may be from greater than 0 inches to 1 inch, alternatively from 0.125 inch to 1 inch, alternatively from 0.5 inch to 1 inch, alternatively from 0.25 inch to 0.5 inch, and further alternatively may be 0.25 inches. In such an embodiment, height (H) of slot 1190 may vary from greater than 0 inches to 48 inches, alternatively from 6 inches to 48 inches alternatively from 12 inches to 48 inches, alternatively from 24 inches to 36 inches, and alternatively may be 24 inches. In this same embodiment, length (L) of slot 1190 may vary from greater than 0 inches to 48 inches, alternatively from 6 inches to 48 inches, alternatively from 12 inches to 48 inches, alternatively from 24 inches to 36 inches, and alternatively may be 24 inches However, it will be understood that any one or more of width (W), height (H) and/or length (L) of a given slot 1190 may be outside these ranges, e.g., width (W) may be greater than 1 inch, height (H) may be greater than 48 inches, and/or length (L) may be greater than 48 inches. In one embodiment, height (H), width (W) and/or length (L) values may be selected to be small enough to allow modular fluid flow apparatus to be more easily handled for assembly, disassembly and testing as illustrated and described further herein in relation to FIGS. 14A-14E and 15A-15E. It will further be understood that in other embodiments, any dimensional values of height (H), length (L) and/or width (W) may be employed that are suitable to fit the needs or characteristics of a given testing application.

Dimensions of height (H), width (W) and length (L) are used for convenience in some embodiments herein to describe the dimensional configuration of a slot 1190. However, unless otherwise specified herein, these dimensional terms of (H), width (W) and length (L) do not connote or require any particular operational orientation of a slot 1190 or its respective fluid flow apparatus relative to the horizontal during passage of a test fluid through the fluid flow apparatus. In this regard, the length (L) axis (longitudinal axis) of a given slot 1190 may be oriented at a variety of angles relative to the horizontal (e.g., including non-parallel angles from greater than 0 degrees to 90 degrees to the horizontal, alternatively from greater than 0 degrees to less than 180 degrees to the horizontal) such that the height (H) axis of the given slot 1190 is at the same time is also oriented at a corresponding angle to the horizontal (e.g., including non-perpendicular angles from less than 90 degrees to 0 degrees to the horizontal). In FIG. 10 height (H) axis of slot 1190 extends parallel to the double-sided arrow labelled "H", length (L) axis of slot 1190 extends parallel to the double-sided arrow labelled "L", and width (W) axis of slot 1190 extends parallel to the double-sided arrow labelled "W".

Figure 11A:
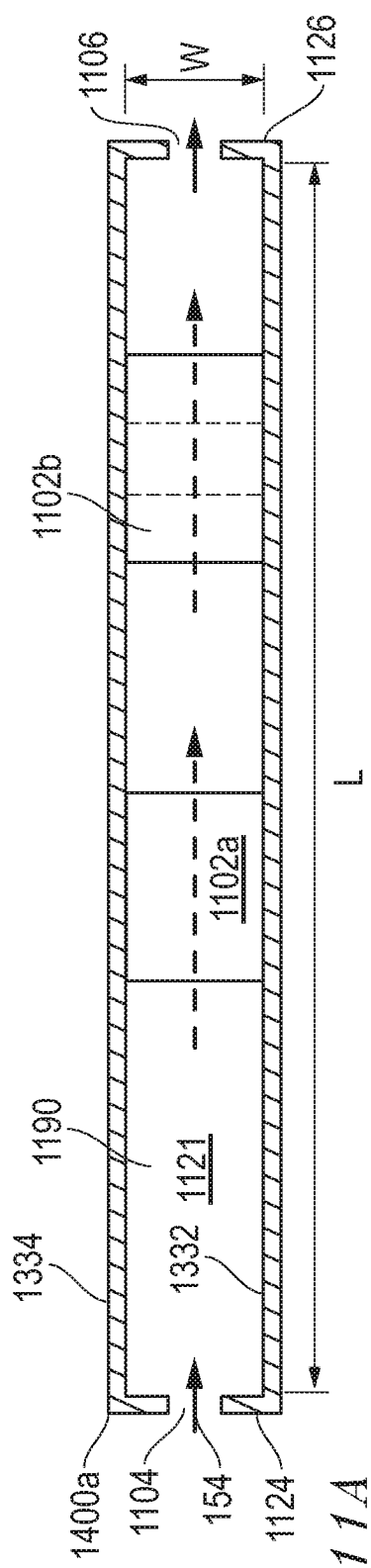
FIG. 11A illustrates an overhead cross-sectional view of a fluid flow apparatus according to one exemplary embodiment of the disclosed apparatus and methods.

FIGS. 11A-11F illustrate overhead cross-sectional views of different exemplary embodiments of respective fluid flow apparatus 1400a to 1400f, showing different combinations of flow diversion features and/or slot configurations. FIG. 11A illustrates a slot 1190 having planar inner surfaces and two flow diversion structures 1102a and 1102b positioned therein. In FIG. 11A, each of structures 1102a and 1102b extend completely across the width (W) of slot 1190 to contact each of sides 1332 and 1334 of apparatus 1400a so that no fluid flow path exists between structures 1102a and 1102b and either of sides 1332 and 1334, but rather a fluid flow path may extend over and/or under each of structures 1102a and 1102b as shown by the dashed arrows, depending on their respective configuration and position in the slot 1190 of FIG. 11A. Structure 1102a of FIG. 11A may correspond, for example, to an individual rectangular-shaped block 1102a such as illustrated in FIG. 9A, a rectangular block 1102a such as illustrated in FIG. 10, an individual triangular-shaped block 1102c such as illustrated in FIG. 9A, or an individual irregular-shaped curved block 1102e or 1102f such as illustrated in FIG. 9B. Structure 1102b of FIG. 11A may correspond, for example, to a stair stepped-shaped block 1102g such as illustrated in FIG. 9B.

Figure 11B:
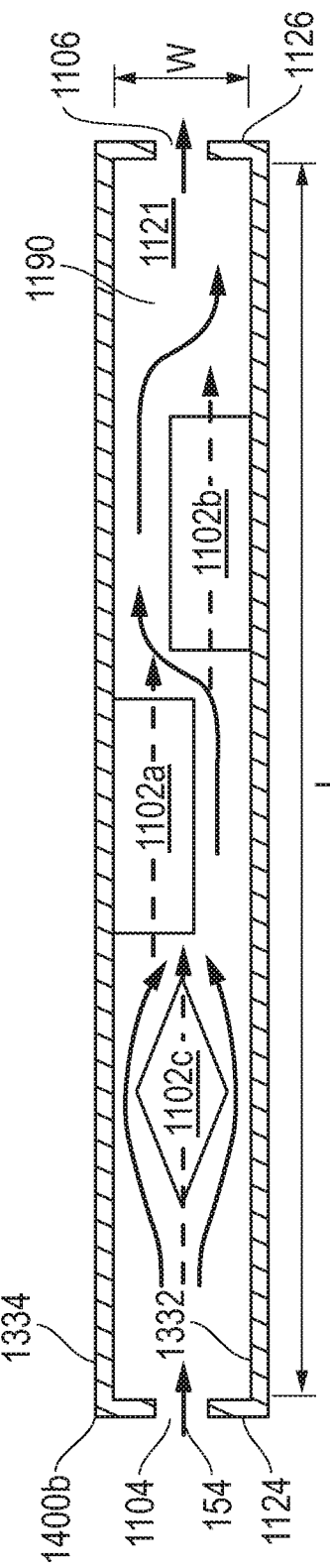
FIG. 11B illustrates an overhead cross-sectional view of a fluid flow apparatus according to one exemplary embodiment of the disclosed apparatus and methods.

FIG. 11B illustrates a slot 1190 having planar inner surfaces and three flow diversion structures 1102a and 1102b positioned therein. In FIG. 11B, each of structures 1102a, 1102b and 1102c extend only partially across the width (W) of slot 1190 of FIG. 11B, with structure 1102a only contacting side 1334 of apparatus 1400b to leave a fluid flow path between structure 1102a and side 1332 as shown by the arrows, structure 1102b only contacting side 1332 of apparatus 1400b to leave a fluid flow path between structure 1102b and side 1334 as shown by the arrows, and diamond-shaped structure 1102c not contacting either of sides 1332 or 1334 of apparatus 1400b to leave a fluid flow path between structure 1102c and each of sides 1332 and 1334 as shown by the arrows. Fluid flow paths may also may extend over and/or under each of structures 1102a, 1102b and 1102c depending on their respective configuration and position in the slot 1190 of FIG. 11B, as shown by the dashed arrows in FIG. 11B. However, it will be understood that no such fluid flow path over or under structures such as 1102a, 1102b and 1102c would exist in embodiments where structures 1102a, 1102b and 1102c extend continuously from internal surface of first edge 1120 down to internal surface of second edge 1121 so as to block fluid flow over and under the structure, and so as to allow fluid flow only around one or both sides of the structure, i.e., between the structure and at least one of side 1332 or side 1334. Structures 1102a and 1102b of FIG. 11B may correspond to any shaped structure having a planar upper surface, such as rectangular-shaped or triangular-shaped structure previously described. Structure 1102c of FIG. 11B may have a planar upper surface and diamond-shaped outline as shown.

Figure 11C:
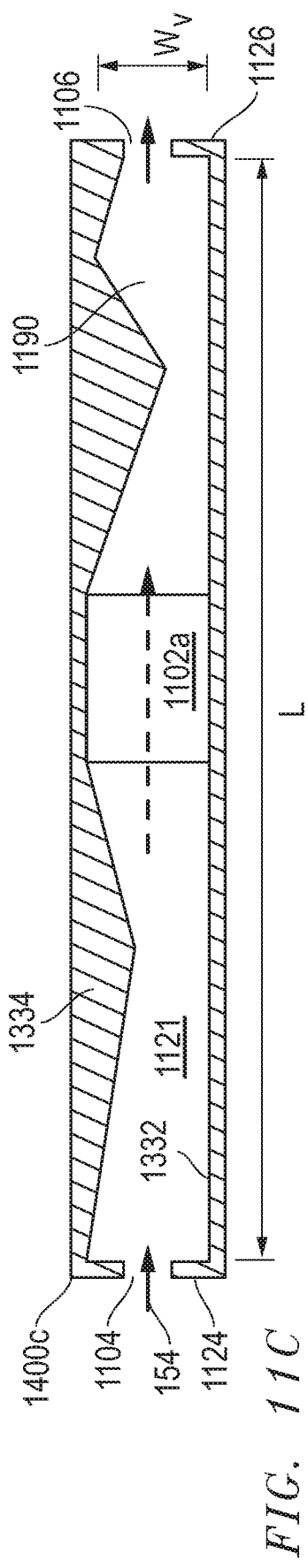
FIG. 11C illustrates an overhead cross-sectional view of a fluid flow apparatus according to one exemplary embodiment of the disclosed apparatus and methods.

FIG. 11C illustrates a slot 1190 having a first side 1332 with a planar inner surface and a second side 1334 with an angled inner surface that results in a variable slot width ($W_v$) between sides 1332 and 1334 that varies at different locations within slot 1190. Also present within slot 1190 of FIG. 11C is a flow diversion structure 1102a that extends completely across the width ($W_v$) of slot 1190 to contact each of sides 1332 and 1334 of apparatus 1400c at the indicated location of structure 1102a so that there is no flow path between structure 1102a and each of sides 1332 and 1334, but rather a fluid flow path may extend over and/or under each of structures 1102a and 1102b, depending on their respective position in the slot 1190 of FIG. 11A. Structure 1102a of FIG. 11C may correspond to any shaped structure having a planar upper surface, such as rectangular-shaped, triangular-shaped or irregular-shaped structure previously described. As shown in FIG. 11C, angled surface of side 1334 creates a flow diversion surface within slot 1190 of FIG. 11C.

Figure 11D:
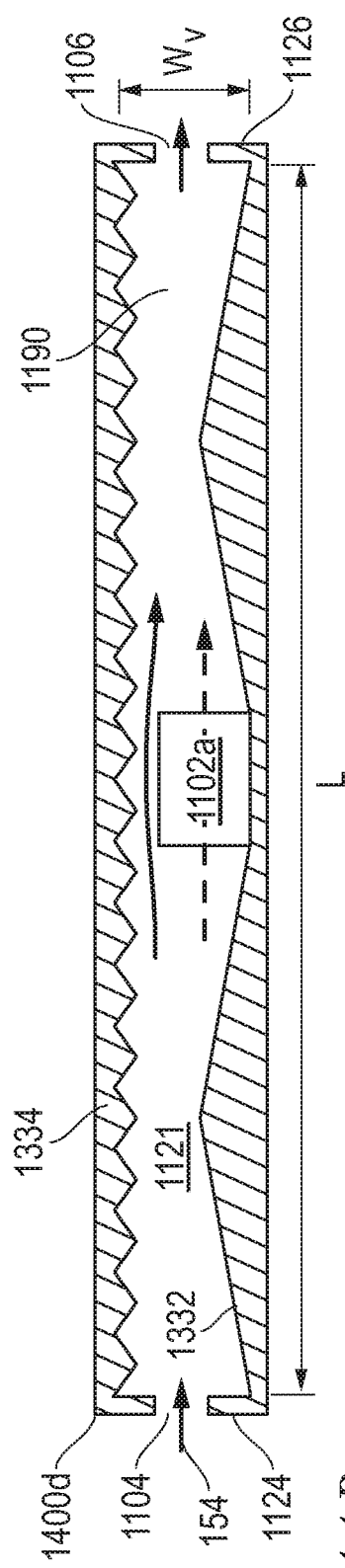
FIG. 11D illustrates an overhead cross-sectional view of a fluid flow apparatus according to one exemplary embodiment of the disclosed apparatus and methods.

FIG. 11D illustrates a slot 1190 having sides 1332 and 1334 that each have an angled inner surface to result in a variable slot width ($W_v$) between sides 1332 and 1334 that varies at different locations within slot 1190. Also present within slot 1190 of FIG. 11D is a flow diversion structure 1102a that extends only partially across the width ($W_v$) of slot 1190 of FIG. 11D as shown by the arrow, with structure 1102a only contacting side 1332 of apparatus 1400d to leave a fluid flow path between structure 1102a and side 1334 and such that there is no flow path between structure 1102a and side 1332. A fluid flow path may also may extend over and/or under structure 1102a depending on its respective position in the slot 1190 of FIG. 11D. Structure 1102a of FIG. 11D may correspond to any shaped structure having a planar upper surface, such as rectangular-shaped, triangular-shaped or irregular-shaped structure previously described. As shown in FIG. 11D, angled surfaces of sides 1332 and 1334 create flow diversion surfaces within slot 1190 of FIG. 11D. Besides the angled surfaces illustrated in FIGS. 11C and 11D, it will be understood that inner surfaces of sides 1332 and 1334 of a fluid flow apparatus may additionally or alternatively be textured (or roughened) in some embodiments to at least partially disrupt the fluid flow (e.g., create turbulent flow) across the slot 1190, as may the internal surface of any other wall 1120, 1121, 1124 and/or 1126.

Figure 11E:
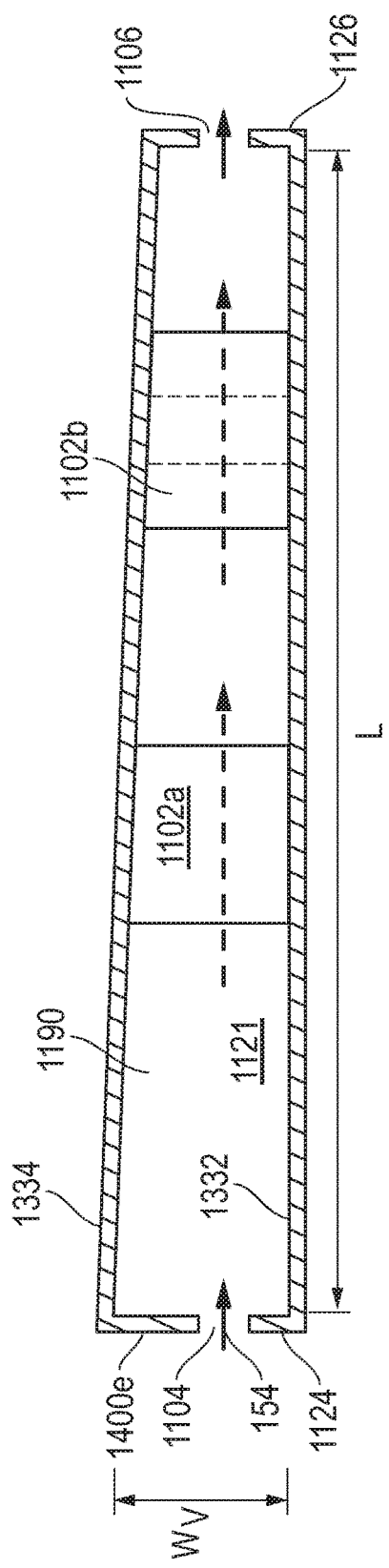
FIG. 11E illustrates an overhead cross-sectional view of a fluid flow apparatus according to one exemplary embodiment of the disclosed apparatus and methods.
Figure 11F:
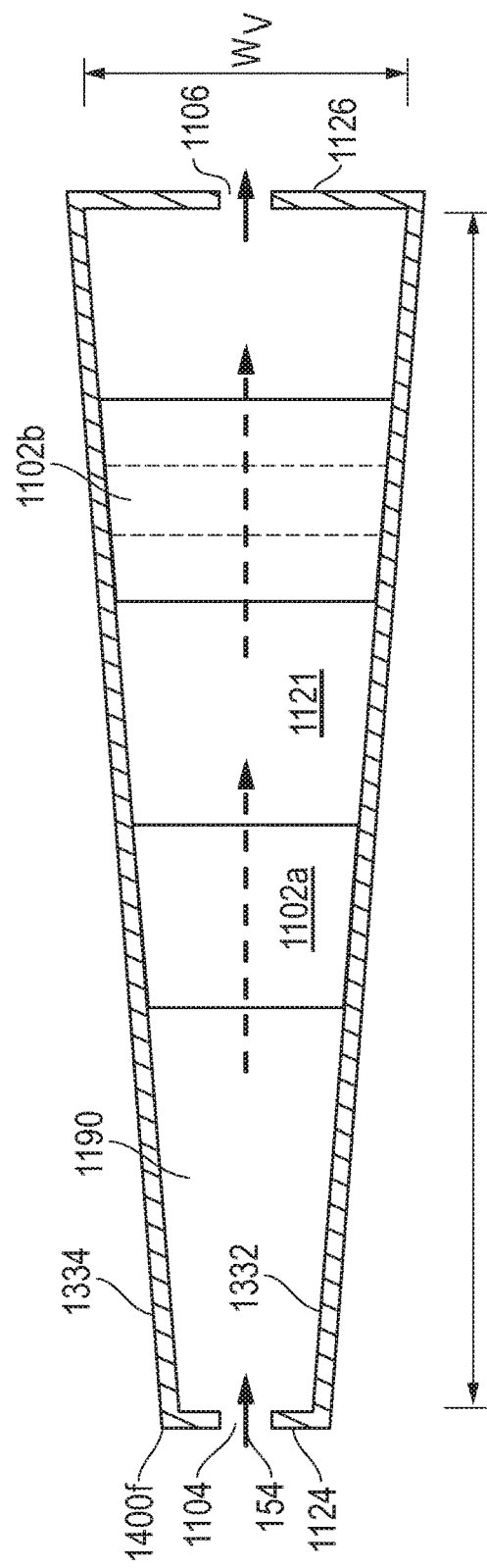
FIG. 11F illustrates an overhead cross-sectional view of a fluid flow apparatus according to one exemplary embodiment of the disclosed apparatus and methods.

FIG. 11E illustrates an exemplary fluid flow apparatus 1400e with a slot 1190 having a side 1334 with an internal surface that extends (or angles) inward toward an opposing internal surface of side 1332 of the same fluid flow apparatus 1400e in non-parallel relationship so as to narrow the cross-sectional flow area and variable width ($W_v$) of the flow slot 1190 at fluid outlet/s 1106. FIG. 11F illustrates an exemplary fluid flow apparatus 1400f with a slot 1190 having sides 1332 and 1334 that each have an internal surface that extends (or angles) outward away from the respective opposing internal surface of the opposite side 1334 or 1332 of the same fluid flow apparatus 1400f in non-parallel relationship so as to widen the cross-sectional flow area and variable width ($W_v$) of the flow slot 1190 at fluid outlet/s 1106.

Alternatively, with regard to FIG. 11E, it will be understood that a slot 1190 may have sides 1332 and 1334 that each have an internal surface that extends (or angles) inward toward the respective opposing internal surface of the opposite side 1334 or 1332 of the same fluid flow apparatus 1400 so as to narrow the cross-sectional flow area and variable width ($W_v$) of the flow slot 1190 at fluid outlet/s 1106, e.g., in one case this may be obtained by reversing direction of fluid flow within fluid flow apparatus 1400f by introducing fluid at the fluid outlet/s 1106 and allowing to flow through to the fluid inlet/s 1104. In yet another embodiment, it is possible that the first edge 1120 and second edge 1121 of a fluid flow apparatus 1400 may each have an internal surface that extends (or angles) outward toward the respective opposing internal surface of the opposite wall 1120 or 1121 of the same fluid flow apparatus 1400f in manner similar as sides 1334 and 1332 of FIG. 11F so as to increase the cross-sectional flow area and height of the flow slot 1190 at fluid outlet/s 1106, and in another embodiment it is possible that that the first edge 1120 and second edge 1121 of a fluid flow apparatus 1400 may each have an internal surface that extends (or angles) inward toward the respective opposing internal surface of the opposite wall 1120 or 1121 of the same fluid flow apparatus 1400f so as to decrease the cross-sectional flow area and height of the flow slot 1190 at fluid outlet/s 1106. In one embodiment, both slot width and slot height may so increase together from inlet to outlet, and in another embodiment both slot width and slot height may decrease together from inlet to outlet.

FIG. 12 illustrates one exemplary embodiment in which length axis or longitudinal axis of slots 1190a and 1190b of multiple different fluid flow apparatus 1500a and 1500b are coupled together at an angle α in fluid communication with each other to allow fluid to flow from outlet/s 1106 of a first fluid flow apparatus 1500a into the inlet/s 1104 of a second fluid flow apparatus 1500b. It will be understood that although slots 1190a and 1190b are oriented in this exemplary embodiment to form an angle α such that their respective internal side surfaces 1332 and 1334 are not in the same plane, it is alternatively or additionally possible in other embodiments that two slots 1190 may be coupled together at an angle in fluid communication with each other in other ways, e.g., such as to form an angle α between two slots 1190 such that their respective internal edge surfaces 1120 and 1121 are not in the same plane. A fluid path exists through the slots 1190a and 1190b of the two fluid flow apparatus 1500a and 1500b (around the respective fluid diversion structures 1102*a* and 1102*b*) as shown by the solid arrows in FIG. 12, and over and/or under the fluid diversion structure 1102*a* as shown by the dashed arrow in FIG. 12.

Figure 13:
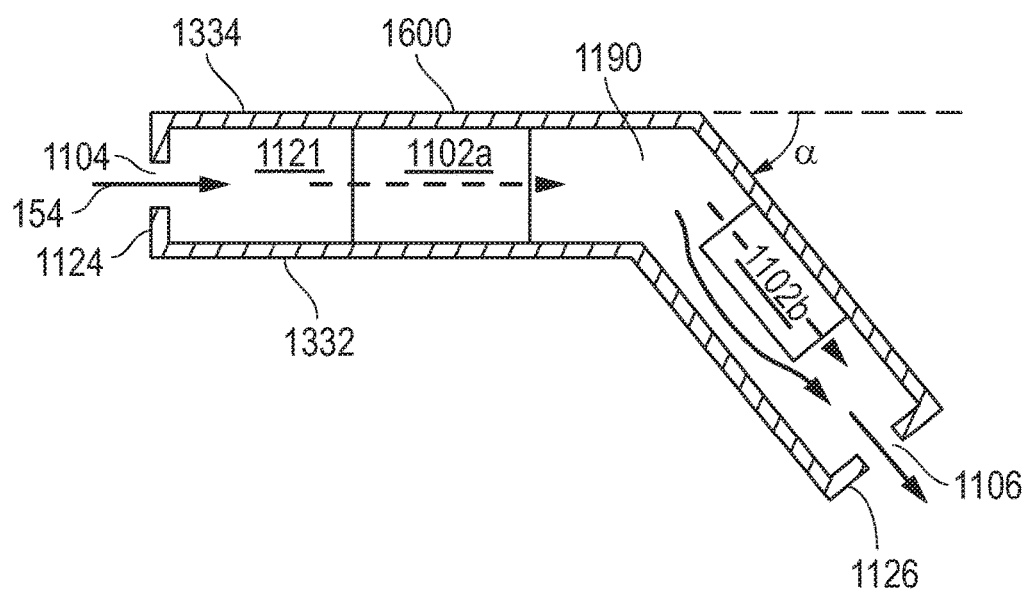
FIG. 13 illustrates an overhead cross-sectional view of a fluid flow apparatus according to one exemplary embodiment of the disclosed apparatus and methods.

In FIG. 12, angle α is illustrated as being about 45 degrees, although in other embodiments angle α may be any other desired angle to fit a given testing application, e.g., from greater than zero degrees to less than 180 degrees, from greater than zero degrees to 90 degrees, alternatively from about 10 degrees to about 170 degrees, alternatively from about 10 degrees to about 90 degrees, alternatively from about 30 degrees to about 45 degrees, etc. FIG. 13 illustrates another exemplary embodiment in which a sides 1332 and 1334 of a fluid flow apparatus 1600 may be angled as shown to form a single continuous flow slot 1190 that is bent at an angle (β, e.g., about 45 degrees as shown or other suitable angle such as from about 30 degrees to about 45 degrees in one embodiment, from greater than zero degrees to less than 180 degrees in another embodiment, etc.

FIG. 14A illustrates an exploded perspective view of one exemplary embodiment in which test system including a group or network of multiple modular fluid flow apparatus 1700*a*, 1700*b*, 1700*c*, 1700*d*, 1700*e* and 1700*f* are positioned for coupling together in wall-to-wall (e.g., end-to-end, side-to-end, end-to-side, side-to-side, etc.) fluid communication with each other, although it is possible that as few as only two fluid flow apparatus may be similarly coupled together. It will be understood that the conductor segment slots of one or more of flow apparatus 1700*a*, 1700*b*, 1700*c*, 1700*d*, 1700*e* and 1700*f* of FIGS. 14A and 14B may include an internally-heterogeneous fluid flow space (e.g., slot containing one or more fluid flow diversion features and/or have a varying or non-consistent cross-sectional flow area in a manner described elsewhere herein), although this is not necessary and any one or more (including all) of fluid flow apparatus 1700*a*, 1700*b*, 1700*c*, 1700*d*, 1700*e* and 1700*f* may instead have an internally-homogeneous fluid flow space having a consistent (e.g., full-open) cross-sectional flow area with no diversion features positioned therein.

In one embodiment, multiple flow apparatus may be coupled together to form a network of conductor segment slots such that cross-sectional open flow area of these slots may vary and/or be tapered from larger to smaller as appropriate to form primary, secondary, tertiary, etc. conductor segments in a manner such as descried in relation to FIGS. 1B, 2 and 3A. In this regard, fluid flow apparatus having slots of different respective cross-sectional open areas perpendicular to fluid flow direction may be coupled together as desired or needed to fit a given application, e.g., to create a progressively tapered relationship of slots that have a relatively larger cross-sectional flow area input conductor segment slot that is coupled to relatively smaller cross-sectional flow area primary conductor segment slot/s, each of which may in turn be optionally coupled to one or more secondary conductor segment slot/s that have relatively smaller cross-sectional flow area than the primary conductor segment, with each of the secondary primary conductor segment slot/s optionally being coupled to one or more tertiary conductor segment slot/s that have relatively smaller cross-sectional flow area than the respective secondary conductor segment slot, and so on.

In another embodiment, a continuously-tapered conductor segment slot such as illustrated and described in relation to FIG. 11F may be employed that progressively and linearly tapers in width (W) and/or height (H) with its length (L) without internal connections between different slots. A continuous taper of slot height (H) and/or width (W) with slot length (L) may also be achieved by varying only one wall in relative to another wall of fluid flow apparatus slot, such as illustrated and described in relation to FIG. 11E. However, it will be understood that in other embodiments, the interconnected conductor segment slots of a test system architecture do not need to be tapered relative to each other and/or may independently vary in cross-sectional flow area size as desired or needed. Further, one or more of independent conductor segment slot/s may have a different length from each of the other conductor segment slot/s as desired or needed to fit a given application. In addition, a test system architecture such as described herein may be scaled-up in size and/or length.

As shown in FIG. 14A, each given one of modular fluid flow apparatus 1700*a*, 1700*b*, 1700*c*, 1700*d*, 1700*e* and 1700*f* have at least one full-size opening 1780 that is of the same cross-sectional dimensions as the full-size opening 1780 of an adjacent fluid flow apparatus 1700 to which the given fluid flow apparatus is to be coupled. By "full-size" it is meant that the opening has a cross-sectional flow area that is equal to the cross-sectional flow area of the internal slot 1190 at the location of the intersection of the opening with the slot 1190 of the given fluid flow apparatus. Such a full-size opening may be further characterized as being non-restricted and in one embodiment, such full-size openings may form full-opening connections between conductor segments of different fluid flow apparatus, in the manner previously described herein.

As shown in FIG. 14A, a given fluid flow apparatus 1700 may be provided with one or more openings (e.g., full-size or less-than-full size opening/s) on any wall or multiple walls (e.g., sides, ends and/or edges) of the given fluid flow apparatus 1700, while no opening/s may be defined in the remaining wall or walls (if any) of the given fluid flow apparatus 1700, which instead are sealed and fluid-tight and pressure-tight or fluid-impervious. Openings may be full-size openings 1780, or may be less than full-size openings, e.g., such as fluid inlets 1104 and fluid outlets 1106 previously described, and such as partial opening 1785 described below. This is shown in FIG. 14A where fluid flow apparatus 1700*a* has a single full-size opening 1780 defined in its second end 1126, as well as multiple separate smaller less than full-size fluid inlets 1104 defined in its first end 1124 that may each be coupled to receive fluid from inlet conduits 1101 (alternatively or additionally fluid inlets 1104 may be formed in any of the second end, one or both edges and/or one or both sides of a fluid flow apparatus such as 1700*a*). Fluid flow apparatus 1700*b* has a full-size opening 1780 defined in its first end 1124, a full-size opening 1780 defined in its first edge 1120, and another full-size opening 1780 defined in its second end 1126. Fluid flow apparatus 1700*c* has a full-size opening 1780 defined in its first end 1124, and a full-size opening 1780 defined in its second edge 1121. Fluid flow apparatus 1700*d* has only a single full-size opening 1780 defined in its second edge 1121, and a single less than full-size fluid outlet 1106 defined in its second end 1126 that may be coupled to dispel fluid into an outlet conduit 1103 (alternatively or additionally fluid outlet/s 1106 may be formed in any of the second end, one or both edges and/or one or both sides of a fluid flow apparatus such as 1700*a*). Fluid flow apparatus 1700*e* has a full-size opening 1780 defined in its first edge 1120, and a horizontal rectangular partial opening 1785 defined in its first side 1332 that is shaped and dimensioned for sealed fluid-tight and pressure-tight coupling to a single full-size opening 1780 defined in a first end 1124 of fluid flow apparatus 1700*f* as shown. Fluid flow apparatus 1700*f* is in turn has a single full-size opening 1780 defined in its first end 1124 and separate smaller less-than-full-size fluid outlet conduits 1103 defined in its second end 1126 that may each be coupled to dispel fluid into a respective fluid outlet conduits 1103.

As further shown in FIG. 14A, full-size openings 1780 of two adjacent fluid flow apparatus 1700 may in one embodiment be coupled together in sealed fluid-tight and pressure-tight relationship with an optional fluid seal 1105 positioned therebetween, e.g., similar to the manner described and illustrated in relation to FIG. 9A. In this regard, adjacent separate fluid flow apparatus 1700 may be mechanically held together in sealed fluid-tight and pressure-tight relationship using any suitable technique and/or apparatus. Although it is possible that adjacent fluid flow apparatus may be held together by a permanent attachment technique such as epoxy adhesive, it will be understood that in other embodiments (such as illustrated and described in relation to FIGS. 14A-14E and 15A-15E) adjacent modular fluid flow apparatus may be assembled and temporarily held together during fluid flow testing so as to allow later disassembly, e.g., for retrieval and testing of captured internal contents and/or to allow re-assembly of the separate modular fluid flow apparatus into a different fluid path geometry for fluid flow testing.

For example, in FIG. 14A straps 1750 (e.g., non-elastic material such as metal or plastic, elastomeric material such as rubber) may be provided as needed to mechanically hold adjacent fluid flow apparatus 1700 together in secure sealed fluid-tight and pressure-tight relationship. In the illustrated embodiment of FIG. 14A, each opposing end of a strap 1750 has a slot opening defined therein that is complementary dimensioned for securely receiving or mechanically coupling to a mechanical connector 1752 (e.g., a boss, stud, threaded hole for receiving a threaded retaining bolt, threaded stud for receiving a threaded nut, etc.) in a manner such that strap 1750 pulls together and holds two adjacent fluid flow apparatus in sealed fluid-tight and pressure-tight relationship in the manner illustrated in FIG. 14B. In this regard, FIG. 14B illustrates an assembled group of multiple separate modular fluid flow apparatus 1700a, 1700b, 1700c, 1700d, 1700e and 1700f of FIG. 14A. FIG. 14B illustrates the network of exemplary modular fluid flow apparatus 1700a, 1700b, 1700c, 1700d, 1700e and 1700f assembled with their respective length (L) axes and width (W) axes oriented parallel to the horizontal (or parallel to a plane defined by the x-axis and z-axis of FIG. 14B). However, this orientation is exemplary and illustrative only, it being understood that the network of assembled modular fluid flow apparatus 1700a, 1700b, 1700c, 1700d, 1700e and 1700f (or any other assembled fluid flow apparatus) may be rotated or otherwise oriented during fluid flow testing such that the respective length (L) axes and width (W) axes of the slots of the assembled modular fluid flow apparatus 1700a, 1700b, 1700c, 1700d, 1700e and 1700f (or any other assembled fluid flow apparatus) are not parallel to the horizontal (or are not parallel to the plane defined by the x-axis and z-axis of FIG. 14B) but are instead oriented at an angle greater than zero to the horizontal (or are oriented at an angle greater than zero to the plane defined by the x-axis and z-axis of FIG. 14B).

In this particular embodiment of FIG. 14B, assembled fluid flow apparatus 1700f is oriented with its slot height (H) axis parallel to the horizontal and with its slot length (L) axis or longitudinal axis oriented perpendicular to the slot length axis or longitudinal axis of adjacent coupled fluid flow apparatus 1700e. It will be understood that these orientations are exemplary only, and that a given fluid flow apparatus may be coupled to another fluid flow apparatus in any other orientation to the other fluid flow apparatus and/or to the horizontal, e.g., a given fluid flow apparatus may be coupled to another fluid flow apparatus such that at least one of the length (L) axis, height (H) axis and/or width (W) axis of the given fluid flow apparatus is oriented in non-parallel relationship (e.g., at an angle from greater than 0 degrees to 90 degrees, alternatively greater than 0 degrees to less than 180 degrees) relative to the corresponding length (L) axis, height (H) axis and/or width (W) axis of the slot of the other fluid flow apparatus, and/or such that at least one of the length (L) axis, height (H) axis and/or width (W) axis of the slot of the given fluid flow apparatus is oriented at any other suitable angle to the horizontal. Thus, for example, the geometry and orientation of the slots of multiple coupled-together fluid flow apparatus may be angled relative to each other at any of the angles or range of angles as described in relation to FIG. 12 and/or conductor segments 171, 170, 173, 380, 381, etc. as previously described. Further, the size (e.g., cross-sectional flow area) of the slots of multiple coupled-together fluid flow apparatus may be selected (e.g., to model primary, secondary and tertiary fractures) as previously described in relation to conductor segments 171, 170, 173, 380, 381, etc. Thus, particular configuration (size and/or geometry) of interconnected slots of multiple fluid flow apparatus may be based on reservoir characterization and/or core samples of formation 100, and may be rearranged to model different formation conditions (e.g., such as natural fracture network conditions that are present in an underground shale formation).

It will be understood that straps 1750 and connectors 1752 are exemplary only, and that any other suitable technique and/or apparatus may be employed to mechanically hold adjacent fluid flow apparatus 1700 together in secure sealed fluid-tight and pressure-tight relationship during fluid testing. Moreover, it will be understood that any number or configuration of straps 1750 and connectors 1752 may be employed on any one or more walls of the fluid flow apparatus as needed to hold separate fluid flow apparatus together in fluid-tight and pressure-tight relationship. For purposes of simplicity of illustration, straps 1750 are not shown in FIG. 14A that may be present and configured for similarly (e.g., symmetrically) coupling together the walls of the fluid flow apparatus that are hidden from view in FIG. 7 (e.g., backside or second side walls 1334 of apparatus 1700a, 1700b, 1700c, 1700d and 1700e; and/or second edge walls 1121 of apparatus 1700e and 1700f). Thus it will be understood that straps 1750 and mechanical connectors 1752 may be provide in similar (mirror-image) configuration on opposing walls of each fluid flow apparatus to securely coupled the apparatus together.

It will be understood that any number of two or more separate fluid flow apparatus may be coupled together in similar fashion. In one embodiment, similarly-sized modular fluid flow apparatus having slots 1190 that are 24 inches length (L)×24 inches height (H) and 0.25 inches width (W) may be coupled together to create a larger combined flow apparatus, e.g., to expand a 24 inch length (L)×24 inch height (H) slot 1190 of a first fluid flow apparatus 1700 by attaching another 24 inch length (L)×24 inch height (H) slot 1190 of a second fluid flow apparatus 1700 to create a combined fluid flow apparatus having an internal slot 1190 that is either 48 inch length (L)×24 inches height (H), or that is 24 inch length (L)×48 inch height (H).

Figure 14C:
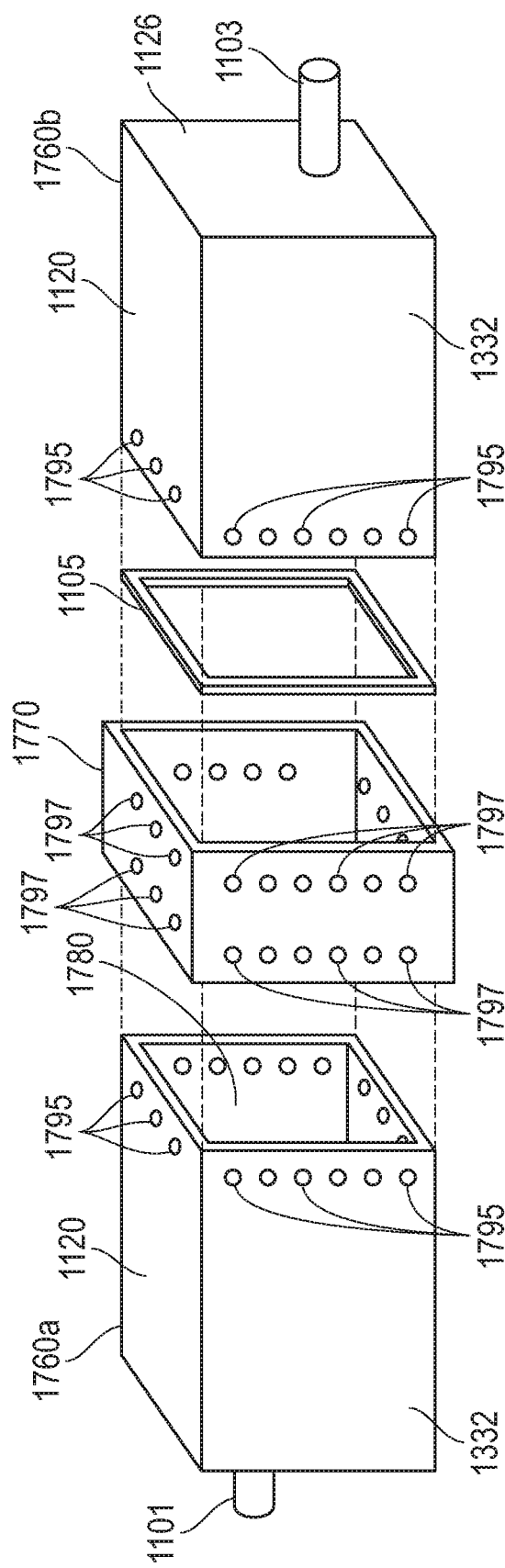
FIG. 14C illustrates an exploded perspective view of a group of multiple modular fluid flow apparatus positioned to be together in fluid communication with each other according to one exemplary embodiment of the disclosed apparatus and methods.
Figure 14D:
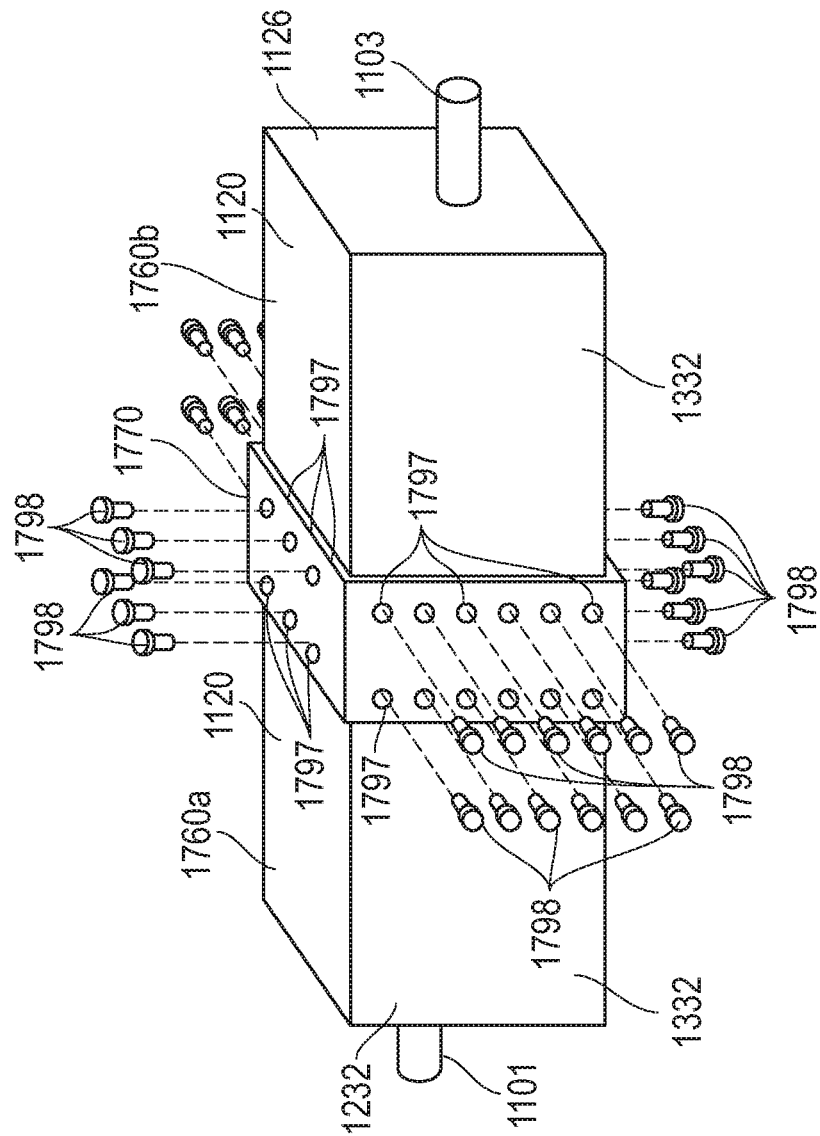
FIG. 14D illustrates an exploded perspective view of a group of multiple modular fluid flow apparatus being assembled together in fluid communication with each other according to one exemplary embodiment of the disclosed apparatus and methods.

It will be understood that the embodiment of FIGS. 14A-14E are exemplary only, and that multiple fluid flow apparatus may be coupled together in wall-to-wall fluid communication (e.g., end-to-end, side-to-end, end-to-side, side-to-side, etc.) in any other suitable manner. For example, FIG. 14C illustrates a perspective view in which multiple fluid flow apparatus 1760a and 1760b are positioned for wall-to-wall coupling to each other using a sleeve 1770. As shown in FIG. 14D, sleeve 1770 may be secured between fluid flow apparatus 1760a and 1760b (e.g., with threaded fasteners 1798 received through openings 1797 defined in sleeve 1770 into complementary-positioned threaded fastener openings 1795 defined in each fluid flow apparatus or other suitable technique) to hold two adjacent fluid flow apparatus together in sealed fluid-tight and pressure-tight relationship in the manner illustrated in FIG. 14E. Location of an optional slit 1820 and internal grooves 1840 for use with valves (e.g., elongated slides as described in relation to FIGS. 15A-15E) is depicted in dashed outline on first edge surface 1120 of fluid flow apparatus 1760b adjacent its full-size opening 1780. It will be understood that the conductor segments of one or more of flow apparatus 1760a and 1760b may include an internally-heterogeneous fluid flow space (e.g., slot containing one or more fluid flow diversion features and/or have a varying or non-consistent cross-sectional flow area in a manner described elsewhere herein), although this is not necessary one or both of fluid flow apparatus 1760a and 1760b may instead have an internally-homogeneous fluid flow space having a consistent (e.g., full-open) cross-sectional flow area with no diversion features positioned therein.

It will be understood that the role of sleeves 1770 may instead be performed by separate plates (e.g., elongated plates in this example) that are mounted to straddle each pair of adjacent walls of the fluid flow apparatus 1760a and 1760b (e.g., rather than a single piece contiguous sleeve), and that connectors 1752 (e.g., bosses, studs or threaded studs, etc.) may alternatively extend from the sides of a fluid flow apparatus for receiving a fastener to secure the plate, strap, sleeve, etc. between adjacent walls of the joined fluid flow apparatus. In other embodiments, sleeves 1770 or plates may be angled between sets of connector 1752 at a positioned between two separate fluid flow apparatus so as to couple the separate fluid flow apparatus in angled relationship to each other. Sleeve 1770 or multiple component pieces thereof may in one embodiment be sheet metal, plastic sheet, fiberglass sheet, etc. Any suitable type of optional fluid seal may be provided, e.g., such as optional fluid seal 1105 positioned between abutting ends of fluid flow apparatus 1760a and 1760b as previously illustrated and described and/or interior surfaces of a sleeve 1770 may be lined with elastomeric sealing or caulking to seal against outer surface walls of each apparatus 1760, etc. Where tops of fluid flow apparatus 1760a and 1760b are open, no separate seal may be required between abutting ends of the fluid flow apparatus which may have, for example, mating machined surfaces that form a fluid-tight seal under atmospheric pressure testing conditions.

Figure 14E:
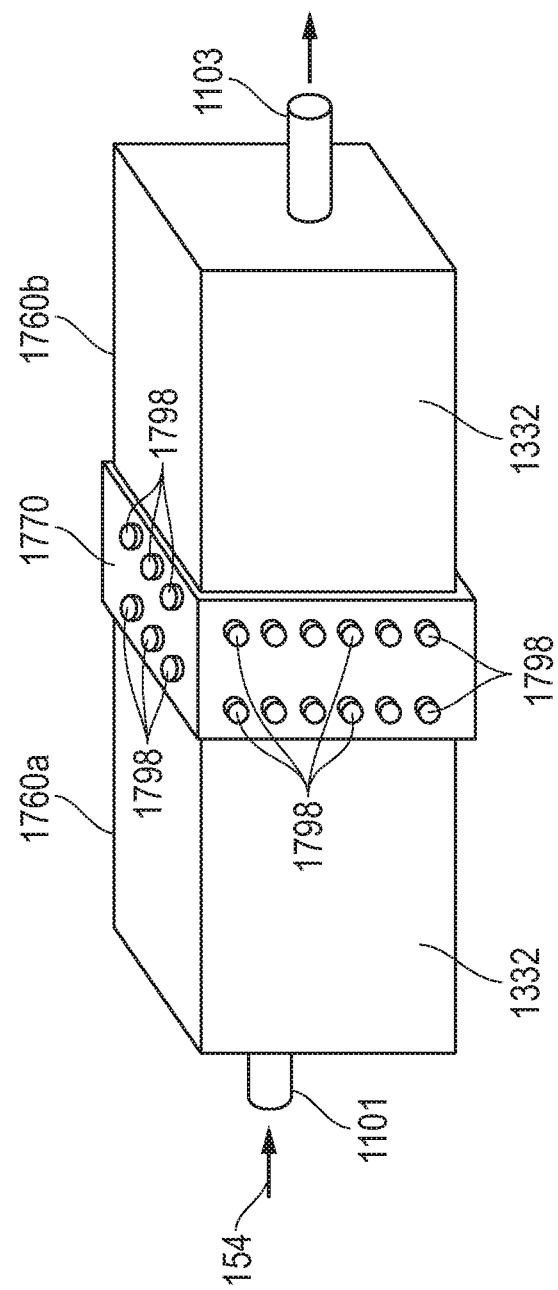
FIG. 14E illustrates a perspective view of an assembled group of multiple modular fluid flow apparatus in fluid communication with each other according to one exemplary embodiment of the disclosed apparatus and methods.
Figure 15A:
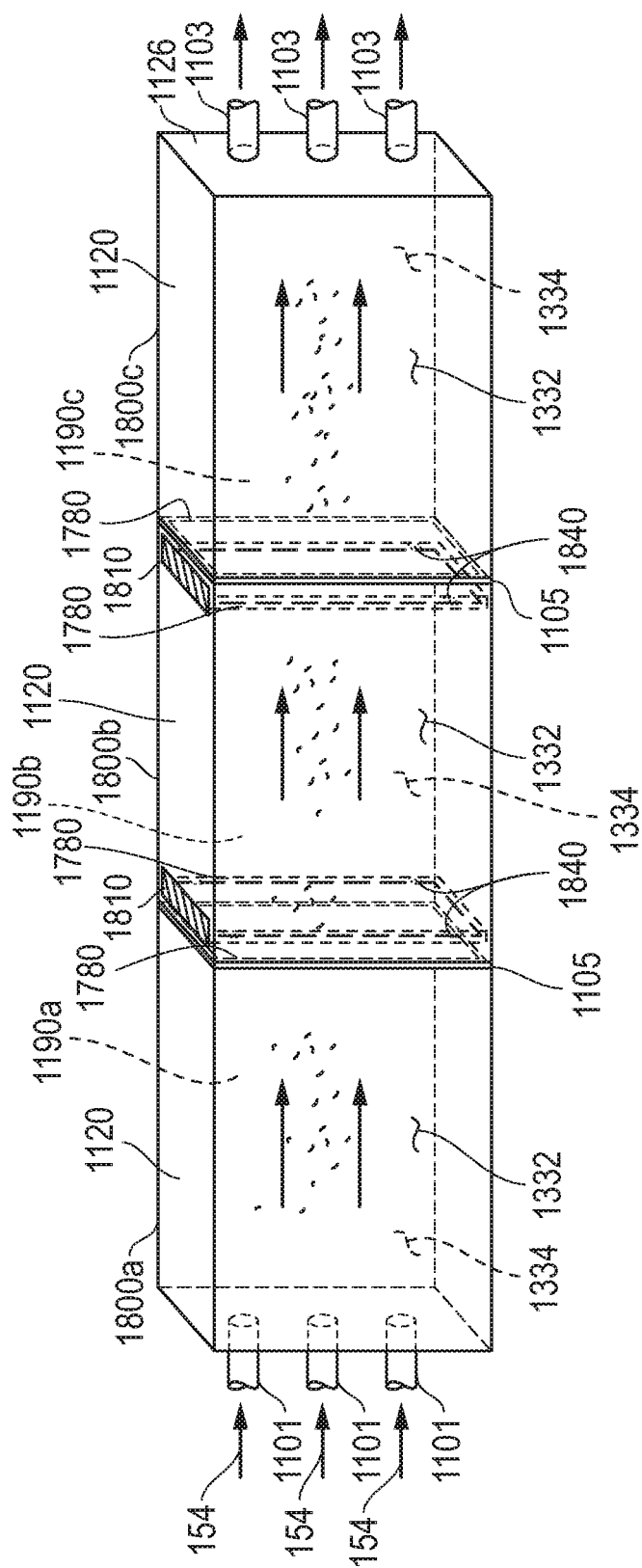
FIG. 15A illustrates a perspective view of a group of multiple modular fluid flow apparatus assembled in end-to-end fluid communication with each other according to one exemplary embodiment of the disclosed apparatus and methods.

FIGS. 15A-15E illustrate one exemplary embodiment in which contents of one or more fluid flow apparatus may be captured in situ following a fluid flow test, e.g., for purposes of further testing in similar manner to that illustrated and described in relation to FIGS. 3C and 3D herein. FIG. 15A shows three fluid flow apparatus 1800a to 1800c having full-size openings coupled together in end-to-end sealed fluid-tight and pressure-tight relationship, e.g. which may be performed using detachable connection apparatus such as straps 1750 and bosses 1752 as illustrated in FIGS. 14A-14B, sleeves 1770 such as illustrated in FIGS. 14C-14E or any other suitable detachable connection technique or detachable connection apparatus. Such separate detachable connection apparatus are not shown in FIGS. 15A-15E for purposes of clarity of illustration.

In the illustrated embodiment of FIGS. 15A-15E, the center fluid flow apparatus 1800b is provided with a transverse slit 1820 defined in the first edge 1120 of fluid flow apparatus 1800b adjacent and inboard to the full-size opening 1780 defined at each of the first end 1124 and second end 1126 of fluid flow apparatus 1800b. In the illustrated embodiment, opposite ends of each of slits 1820 is aligned with a pair of opposing internal grooves 1840 that are defined in this embodiment within respective opposing walls 1332 and 1334 of fluid flow apparatus 1800b (optional grooves 1840 also shown in overhead view of the embodiment of FIG. 12). As shown, the opposing grooves 1840 extend downwardly into slot 1190 in a perpendicular direction to the orientation of each slit 1820 and the plane of first edge 1120. It will be understood that the conductor segments of one or more of fluid flow apparatus 1800a, 1800b and 1800c may optionally include an internally-heterogeneous fluid flow space (e.g., slot containing one or more fluid flow diversion features and/or have a varying or non-consistent cross-sectional flow area in a manner described elsewhere herein), although this is not necessary and any one or more of fluid flow apparatus 1800a, 1800b and 1800c may instead have an internally-homogeneous fluid flow space having a consistent cross-sectional flow area with no diversion features therein. For purposes of clear illustration in FIG. 15A, internal features of apparatus fluid flow apparatus 1800a, 1800b and 1800c are shown using hidden dashed lines (e.g., as would be the case where at least 1120, 1332 and 1126 are opaque), however it will be understood that these features may be visible through walls of fluid flow apparatus 1800a, 1800b and/or 1800c where these walls are transparent.

In FIG. 15A, a proppant-laden test fluid 154 (e.g., slurry) is shown being introduced from inlet conduits 1101 into the internal slot 1190 of fluid flow apparatus 1800a, passing through the continuous open space provided by the aligned internal slots 1190 of coupled-together fluid flow apparatus 1800a, 1800b and 1800c, and passing out of fluid flow outlet conduits 1103 of fluid flow apparatus 1800c. A respective plug 1810 (e.g., rubber or coated metal, etc.) is shown positioned within each slit 1820 so as to form a sealed fluid-tight and pressure-tight seal with the slit 1820 such that no fluid or pressure leakage from the fluid flow apparatus 1800b occurs at the slit 1820 during test fluid flow. A relatively short tab 1811 may be dimensioned to be securely received (e.g., friction and/or compression fit) within the entire slit 1820 so as to extend perpendicular from the plug 1810 a short distance (e.g., less than or equal to wall thickness of first edge 1120) toward slot 1190 between the opposing grooves 1840 to center and hold the plug 1810 in place in position that does not obstruct or restrict the fluid flow through slot 1190 during flow testing. In alternative embodiment, a tab 1811 may extend partially from a plug 1810 into slot 1190 so as to only partially restrict (but not block) the fluid flow through slot 1190

Figure 15B:
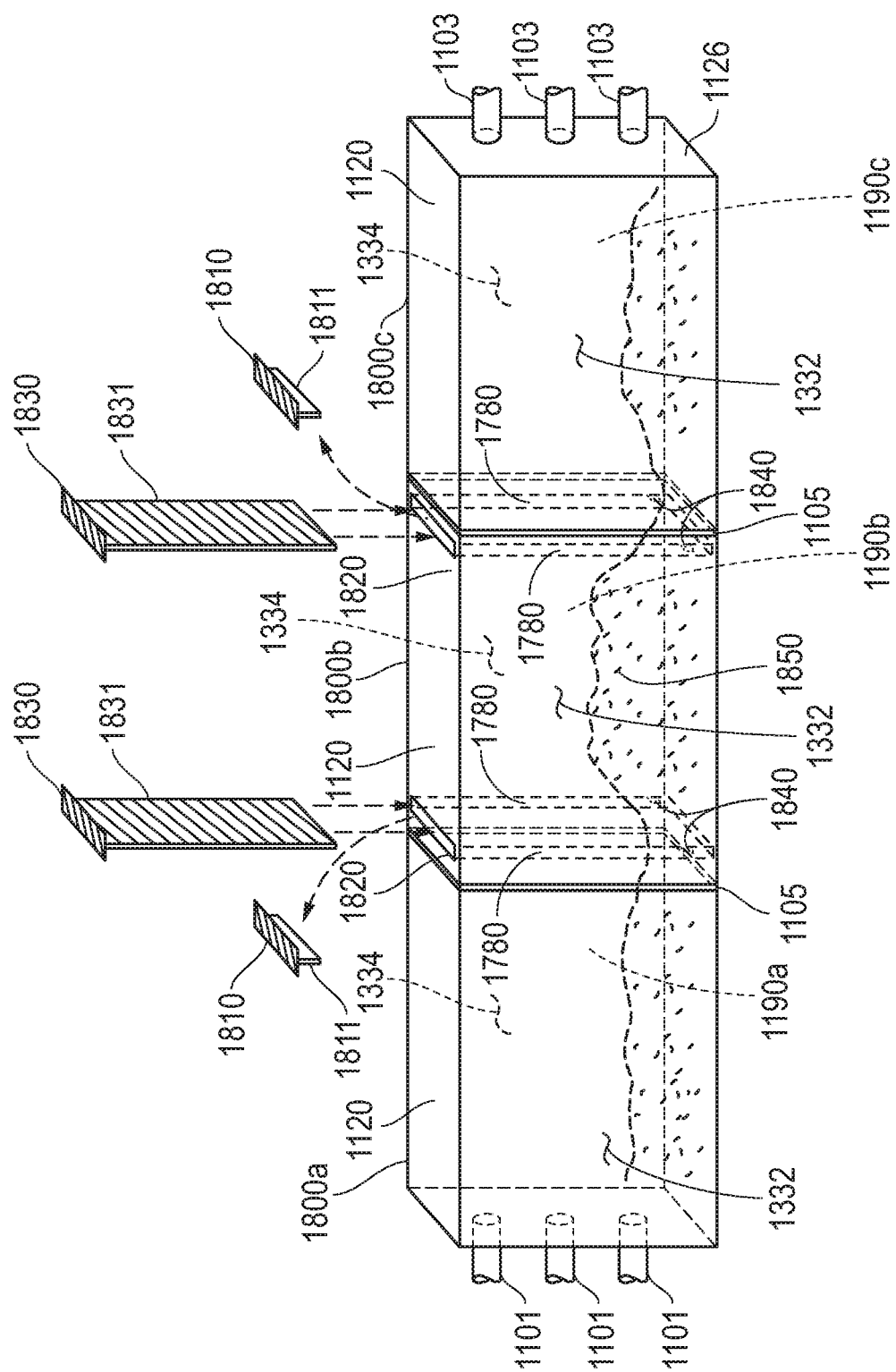
FIG. 15B illustrates a perspective view of a group of multiple modular fluid flow apparatus assembled in end-to-end fluid communication with each other according to one exemplary embodiment of the disclosed apparatus and methods.
Figure 15C:
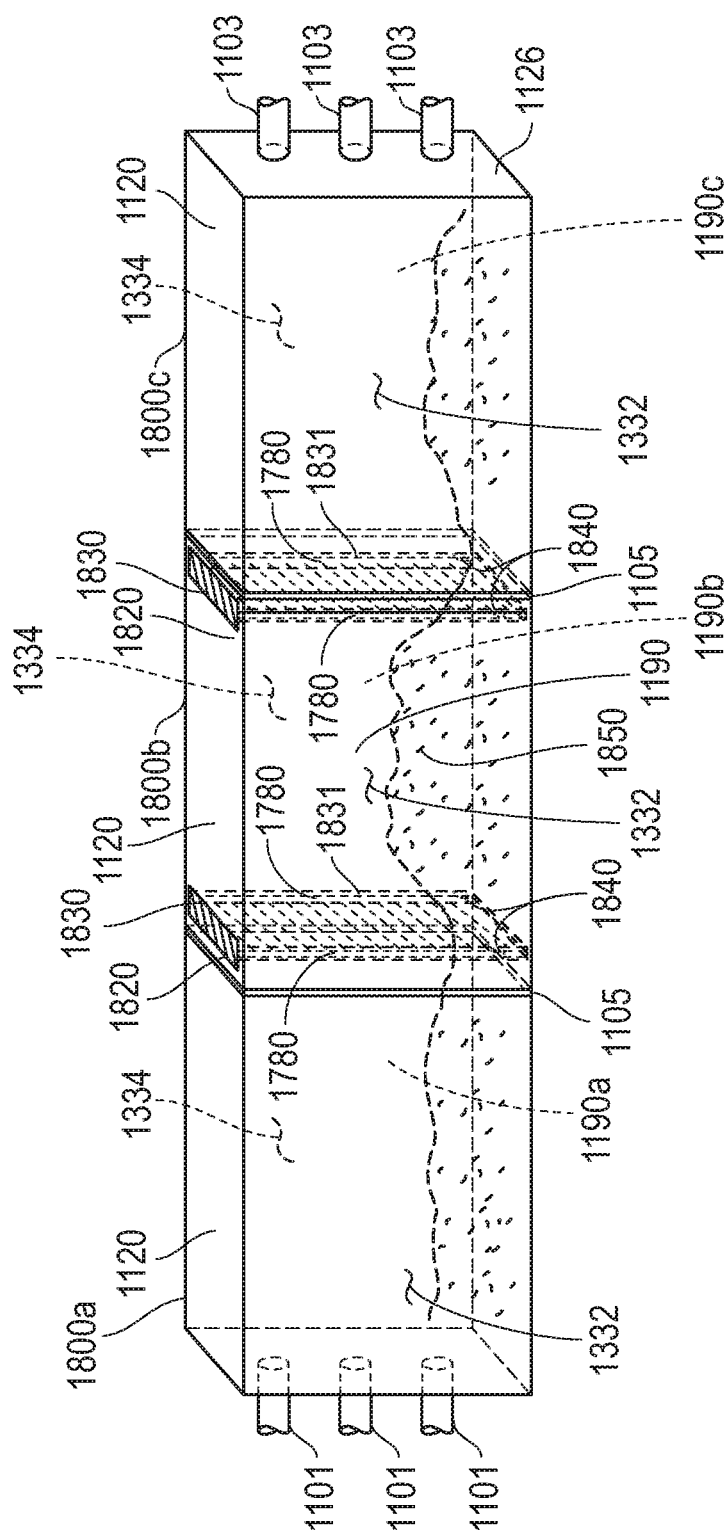
FIG. 15C illustrates a perspective view of a group of multiple modular fluid flow apparatus assembled in end-to-end fluid communication with each other according to one exemplary embodiment of the disclosed apparatus and methods.
Figures 15D, 15E:
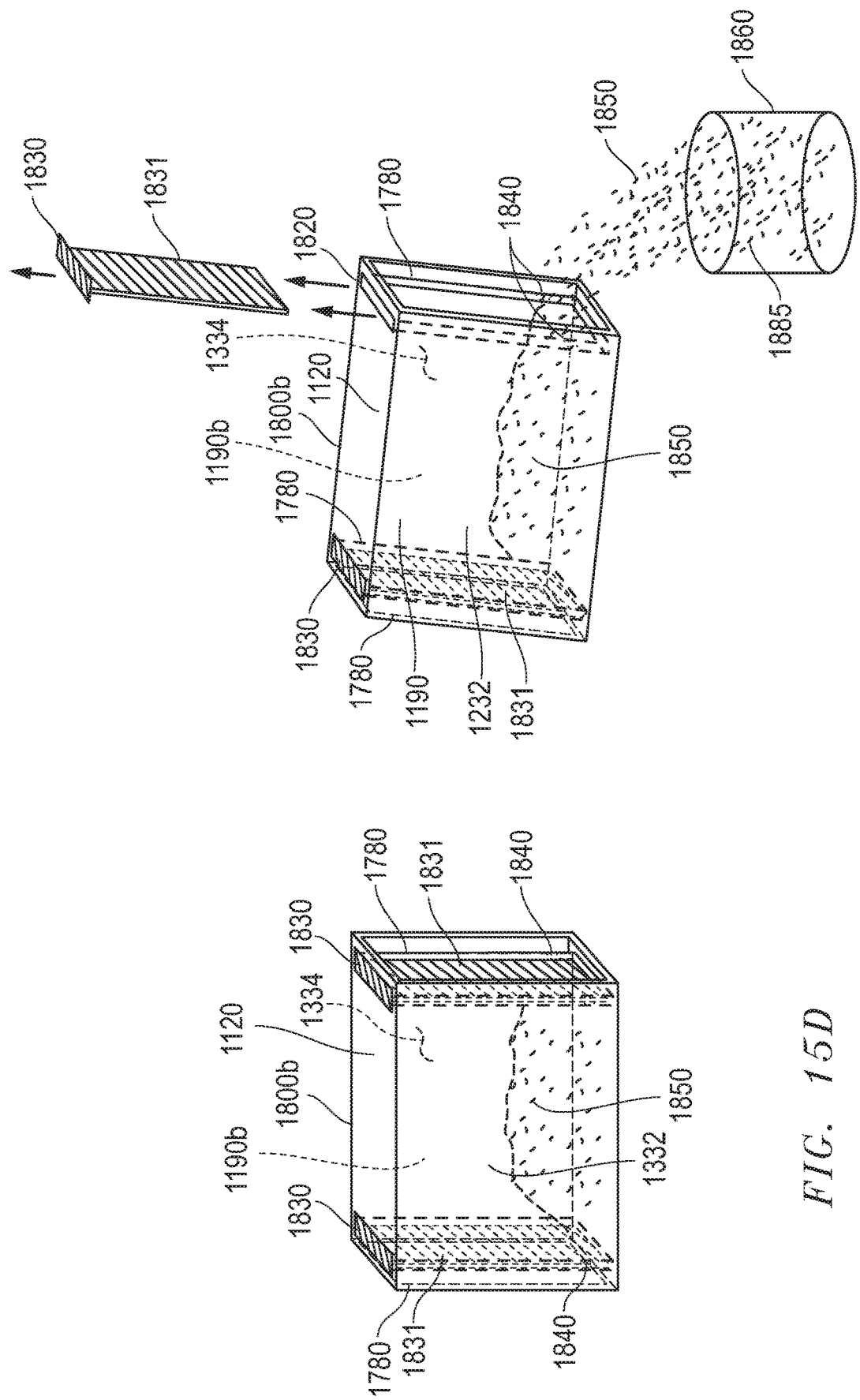
FIG. 15D illustrates a single modular fluid flow apparatus according to one exemplary embodiment of the disclosed apparatus and methods.
FIG. 15E illustrates a single modular fluid flow apparatus and collection vessel according to one exemplary embodiment of the disclosed apparatus and methods.

In FIG. 15B, test fluid flow has ceased and a volume of solid proppant and/or fluid 1850 has settled within the slot 1190 of fluid flow apparatus 1800b. As shown in FIGS. 15B and 15C, plugs 1810 may now be removed and replaced with plugs 1830 that may be configured to be received in fluid-tight and pressure tight relationship with slit 1820 similar to plugs 1810, but from which a valve in the form of an elongated full-length slide 1831 (e.g., metal, plastic or fiberglass plate, etc.) may extend perpendicular from the plug 1830 a distance equivalent to the full height of slot 1190 between the opposing grooves 1840 that form a fluid-tight and pressure-tight seal with each of grooves 1840 to block and seal the adjacent full-size opening 1780 of fluid flow apparatus 1800*b* such that the contents 1850 (proppant and/or fluid) are captured within a sample chamber formed by interior 1190*b* of slot 1800*b* between the valves (e.g., slides 1831) that are positioned at each end 1124 and 1126 of fluid flow apparatus 1800*b* as shown in FIGS. 15C and 15D. As shown in FIG. 15E, fluid flow apparatus 1800*b* may now be disassembled from the adjacent fluid flow apparatus 1800*a* and 1800*c*, together with its captured contents 1850 that are prevented from leaking from the interior 1190*b* by each slide 1831. FIG. 15E illustrates how at least one of slides 1831 may be removed from the disassembled fluid flow apparatus 1800*b* so as to empty all or a portion of the contents 1850 from one of full-size openings 1780, e.g., into a collection vessel 1860 for further testing such as described in relation to FIGS. 3C and 3D herein. Alternatively, a given fluid flow apparatus may be disassembled from one or more adjacent fluid flow apparatus without the presence of valves (e.g., slides 1831) or any other provision for capturing the contents within the given fluid flow apparatus, in which case at least a portion of the contents may be merely allowed to free flow out of at least one full-size opening 1780 of the disassembled fluid flow apparatus into a collection vessel 1860. In any case, the contents of a collection analysis may then be performed on a weighed proppant sample 1885 and/or fluid (e.g., liquid) of the removed contents 1850, e.g., as described in relation to FIGS. 3C and 3D herein. In this way, proppant pack characteristics (e.g., permeability, conductivity, particle distribution, etc.) as well fluid (e.g., liquid) viscosity and other fluid properties may be measured in different portions of a simulated proppant pack.

Transverse slits 1820, mating tabs 1811 and plugs 1810, and mating slides 1831 and plugs 1830 of fluid flow apparatus 1800*a* to 1800*c* of FIGS. 15A-15E may be deployed in combination with any suitable mechanical connector apparatus or technique, e.g., using straps 1750 and bosses 1752 to detachably couple together fluid flow apparatus as shown in FIGS. 14A and 14B, or using sleeves 1770 of FIGS. 14C-14E. For example, one or more of fluid flow apparatus 1760 mechanically coupled to together with sleeves 1770 such as described and illustrated in FIGS. 14C-14E may be similarly configured with transverse slits 1820, mating tabs 1811 and plugs 1810, and mating slides 1831 and plugs 1830 to allow a sample of solid proppant and/or fluid 1850 to be captured during fluid flow testing, after which sleeves 1770 may be disassembled to allow the fluid flow apparatus 1760 containing the captured sample to be removed and opened to retrieve the captured contents 1850 for further testing. However, it will be understood that slits 1820, mating tabs 1811 and plugs 1810, and mating slides 1831 and plugs 1830 or other sample capture apparatus may be employed with any other temporary coupling technique or apparatus that is suitable for allowing a fluid or proppant sample to be captured within a slot of a removable (e.g., modular) fluid flow apparatus during fluid testing, and then retrieved from the removed fluid flow apparatus for sample testing.

It will also be understood that other capture apparatus and/or techniques may be employed in other embodiments, e.g., an inline isolation valve 399 may be optionally coupled between a detachable connection 397 and each fluid inlet conduit 1101 and each fluid outlet conduit 1103 of a fluid flow apparatus embodiment such as illustrated in dashed outline in FIG. 8B, in which case valves 399 may be selectively closed after test fluid flow to capture a fluid or proppant sample 1850 within the conductor segment slot 1190 of fluid flow apparatus 1100*a*, and then detachable connections 397 uncoupled to allow the fluid flow apparatus to be decoupled from a flow loop and the captured contents 1850 to be removed from the conductor segment slot 1190 through one or more of the isolation valves 399 for further testing in a manner similar to that illustrated and described herein in relation to FIGS. 3B, 3C and 3D. It will be understood that FIG. 8B is exemplary only, and that such isolation valves 399 and detachable connections 397 may be similarly positioned and employed for conductor segment slots 1190 having as few as a single fluid inlet conduit 1101 and/or a single fluid outlet conduit 1103.

Examples of testing that may be performed on a proppant sample 1850 include those described elsewhere herein for sample 335, such as determination of conductivity and permeability values, four-stack long term conductivity and retained conductivity testing, particle size distribution testing, mean particle diameter testing, median particle diameter, testing, etc. As previously described, in one exemplary embodiment various proppants having different particle size distributions may be individually tested (e.g., with different base fluids) to determine which proppant and/or base fluid combination yields an optimum or otherwise desired permeability in a given configuration of at least one fluid flow apparatus, or a combination couple-together fluid flow apparatus. Alternatively, a proppant-laden test fracture fluid 154 may be formulated from a given proppant and base fluid to simulate an actual fracture treatment that has already been performed on an actual underground or subterranean formation, e.g., for purposes of performance matching or evaluation of fracture treatment execution.

Figure 16:
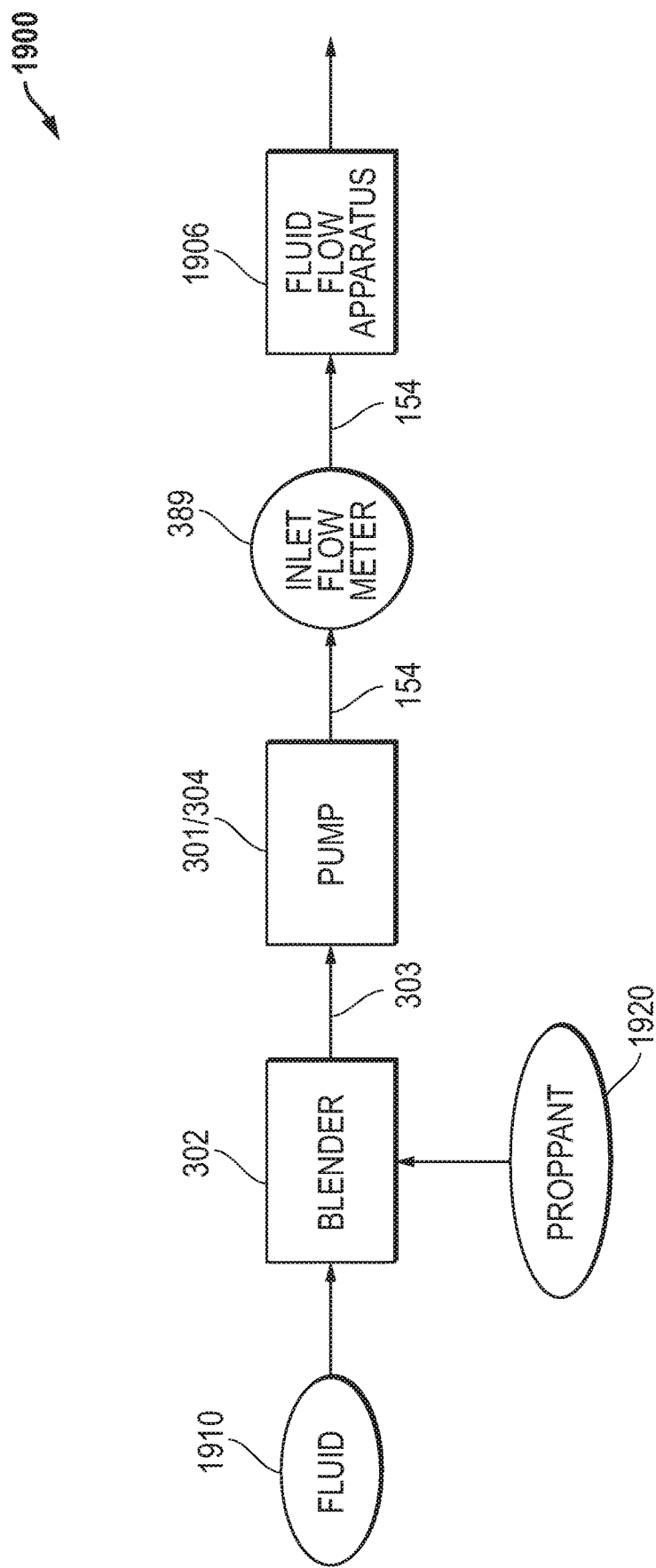
FIG. 16 illustrates a block diagram of a test system according to one exemplary embodiment of the disclosed apparatus and methods.

FIG. 16 illustrates one exemplary embodiment of a test system 1900 in which proppant 1920 (e.g., frac sand, sintered bauxite, resin coated proppant, ceramic proppant, etc.) may be blended with a transport fluid 1910 in a blender 302 to form a proppant-laden test fracture fluid 154 in the same manner and/or using same equipment as previously described in relation to test system 300 of FIG. 3A. Pump/s (e.g., centrifugal pump 301 and/or positive displacement pump 304 as illustrated in FIG. 3A) may transport test fluid 154 from blender 302 and introduce test fluid 154 through an optional flow meter 389 into at least one fluid flow apparatus 1906 which may be, for example, any of the fluid flow apparatus embodiments as illustrated and described herein in relation to preceding Figures. It will be understood that a transport fluid may include any liquid (e.g., water-based, oil-based, etc.) and/or gaseous fluid (e.g., carbon dioxide, nitrogen, etc.) that is suitable for blending with proppant to form a proppant slurry 154 to transport the proppant into one or more fluid flow apparatus 1906. In the practice of the disclosed systems and methods, any suitable test methodology may be performed (e.g., using test system 1900) to simulate and analyze fluid and/or proppant transport through different portions of a fracture network created in an underground formation during a hydraulic fracturing treatment using the test methodologies described herein.

As previously descried in relation to FIG. 3A, examples of suitable transport fluids include, but are not limited to, slickwater fluid, linear gel fluid, crosslinked fluid, gelled oil fluid, gas-energized liquid, gas, etc. Examples of gelling agents that may be employed in a selected amount to form a gelled transport fluid as desired include, but are not limited to, natural polymers such as guar and guar derivatives such as caroboxymethyl-hydroxypropyl-guar, hydroxypropyl guar, carboxymethyl guar; hydroxyethyl cellulose and carboxymethyl hydroxyethyl cellulose; as well as synthetic polymers such as acylamido-methyl-propane sulfonate (AMPS), polyacrylic acid, polyacrylamide; and viscoelastic surfactants. Crosslinkers that may be optionally added to a transport fluid to form a crosslinked transport fluid include, but are not limited to, borate, metal chelates of Zr and Ti, etc. A gelled transport fluid may also include an optional breaker, such as enzymes, acids, oxidizers, etc. Other additives that may be present in a transport fluid include, but are not limited to, fluid loss additives (e.g., such as diesel, etc.). It will be understood that it is also possible that proppant-free fluids (e.g., such as the above-described fluids suitable for transport fluids) may also be introduced to fluid flow apparatus 1906, with the exception of the absence of proppant particle analyses.

In the same manner described in relation to FIG. 3A, fluid 1910 may be provided to blender 302 from charge pump/s and/or holding tanks, and proppant may be provided to a hopper of blender 302 using a pneumatic conveyor and pneumatic transfer line. However, any other suitable combination of fluid-handling and solid-handling components may be alternatively employed to form slurry 154. In one embodiment, any combination of fluid and proppant may be employed to create a proppant slurry 154 (e.g., liquid-based slurry, gas-based slurry, gas-energized liquid-based slurry, etc.) that is suitable for fracturing an actual subterranean formation. In this regard, ratio of fluid to proppant may be controlled by metering proppant 1920 into blender 302 during test pumping to achieve desired proppant loading in slurry 154. In this regard, it is possible to pump a proppant slurry as a proppant-laden test fracture fluid 154 having a single proppant loading into at least one fluid flow apparatus 1906, or by pumping a proppant slurry as a proppant-laden test fracture fluid 154 into at least one fluid flow apparatus 1906 in two or more different stages having different proppant loadings). Example proppant loadings range from about 0.5 lb/gallon to about 4.0 lb/gallon, although proppant loadings greater than 4.0 lb/gallon and less than 0.5 lb/gallon are also possible. In one embodiment, proppant mesh sizes be may be any mesh size or range of mesh sizes that is suitable for fracturing an actual underground formation. Example proppant mesh sizes include, but are not limited to, 16/30, 20/40, 30/50, 40/70, and 100 mesh although larger and smaller proppant sizes are also possible.

It will be understood that the particular configurations of fluid flow apparatus and fluid diversion features described herein are exemplary only, and that any other fluid flow apparatus configuration may be employed that is suitable for receiving a test fluid and evaluating the behavior of fluids and/or proppants. In this regard, fluid flow apparatus configuration parameters (e.g., slot geometry, fluid diversion feature size and shape, fluid diversion feature location/s within a slot, etc.) may be varied alone or in combination as desired or needed to fit the characteristics of given test application.

It will be understood that one or more of the tasks, functions, or methodologies described herein for an information handling system or component thereof (e.g., including those described herein for components 375, 377 and 379) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprises instructions that are configured when executed (e.g., executed on a programmable integrated circuit such as CPU, controller, microcontroller, microprocessor, ASIC, etc. or executed on a programmable logic device "PLD" such as FPGA, complex programmable logic device "CPLD", etc.) to perform one or more steps of the methodologies disclosed herein. In one embodiment, a group of such processors and PLDs may be programmable integrated circuits selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein. It will also be understood that one or more steps of the present methodologies may be employed in one or more code segments of the computer program. For example, a code segment executed by the information handling system may include one or more steps of the disclosed methodologies. It will be understood that a programmable integrated circuit may be configured to execute or otherwise be programmed with software, firmware, logic, and/or other program instructions stored in one or more non-transitory tangible computer-readable mediums (e.g., example, data storage devices, flash memories, random access memories, read only memories, programmable memory devices, reprogrammable storage devices, hard drives, floppy disks, DVDs, CD-ROMs, and/or any other tangible data storage mediums) as may be applicable to perform certain of the operations, tasks, functions, or actions described herein for the disclosed embodiments.

While the invention may be adaptable to various modifications and alternative forms, specific examples and exemplary embodiments have been shown by way of example and described herein. However, it should be understood that the invention is not intended to be limited to the particular forms disclosed. Rather, the invention is to cover all modifications, equivalents, and alternatives falling within the spirit and scope of the methods and systems described herein. Moreover, the different aspects of the disclosed methods and systems may be utilized in various combinations and/or independently. Thus the invention is not limited to only those combinations shown herein, but rather may include other combinations.

What is claimed is:

1. An apparatus, comprising:
   at least one conductor segment, the conductor segment having at least one fluid inlet and at least one fluid outlet with an open area defining a fluid flow path between the at least one fluid inlet and the at least one fluid outlet; and
   one or more structures disposed within the open area to partially block the fluid flow path between the fluid inlet and the fluid outlet;
   where at least one of the one or more structures is disposed within the open area between the fluid inlet and the fluid outlet to block a direct path between the fluid inlet and the fluid outlet; and
   where the one or more structures are disposed within the open area between the fluid inlet and the fluid outlet so that no unblocked direct path exists between the fluid inlet and the fluid outlet.

2. The apparatus of claim 1, where the open area has a cross-sectional area perpendicular to the fluid flow path; and where the one or more structures are disposed within the open area to partially block the fluid flow path and vary the cross-sectional area of the open area between the at least one fluid inlet and the at least one fluid outlet.

3. The apparatus of claim 1, where the conductor segment further comprises spaced-apart first and second sides that extend between opposing first and second ends of the conductor segment, the at least one fluid inlet being defined in the first end and the at least one fluid outlet being defined in the second end; where the spaced-apart first and second sides define respective separate first and second inward-facing internal side surfaces that extend between the first end and second end of the conductor segment; and where the open area comprises an internal slot defined between the separate first and second inward-facing internal side surfaces of the conductor segment and extending between the first end and the second end of the conductor segment.

4. The apparatus of claim 3, where the separate first and second inward-facing internal side surfaces of the conductor segment comprise two opposing and parallel internal surfaces that are spaced apart from each other by a width of the internal slot, and to define the internal slot such that the internal slot has a width that is constant between the at least one fluid inlet and the at least one fluid outlet.

5. The apparatus of claim 3, where the separate first and second inward-facing internal side surfaces of the conductor segment comprise two opposing internal surfaces that are spaced apart from each other by a width of the internal slot, and that are disposed in non-parallel relationship with each other to define the internal slot such that the internal slot has a width that is variable between the at least one fluid inlet and the at least one fluid outlet.

6. The apparatus of claim 3, where at least one of the one or more structures extends completely across a space defined between the separate first and second inward-facing internal side surfaces of the conductor segment within the open area between the fluid inlet and the fluid outlet in a position so as to block the direct path between the fluid inlet and the fluid outlet.

7. The apparatus of claim 3, where at least one of the one or more structures extends only partially between the separate first and second inward-facing internal side surfaces of the conductor segment to partially block the fluid flow path defined between the at least one fluid inlet and the at least one fluid outlet.

8. The apparatus of claim 7, where at least a given one of the one or more structures intersects and extends in cantilevered fashion from the first one of the separate first and second inward-facing internal side surfaces of the conductor segment without intersecting the second one of the at least two separate and inward-facing internal side surfaces so as to leave the fluid flow path unblocked between the given one of the one more structures and the second one of the at least two separate and inward-facing internal side surfaces.

9. The apparatus of claim 3, where the conductor segment further comprises a first inward-facing internal edge surface of a first edge coupled to each of the first and second inward-facing internal side surfaces and a second inward-facing internal edge surface of a second edge coupled to each of the first and second inward-facing internal surfaces; where the slot is further defined between the first inward-facing internal edge surface, the second inward-facing internal edge surface, and the first and second separate and inward-facing internal side surfaces with a height of the slot defined between the first inward-facing internal edge surface and the second inward-facing internal edge surface; and where the first inward-facing internal edge surface and the second inward-facing internal edge surface are disposed in non-parallel relationship with each other to define the internal slot such that the internal slot has a variable height between the at least one fluid inlet defined in the first end of the conductor segment and the at least one fluid outlet defined in the second end of the conductor segment.

10. The apparatus of claim 1, where the open area of the conductor segment has a cross-sectional area perpendicular to the fluid flow path; and where the at least one fluid inlet and/or the at least one fluid outlet has a cross-sectional area perpendicular to the fluid flow path that is equal to the cross-sectional area of the open area of the conductor segment at a location of an intersection of the at least one fluid inlet and/or the at least one fluid outlet with the open area of the given fluid flow apparatus.

11. The apparatus of claim 1, further comprising at least two spaced valves defining a sample chamber within the conductor segment between the two valves; where at least one of the inlet or outlet of the conductor segment is configured to be mechanically coupled to at least one other conductor segment with the spaced valves of the first conductor segment open to allow a flow path through the conductor segment and between the conductor segment and the at least one other conductor segment; and where the conductor segment is further configured to be detachable from fluid communication with the at least one other conductor segment with the spaced valves closed to isolate the sample chamber within the first conductor segment.

12. The apparatus of claim 1, where the at least one conductor segment comprises a first conductor segment, the first conductor segment comprising:
at least two separate and inward-facing internal surfaces, with the open area defined as an internal slot between the at least two separate and inward-facing internal surfaces; and
at least two spaced valves defining a sample chamber within the slot between the two valves.

13. The apparatus of claim 12, where at least one of the fluid inlet or fluid outlet of the first conductor segment is configured to be mechanically coupled in fluid communication with at least one other conductor segment with the spaced valves of the first conductor segment open to allow a fluid flow path through the slot and between the first conductor segment and the other conductor segment; and where the first conductor segment is further configured to be detachable from fluid communication with the at least one other conductor segment with the spaced valves closed to isolate the sample chamber within the first conductor segment.

14. The apparatus of claim 12, where the first conductor segment further comprises:
at least a first connector configured to mechanically couple the first conductor segment in fluid communication with another and second conductor segment with the fluid inlet disposed between the first connector and the sample chamber to create a flow path with the valves open between the sample chamber of the first conductor segment and the second conductor segment; and
at least a second connector configured to mechanically couple the first conductor segment in fluid communication with another and third conductor segment with the fluid outlet disposed between the second connector and the sample chamber to create a flow path with the valves open between the sample chamber of the first conductor segment and the third conductor segment;
where the valves are configured to be closed to isolate and contain the contents of the sample chamber within the first conductor segment; and where the first conductor segment is detachable at the first connector from the second conductor segment and is detachable at the second connector from the third conductor segment to allow the first conductor segment to be separated from the second conductor segment and the third conductor segment with the valves closed to isolate and contain the contents of the sample chamber within the separated first conductor segment.

15. The apparatus of claim 12, where the slot has a cross-sectional area perpendicular to the fluid flow path; and where at least one of the fluid inlet or the fluid outlet defines a full-size opening having a cross-sectional area equal to the cross-sectional area of the slot at a location of an intersection of the at least one fluid inlet and/or the at least one fluid outlet with the open area of the given fluid flow apparatus.

16. An apparatus, comprising:
   at least one conductor segment, the conductor segment having at least one fluid inlet and at least one fluid outlet with an open area defining a fluid flow path between the at least one fluid inlet and the at least one fluid outlet; and
   one or more structures disposed within the open area to partially block the fluid flow path between the fluid inlet and the fluid outlet;
   where the at least one conductor segment comprises a first conductor segment, the first conductor segment comprising:
      at least two separate and inward-facing internal surfaces, with the open area defined as an internal slot between the at least two separate and inward-facing internal surfaces, and
      at least two spaced valves defining a sample chamber within the slot between the two valves; and
   where at least a first one of the spaced valves comprises opposing grooves defined in the at least two separate and inward-facing internal surfaces; and a removable slide configured to be placed in the grooves to close the first valve to isolate and contain contents of the sample chamber within the first conductor segment, and to be removed from the grooves to open the first valve to allow the fluid flow path between the fluid inlet and the fluid outlet through the sample chamber of the first conductor segment.

17. The apparatus of claim 3, where the conductor segment further comprises one or more given structures disposed within the open area and inwardly extending only partially across a width of the slot from the first inward-facing internal side surface toward the second inward-facing internal side surface to leave the fluid flow path unblocked between the one or more given structures and the second one of the at least two separate and inward-facing internal side surfaces and to block the fluid flow path at an intersection of the one or more given structures and the first one of the at least two separate and inward-facing internal side surfaces.

18. A test system, comprising:
   a network of multiple conductor segments coupled together in fluid communication, each of the multiple conductor segments comprising:
      at least two separate and inward-facing internal surfaces, with an open area defined as an internal slot between the at least two separate and inward-facing internal surfaces;
      at least one fluid inlet and at least one fluid outlet with the open area defining a fluid flow path between the at least one fluid inlet and the at least one fluid outlet, and
      one or more structures disposed within the open area to partially block the fluid flow path between the fluid inlet and the fluid outlet; and
   where the slot of each of the multiple conductor segments has a cross-sectional area perpendicular to the fluid flow path; and where each of the fluid inlet and the fluid outlet of each of the multiple conductor segments defines a full-size opening having a cross-sectional area equal to the cross-sectional area of the slot;
   where each of the multiple conductor segments is detachable from fluid communication with the other conductor segments.

19. The test system of claim 18, further comprising at least two spaced valves coupled in fluid communication within the first conductor segment to define a sample chamber between the two valves within the first conductor segment.

20. The test system of claim 19, further comprising at least two spaced valves coupled in fluid communication within the first conductor segment to define a sample chamber between the two valves within the first conductor segment; and where each of the spaced valves comprises opposing grooves defined in the at least two separate and inward-facing internal surfaces, and a removable slide configured to be placed in the grooves to close the valve to isolate and contain contents of the sample chamber within the first conductor segment and to be removed from the grooves to open the first valve to allow the fluid flow path between the fluid inlet and the fluid outlet through the sample chamber of the first conductor segment.

21. The test system of claim 18, further comprising a pump and a proppant blender; where at least one fluid inlet to the network of multiple conductor segments is coupled to an outlet of the pump; and where an inlet of the pump is coupled to an outlet of the proppant blender.

22. The test system of claim 18, where an inlet of a first one of the multiple conductor segments is coupled in fluid communication with an outlet of a second one of the multiple conductor segments such that a longitudinal axis of the slot of the first one of the multiple conductor segments is not parallel with the longitudinal axis of the slot of the second of the multiple conductor segments.

23. The test system of claim 18, where at least one of the multiple conductor segments further comprises one or more structures disposed within the open area and inwardly extending only partially across a width of the slot from one of the internal surfaces to partially block the fluid flow path between the fluid inlet and the fluid outlet of the at least one of the multiple conductor segments.

24. The test system of claim 18, further comprising at least two spaced valves defining a sample chamber within the slot of at least one of the multiple conductor segments between the two valves; and where the at least one conductor segment is further configured to be detachable from fluid communication with at least one other conductor segment with the spaced valves closed to isolate the sample chamber within the at least one conductor segment.

25. A method, comprising:
   introducing a slurry comprising proppant particles and fluid into at least one fluid inlet of a conductor segment, the conductor segment having at least one fluid outlet with an open area defining a fluid flow path between the at least one fluid inlet and the at least one fluid outlet, and one or more structures disposed within the open area between the fluid inlet and the fluid outlet to block a direct path between the fluid inlet and the fluid outlet; and causing the slurry to flow through the fluid flow path of the conductor segment from the fluid inlet to the fluid outlet of the conductor segment such that the structures alter a direction of the flow of the slurry from the fluid inlet to the fluid outlet by blocking the direct path between the fluid inlet and the fluid outlet;

where the one or more structures are disposed within the open area between the fluid inlet and the fluid outlet so that no unblocked direct path exists between the fluid inlet and the fluid outlet; and where the method further comprises causing the slurry to flow through the fluid flow path of the conductor segment from the fluid inlet to the fluid outlet of the conductor segment so that all introduced slurry is diverted over, under and/or around the one or more structures.

26. The method of claim 25, where the conductor segment further comprises spaced-apart first and second sides that extend between opposing first and second ends of the conductor segment, the at least one fluid inlet being defined in the first end and the at least one fluid outlet being defined in the second end; where the spaced-apart first and second sides define respective separate first and second inward-facing internal side surfaces that extend between the first end and second end of the conductor segment; where the open area comprises an internal slot defined between the separate first and second inward-facing internal side surfaces of the conductor segment and extending between the first end and the second end of the conductor segment; and where at least one of the one or more structures extends completely across a space defined between the separate first and second inward-facing internal side surfaces of the conductor segment within the open area between the fluid inlet and the fluid outlet in a position so as to block the direct path between the fluid inlet and the fluid outlet.

27. The method of claim 25, where the conductor segment further comprises spaced-apart first and second sides that extend between opposing first and second ends of the conductor segment, the at least one fluid inlet being defined in the first end and the at least one fluid outlet being defined in the second end; where the spaced-apart first and second sides define respective separate first and second inward-facing internal side surfaces that extend between the first end and second end of the conductor segment; where the open area comprises an internal slot defined between the separate first and second inward-facing internal side surfaces of the conductor segment and extending between the first end and the second end of the conductor segment; and where at least one of the one or more structures extends only partially between the separate first and second inward-facing internal side surfaces of the conductor segment to partially block the fluid flow path defined between the at least one fluid inlet and the at least one fluid outlet.

28. The method of claim 25, where the conductor segment further comprises spaced-apart first and second sides that extend between opposing first and second ends of the conductor segment, the at least one fluid inlet being defined in the first end and the at least one fluid outlet being defined in the second end; where the spaced-apart first and second sides define respective separate first and second inward-facing internal side surfaces that extend between the first end and second end of the conductor segment; where the open area comprises an internal slot defined between the separate first and second inward-facing internal side surfaces of the conductor segment and extending between the first end and the second end of the conductor segment; where the conductor segment further comprises a first inward-facing internal edge surface of a first edge coupled to each of the first and second inward-facing internal side surfaces and a second inward-facing internal edge surface of a second edge coupled to each of the first and second inward-facing internal surfaces; where the slot is further defined between the first inward-facing internal edge surface, the second inward-facing internal edge surface, and the first and second separate and inward-facing internal side surfaces with a height of the slot defined between the first inward-facing internal edge surface and the second inward-facing internal edge surface; and where the first inward-facing internal edge surface and the second inward-facing internal edge surface are disposed in non-parallel relationship with each other to define the internal slot such that the internal slot has a variable height between the at least one fluid inlet defined in the first end of the conductor segment and the at least one fluid outlet defined in the second end of the conductor segment.

29. The method of claim 25, where the open area is defined as an internal slot and sample chamber between at least two separate and inward-facing internal surfaces; and where the method further comprises:

causing the slurry to flow through the fluid flow path of the conductor segment from the fluid inlet to the fluid outlet of the conductor segment to deposit at least a portion of the proppant particles from the slurry within the sample chamber of the first conductor segment;

isolating at least a portion of the deposited proppant particles as isolated contents of the sample chamber within the conductor segment; and removing the isolated contents from the sample chamber of the conductor segment.

30. The method of claim 25, where the conductor segment comprises a first conductor segment, and where the method further comprises:

introducing the slurry comprising proppant particles and fluid into the at least one fluid inlet of the first conductor segment, the first conductor segment comprising at least two separate and inward-facing internal surfaces, with the open area defined as an internal slot and sample chamber between the at least two separate and inward-facing internal surfaces;

causing the slurry to flow through the fluid flow path of the first conductor segment from the fluid inlet to the fluid outlet of the first conductor segment to deposit at least a portion of the proppant particles from the slurry within the sample chamber of the first conductor segment;

isolating contents of the sample chamber within the first conductor segment, the isolated contents of the sample chamber comprising at least a portion of the deposited proppant particles as isolated; and removing the isolated contents from the sample chamber of the conductor segment.

31. The method of claim 30, where the first conductor segment further comprises at least two spaced valves defining the sample chamber within the slot between the two valves; and where the method further comprises:

causing the slurry to flow through the fluid flow path of the first conductor segment while at least one of the fluid inlet or fluid outlet of the first conductor segment is mechanically coupled in fluid communication with at least one other conductor segment with the spaced valves of the first conductor segment open to allow the slurry to flow through the slot and between the first conductor segment and the other conductor segment;

closing the spaced valves to isolate the contents of the sample chamber within the first conductor segment; and then detaching the first conductor segment with the isolated contents of the sample chamber from fluid communication with the at least one other conductor segment.

32. The method of claim 30, where the first conductor segment further comprises at least two spaced valves defining the sample chamber within the slot between the two valves; and where the method further comprises:

causing the slurry to flow through the fluid flow path of the first conductor segment while the fluid inlet of the first conductor segment is mechanically coupled in fluid communication with another and second conductor segment and while the fluid outlet of the first conductor segment is mechanically coupled in fluid communication with another and third conductor segment;

closing the spaced valves to isolate the contents of the sample chamber within the first conductor segment; and then detaching the first conductor segment with the isolated contents of the sample chamber from fluid communication with the second and third conductor segments.

33. A method, comprising:

introducing a slurry comprising proppant particles and fluid into at least one fluid inlet of a conductor segment, the conductor segment having at least one fluid outlet with an open area defining a fluid flow path between the at least one fluid inlet and the at least one fluid outlet, and one or more structures disposed within the open area; and causing the slurry to flow through the fluid flow path of the conductor segment from the fluid inlet to the fluid outlet of the conductor segment such that the structures partially block the flow of the slurry between the fluid inlet and the fluid outlet;

where the conductor segment comprises a first conductor segment, and where the method further comprises:

introducing the slurry comprising proppant particles and fluid into the at least one fluid inlet of the first conductor segment, the first conductor segment comprising at least two separate and inward-facing internal surfaces, with the open area defined as an internal slot and sample chamber between the at least two separate and inward-facing internal surfaces, causing the slurry to flow through the fluid flow path of the first conductor segment from the fluid inlet to the fluid outlet of the first conductor segment to deposit at least a portion of the proppant particles from the slurry within the sample chamber of the first conductor segment, isolating contents of the sample chamber within the first conductor segment, the isolated contents of the sample chamber comprising at least a portion of the deposited proppant particles as isolated, and removing the isolated contents from the sample chamber of the conductor segment; and where the slot has a cross-sectional area perpendicular to the fluid flow path; where at least one of the fluid inlet or the fluid outlet defines a full-size opening having a cross-sectional area equal to the cross-sectional area of the slot; where at least a first one of the spaced valves comprises opposing grooves defined in the at least two separate and inward-facing internal surfaces to receive a slide; and where the method further comprises causing the slurry to flow through the fluid flow path of the first conductor segment while no slide is positioned in the grooves, then positioning the slide in the grooves to close the first valve to isolate and contain the contents of the sample chamber within the first conductor segment, and then removing the slide from the grooves to open the first valve after detaching the first conductor segment with the isolated contents of the sample chamber from fluid communication with the other conductor segment to remove the contents of the sample chamber from the detached first conductor segment.

34. The method of claim 33, where the method further comprises analyzing the contents removed from the sample chamber.

35. A method, comprising:

introducing a slurry comprising proppant particles and fluid into at least one fluid inlet of a conductor segment, the conductor segment having at least one fluid outlet with an open area defining a fluid flow path between the at least one fluid inlet and the at least one fluid outlet, and one or more structures disposed within the open area; and causing the slurry to flow through the fluid flow path of the conductor segment from the fluid inlet to the fluid outlet of the conductor segment such that the structures partially block the flow of the slurry between the fluid inlet and the fluid outlet;

where the conductor segment is one of a network of multiple conductor segments coupled together in fluid communication, with the at least one fluid inlet of the conductor segment comprising at least one fluid inlet of the network of multiple conductor segments; where each of the multiple conductor segments comprises at least two separate and inward-facing internal surfaces with an open area defined as an internal slot between the at least two separate and inward-facing internal surfaces; where the slot of each of the multiple conductor segments has a cross-sectional area perpendicular to the fluid flow path, where each of a fluid inlet and a fluid outlet of each of the multiple conductor segments defines a full-size opening having a cross-sectional area equal to the cross-sectional area of the slot; and where the method further comprises:

introducing the slurry comprising proppant particles and fluid into the at least one fluid inlet of the network of multiple conductor segments coupled together in fluid communication, causing the slurry to flow through the multiple conductor segments, and then detaching each of the multiple conductor segments from fluid communication with the other conductor segments.

36. The method of claim 35, where a fluid inlet of a first one of the multiple conductor segments is coupled in fluid communication with a fluid outlet of a second one of the multiple conductor segments such that a longitudinal axis of the slot of the first one of the multiple conductor segments is not parallel with the longitudinal axis of the slot of the second one of the multiple conductor segments.

37. The method of claim 35, where the open area of at least a given one of the multiple conductor segments is defined as an internal slot and sample chamber between the at least two separate and inward-facing internal surfaces of the given conductor segment; and where the method further comprises:

causing the slurry to flow through the fluid flow path of the given conductor segment from the fluid inlet to the fluid outlet of the given conductor segment to deposit at least a portion of the proppant particles from the slurry within the sample chamber of the given conductor segment;

isolating at least a portion of the deposited proppant particles as isolated contents of the sample chamber within the given conductor segment; and removing the isolated contents from the sample chamber of the given conductor segment.

38. The method of claim 25, where the conductor segment further comprises spaced-apart first and second sides that extend between opposing first and second ends of the conductor segment, the at least one fluid outlet being defined in an inward-facing internal surface of the second end; where the spaced-apart first and second sides define respective separate first and second inward-facing internal side surfaces that extend between the first end and second end of the conductor segment; where the open area comprises an internal slot defined between the separate first and second inward-facing internal side surfaces of the conductor segment and extending between the first end and the second end of the conductor segment; and where the at least one fluid inlet is defined in at least one of the first or second inward-facing internal side surfaces of the conductor segment.

39. The apparatus of claim 1, where the conductor segment further comprises spaced-apart first and second sides that extend between opposing first and second ends of the conductor segment, the at least one fluid outlet being defined in an inward-facing internal surface of the second end; where the spaced-apart first and second sides define respective separate first and second inward-facing internal side surfaces that extend between the first end and second end of the conductor segment; where the open area comprises an internal slot defined between the separate first and second inward-facing internal side surfaces of the conductor segment and extending between the first end and the second end of the conductor segment; and where the at least one fluid inlet is defined in at least one of the first or second inward-facing internal side surfaces of the conductor segment.

40. The apparatus of claim 1, where at least one of the one or more structures is disposed within the open area at a position that is aligned directly between a position of the fluid inlet and a position of the fluid outlet.

41. The apparatus of claim 3, where the conductor segment further comprises a first inward-facing internal edge surface of a first edge coupled to each of the first and second inward-facing internal side surfaces and a second inward-facing internal edge surface of a second edge coupled to each of the first and second inward-facing internal surfaces; where the slot is further defined between the first inward-facing internal edge surface, the second inward-facing internal edge surface, and the first and second separate and inward-facing internal side surfaces with a height of the slot defined between the first inward-facing internal edge surface and the second inward-facing internal edge surface; and where at least a given one of the one or more structures intersects and extends inward from the first inward-facing internal edge surface of the first edge without intersecting the second inward-facing internal edge surface of the second edge so as to leave the fluid flow path unblocked between the given one of the one more structures and the second inward-facing internal edge surface of the second edge.

42. The apparatus of claim 41, where the at least a given one of the one or more structures intersects and extends inward from the first inward-facing internal edge surface of the first edge and does not intersect either of the first and second inward-facing internal side surfaces.

43. The method of claim 25, where at least one of the one or more structures is disposed within the open area at a position that is aligned directly between a position of the fluid inlet and a position of the fluid outlet.

* * * * *